(12) United States Patent
Ghasparian et al.

(10) Patent No.: US 12,465,633 B2
(45) Date of Patent: Nov. 11, 2025

(54) LIPOPEPTIDE BUILDING BLOCKS AND SYNTHETIC VIRUS-LIKE PARTICLES

(71) Applicants: VIROMETIX AG, Schlieren (CH); UNIVERSITÄT ZÜRICH, Zürich (CH)

(72) Inventors: Arin Ghasparian, Zürich (CH); John A Robinson, Kemptthal (CH)

(73) Assignees: VIROMETIX AG, Schlieren (CH); UNIVERSITÄT ZÜRICH, Zürich (CH)

( * ) Notice: Subject to any disclaimer, the term of this patent is extended or adjusted under 35 U.S.C. 154(b) by 1092 days.

(21) Appl. No.: 17/415,305

(22) PCT Filed: Dec. 19, 2019

(86) PCT No.: PCT/EP2019/086302
§ 371 (c)(1),
(2) Date: Jun. 17, 2021

(87) PCT Pub. No.: WO2020/127728
PCT Pub. Date: Jun. 25, 2020

(65) Prior Publication Data
US 2022/0054619 A1    Feb. 24, 2022

(30) Foreign Application Priority Data
Dec. 20, 2018    (EP) .................................... 18214485

(51) Int. Cl.
*C12N 7/00*    (2006.01)
*A61K 39/12*    (2006.01)
(Continued)

(52) U.S. Cl.
CPC .............. *A61K 39/12* (2013.01); *A61P 31/14* (2018.01); *C07K 14/001* (2013.01); *C12N 7/00* (2013.01);
(Continued)

(58) Field of Classification Search
None
See application file for complete search history.

(56) References Cited

U.S. PATENT DOCUMENTS

2022/0054619 A1* 2/2022 Ghasparian .............. C12N 7/00

FOREIGN PATENT DOCUMENTS

WO    2008/068017 A1    6/2008
WO    2015/082501 A1    6/2015
(Continued)

OTHER PUBLICATIONS

Tamborrini et al. (Vaccines. 2015; 3: 850-874).*
(Continued)

*Primary Examiner* — Shanon A. Foley
(74) *Attorney, Agent, or Firm* — MEDLER FERRO WOODHOUSE & MILLS PLLC

(57) ABSTRACT

The present invention relates to a lipopeptide building block consisting of (i) a peptide moiety comprising a coiled coil peptide chain segment, wherein said coiled coil peptide chain segment comprises 3 to 8 repeat units, and wherein said repeat unit consists of the sequence IEKKIE-X0 (SEQ ID NO:58), wherein X0 represents an amino acid; and (ii) a lipid moiety comprising the formula LM-I
(Continued)

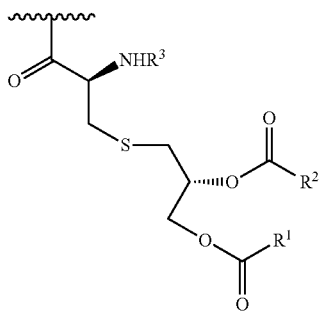

LM-I wherein $R^1$ and $R^2$ are independently $C_{11-15}$ alkyl, wherein $R^3$ is hydrogen or —C(O)$C_{11-15}$ alkyl wherein said lipid moiety is linked to said peptide moiety, wherein the wavy line in formula LM-I indicates the linkage site to said peptide moiety, as well as conjugates comprising said lipopeptide building blocks to which antigens are coupled, bundles of such conjugates, synthetic virus-like particles (SVLPs) comprising at least one bundle of conjugates and pharmaceutical compositions comprising the same.

20 Claims, 1 Drawing Sheet

Specification includes a Sequence Listing.

(51) Int. Cl.
*A61P 31/14* (2006.01)
*C07K 14/00* (2006.01)
*A61K 39/00* (2006.01)

(52) U.S. Cl.
CPC .......... *A61K 2039/5258* (2013.01); *A61K 2039/6018* (2013.01); *C12N 2760/18523* (2013.01); *C12N 2760/18534* (2013.01)

(56) References Cited

FOREIGN PATENT DOCUMENTS

WO 2017/145097 A2 8/2017
WO 2018/229156 A1 12/2018

OTHER PUBLICATIONS

Bernstein et al. (Journal of Virology. 1995; 2745-2750).*
Khan et al., "Chirality of TLR-2 ligand Pam3CysSK4 in fully synthetic peptide conjugates critically influences the induction of specific CD8+ T-cells," Molecular Immunology 46:1084-1891 (2009).
Ghasparian et al., "Engineered Synthetic Virus-Like Particles and Their Use in Vaccine Delivery," Chembiochem 12(1):100-109 (2011).
International Search Report in PCT/EP2019/086302, mailed Feb. 7, 2020.
Riedel et al., "Synthetic Virus-Like Particles and Conformationally Constrained Peptidomimetics in Vaccine Design," Chembiochem 12(18):2829-36 (2011).
Tamborrini et al., "A Synthetic Virus-Like Particle Streptococcal Vaccine Candidate Using B—Ce 11 Epitopes from the Praline-Rich Region of Pneumococcal Surface Protein A," Vaccines 3(4):850-874 (2015).
Zaman et al., "Immunostimulation by synthetic lipopeptide-based vaccine candidates: structure-activity relationships," Front. Immunol. 4:318 (2013).
Wild, C. et al., "Propensity for a leucine zipper-like domain of human immunodeficiency virus type 1 gp41 to form oligomers correlates with a role in virus-induced fusion rather than assembly of the glycoprotein complex," Proc. Natl. Acad. Sci. USA 91:12676-12680 (1994).

* cited by examiner

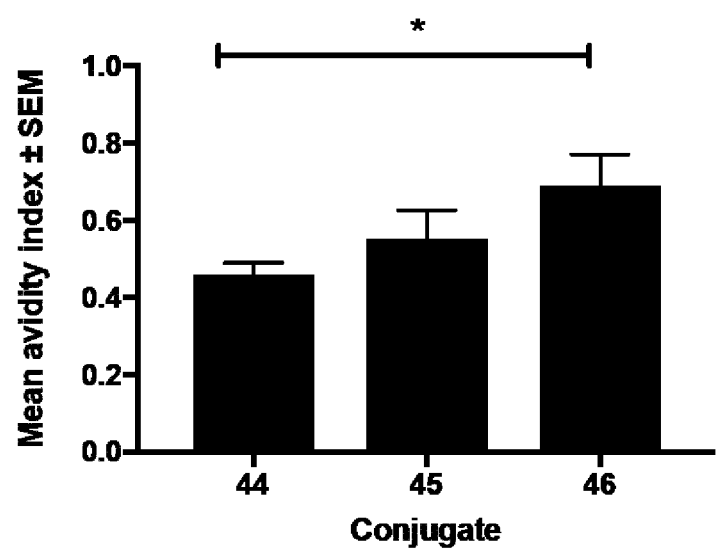

LIPOPEPTIDE BUILDING BLOCKS AND SYNTHETIC VIRUS-LIKE PARTICLES

SEQUENCE LISTING

The instant application contains a Sequence Listing which has been submitted electronically in ASCII format and is hereby incorporated by reference in its entirety. Said ASCII copy, created on Jul. 22, 2021, is named 0192-0136US1_SL.txt and is 42,600 bytes in size.

The present invention relates to lipopeptide building blocks, conjugates comprising said lipopeptide building blocks to which antigens are coupled, bundles of such conjugates, synthetic virus-like particles (SVLPs) comprising at least one bundle of conjugates and pharmaceutical compositions comprising the same. The present invention further relates to said conjugates, bundles of conjugates, said SVLPs and said pharmaceutical compositions for use as a medicament, as vaccines and for use in methods of preventing or treating a disease, preferably selected from infectious diseases, allergies and cancer, and generally to efficiently induce antigen specific immune responses.

RELATED ART

Synthetic virus-like particle (SVLP) have recently attracted a great deal of interest, in particular, SVLP-based vaccine candidates using synthetic lipopeptide building blocks to which antigens are conjugated and which spontaneously self-assemble into highly immunogenic nanoparticles of 20-30 nm and comprising around 60-80 copies of said lipopeptide building blocks. Since said antigens are displayed across the outer surface of the nanoparticle and SVLP, respectively, strong immune responses against the antigens, in particular, B cell responses are induced. Importantly, SVLPs contain no genetic information and cannot replicate in cells. Typically, said lipopeptide building blocks comprise coiled-coil peptide sequences as well as T-helper cell epitopes (A, Ghasparian and John A. Robinson in . . . Eds . . . ; A. Ghasparian, et al., ChemBioChem 2011, 12, 100-109; T. Riedel, et al., ChemBioChem 2011, 12, 2829; R. Sharma, et al., PLOS One 2012, 7, e43248; WO2008/068017; WO2015/082501). Coiled-coil designs are known by the skilled person in the art and have been reviewed (Woolfson, D. N., Adv. Prot. Chem., 2005, 70, 79-112; Parry, D. A. D., et al., Advancs in Protein Chemistry, 2005, 70).

Specifically engineered SVLPs and their use as vaccines have recently been reported and described a lipopeptide building block containing the coiled coil (IEKKIEA)$_4$ known to form trimeric parallel helical bundles fused to the promiscuous CD4+ T-helper epitope (IEKKIAKMEKASSVENVVNS) identified in the circumsporozoite (CS) protein of the malaria parasite Plasmodium falciparum has been described (A. Ghasparian, et al., ChemBioChem 2011, 12, 100-109). The T-helper epitope corresponds (with two Cys-to-Ala substitutions) to residues 379-398 of the CS protein, and is recognized by mouse and human T cells in association with a wide variety of different MHC class II molecules (J. Kilgus, et al., J. Immunol. 1991, 146, 307; F. Sinigaglia, et al., Nature 1988, 336, 778). Said described lipopeptide building block is completed by addition of KKKC at the C-terminus, to allow conjugation of a B-cell epitope through the cysteine thiol and by adding a lipid moiety at the N-terminus, comprising either a phospholipid related to phosphatidylethanolamine, or Pam$_2$Cys or Pam$_3$Cys moieties (A. Ghasparian, et al., ChemBioChem 2011, 12, 100-109). The Pam$_3$Cys moiety, i.e. tripalmitoyl-S-glyceryl cysteine (N-palmitoyl-S-(2,3-bis-(O-palmitoyloxy)-propyl)-cysteinyl-) and the Pam$_2$Cys moiety, i.e. dipalmitoyl-S-glyceryl cysteine (2,3-bis-(O-palmitoyloxy)-propyl)-cysteinyl-), are known to skilled person in the art and have been well described (Ghielmetti, M., et al., Immunobiology, 2005, 210, 211-215; Reutter, F., et al., J. Pept. Res., 2005, 65, 375-383; Buwitt-Beckmann, U., et al., Eur. J. Immunol., 2005, 35, 1-8).

Despite the recent advances in the development of lipopeptide building blocks and SVLPs, in particular, SVLP-based vaccine candidates, respectively, there is still a need for further and even more effective lipopeptide building blocks and SVLPs, respectively, specifically in order to further enhance the quality of the induced immune responses.

SUMMARY OF THE INVENTION

We have now surprisingly found that lipopeptide building blocks comprising Pam$_2$Cys or Pam$_3$Cys moieties with the (R)-configuration at the 2-propyl carbon atom and further comprising as coiled coil peptide chain segment several units of the sequence IEKKIE-X0 with preferably X0 being Gly, Ala or Ser, most preferably Ser, showed increased avidity of the antibodies generated to antigens linked to the inventive lipopeptide building blocks and comprised by the inventive conjugates or SVLPs, respectively.

Thus, in a first aspect, the present invention provides a lipopeptide building block consisting of
(i) a peptide moiety comprising a coiled coil peptide chain segment, wherein said coiled coil peptide chain segment comprises 3 to 8 repeat units, and wherein said repeat unit consists of the sequence IEKKIE-X0 (SEQ ID NO:58), wherein X0 represents an amino acid, and wherein preferably said repeat unit consists of the sequence selected from IEKKIEG (SEQ ID NO:59), IEKKIEA (SEQ ID NO:12) or IEKKIES (SEQ ID NO:13), and wherein further preferably said repeat unit consists of the sequence IEKKIES (SEQ ID NO:13);
(ii) a lipid moiety comprising, preferably consisting of, the formula LM-I

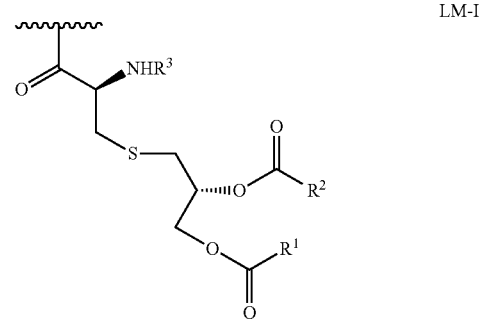

LM-I wherein R$^1$ and R$^2$ are independently C$_{11-15}$ alkyl, wherein preferably R$^1$ and R$^2$ are independently —C$_{11}$H$_{23}$, —C$_{13}$H$_{27}$ or —C$_{15}$H$_{31}$, and wherein further preferably R$^1$ and R$^2$ are —C$_{15}$H$_{31}$; and wherein R$^3$ is hydrogen or —C(O) C$_{11-15}$ alkyl, and wherein preferably R$^3$ is H or —C(O) C$_{15}$H$_{31}$;
and wherein said lipid moiety is linked to said peptide moiety, wherein the wavy line in formula LM-I indicates the linkage site to said peptide moiety, and wherein preferably said lipid moiety is linked to the N-terminus of said peptide moiety.

In a further aspect, the present invention provides a conjugate comprising (a) a lipopeptide building block of the present invention and (b) an antigen, wherein said antigen is connected, directly or via a linker, to said lipopeptide building block.

In a further aspect, the present invention provides a conjugate comprising (a) a lipopeptide building block of the present invention and (b) an antigen, wherein said antigen is connected, directly or via a linker, to said lipopeptide building block.

In another aspect, the present invention provides for a bundle of conjugates comprising 2, 3, 4, 5, 6 or 7, preferably 2, 3, 4 or 5, more preferably 3, of the inventive conjugate.

In another aspect, the present invention provides for a synthetic virus-like particle comprising at least one bundle of conjugates of the present invention.

In another aspect, the present invention provides for a pharmaceutical composition comprising an immunologically effective amount of the conjugate of the present invention or the synthetic virus like particle of the present invention, together with a pharmaceutically acceptable diluent, carrier or excipient, wherein preferably said pharmaceutical composition is a vaccine.

In again another aspect, the present invention provides for the conjugate of the present invention or the synthetic virus like particle of the present invention for use as a medicament.

In again another aspect, the present invention provides for the conjugate of the present invention or the synthetic virus like particle of the present invention for use in a method for preventing a disease or for reducing the risk of a disease, wherein further preferably said disease is an infectious disease, a cancer or an allergy, and again more preferably wherein said disease is an respiratory syncytial virus (RSV) infection.

In again another aspect, the present invention provides for the conjugate of the present invention or the synthetic virus like particle of the present invention for use in a method for preventing a disease or for reducing the risk of a disease or for treating a disease, wherein further preferably said disease is an infectious disease, a cancer or an allergy, and again more preferably wherein said disease is an respiratory syncytial virus (RSV) infection. In again another aspect, the present invention provides for the conjugate of the present invention or the synthetic virus like particle of the present invention for use in a method for preventing of an infectious disease or reducing the risk of an infectious disease, preferably for use in a method for preventing or reducing the risk of an infectious disease associated with or caused by a respiratory syncytial virus.

Further aspects and embodiments of the present invention will become apparent as this description continues.

BRIEF DESCRIPTION OF FIGURES

FIG. 1 shows mean avidity indexes of conjugates 44, 45 and 46 as determined in immunogenicity studies as described in Example 4.

DETAILED DESCRIPTION OF THE INVENTION

Unless defined otherwise, all technical and scientific terms used herein have the same meaning as commonly understood by one of ordinary skill in the art to which this invention belongs.

Throughout this specification and the claims, which follow, unless the context requires otherwise, the term "comprise" and its variations such as "comprises" and "comprising" etc., are to be understood as a non-exhaustive wording and imply the inclusion of a stated feature or element but not the exclusion of any other feature or element. The term "comprise" and its variations cover the term "consisting of". As used in this specification and the appended claims, the singular forms "a", "an", and "the" include plural referents, unless the content clearly dictates otherwise. The terms "reduce", "inhibit" or "decrease", as used herein, include a just detectable reduction but also a reduction down to zero (reduction by 100%).

A peptide or peptide moiety, as defined herein, is any peptide-bond-linked chain of amino acids, regardless of length, secondary and tertiary structure, number of subunits or posttranslational modification. Thus, the term "peptide" of "peptide moiety" is to be understood as covering the terms "polypeptide", "protein", "amino acid chain" and "polypeptide chain". Amino acids included in the peptide of the invention are proteinogenic, non-proteinogenic and synthetic amino acids. Peptides can be an open linear peptide chain or cyclic peptides; and may include at least one chemical modification, such as lipidation, glycosylation and phosphorylation. Peptides can be produced by chemical synthesis, RNA translation and/or recombinant processes.

The term "cyclic peptide", as used herein, refers to a peptide in which the amino acid chain forms at least one ring structure by a covalent bond. The cyclic peptide of the invention comprises two ring structures each formed by a disulfide bond: Side chains of cysteines C4 and C25 are linked forming a first disulfide bond, and side chains of cysteines C8 and C21 are linked forming a second disulfide bond.

The term "amino acid", as used herein, refers to organic compounds containing the functional groups amine (—NH2) and carboxylic acid (—COOH) and its zwitterions, typically and preferably, along with a side chain specific to each amino acid. The term "amino acid" typically and preferably includes amino acids that occur naturally, such as proteinogenic amino acids (produced by RNA-translation), non-proteinogenic amino acids (produced by other metabolic mechanisms, e.g. posttranslational modification), standard or canonical amino acids (that are directly encoded by the codons of the genetic code) and non-standard or non-canonical amino acids (not directly encoded by the genetic code). Naturally occurring amino acids include non-eukaryotic and eukaryotic amino acids.

The term "amino acid", as used herein, also includes unnatural amino acids that are chemically synthesized; alpha- ($\alpha$-), beta- ($\beta$-), gamma- ($\gamma$-) and delta- ($\delta$-) etc. amino acids as well as mixtures thereof in any ratio; and, if applicable, any isomeric form of an amino acid, i.e. its D-stereoisomers (labelled with a lower-case initial letter) and L-stereoisomers (labelled with a capital initial letter) (alternatively addressed by the (R) and(S) nomenclature) as well as mixtures thereof in any ratio, preferably in a racemic ratio of 1:1. Amino acids in this invention are preferably in L-configuration, unless mentioned specifically as D-configuration. The term "D-stereoisomer", "L-stereoisomer", "D-amino acid" or "L-amino acid" refers to the chiral alpha carbon of the amino acids. Amino acid can include one or more modifications and/or attached groups, for example protecting groups used for peptide synthesis, such as Boc, Fmoc or both. The term "deletion" refers herein to a position in an amino acid sequence that is not occupied by an amino acid. In a preferred embodiment of the present invention, an amino acid is a naturally occurring amino acid, wherein said naturally occurring amino acid is in its L-configuration, in its D-configuration, or in a mixture of any ratio of said L-configuration and D-configuration. In a further preferred embodiment of the present invention, an amino acid is a naturally occurring amino acid, wherein said naturally occurring amino acid is in its L-configuration.

The term "antigen" as used herein, should refer to molecules capable of being bound by an antibody. The antigen may comprise a peptide, a protein or an epitope mimetic having one or more B-cell epitopes that are to be used to elicit an antigen-specific humoral immune response in an animal. Alternatively, the antigen may comprise a hapten or a carbohydrate. Suitable peptide and protein antigens comprise up to 150 amino acids and include glycopeptides and glycoproteins. Peptide and protein sequences may be so chosen as to elicit an immune response, for example against one or more varieties of infectious agents. Such antigens are well known in the art. An epitope mimetic is a molecule mimicking a natural peptidic or carbohydrate epitope, including peptidic compounds containing one or more non-natural amino acids, e.g. D-amino acids, β-amino acids, γ-amino acids, δ-amino acids, or ¿-amino acids, and other replacements known in the art of epitope mimics. Preferred are conformationally constrained peptidomimetics, which are fixed in a protein-like conformation. Haptens refer to organic compounds with a molecular weight of less than 3,000, which do not elicit humoral immune responses by themselves, but will elicit an immune response once attached to a carrier. Exemplary haptens include drugs, hormones, toxins and carbohydrates.

The term "N-terminus", as used herein, refers to an end of a peptide having a free (—NH$_2$) or modified amino or amine group. Preferred N-terminal modifications are those that protect the N-terminus from proteolytic degradation. N-terminal modifications in accordance with the invention include but are not limited to acetylation, attachment of at least one polymer, preferably polyethylene glycol (PEGylation) or poly(lactic acid), or attachment of at least one amino acid, preferably of at least one D-amino acid, or attachment of at least one compound, such as a cell penetrating peptide, nucleic acid, a carbamate, such as fluorenylmethoxycarbamate or benzyloxy carbamate, aldehyde, hydrazinonicotinic acid, 4-formyl benzamide, methyl, myristoyl, prenyl group, palmitoyl, ubiquitin, 7-methoxycoumarin acetic acid (Mca), dansyl, formyl, 4-dibiphenyl, pyroglutamyl, urea, carbamate, sulphonamide, alkylamine, fatty acids, such as palmitic acids, radioligand, quencher, fluorescein or another dye or label such as biotin.

The term "C-terminus", as used herein, refers to an end of a peptide having a free (—COOH) or modified carboxyl group. Preferred C-terminal modifications are those that protect the C-terminus from proteolytic degradation. C-terminal modifications in accordance with the invention include but are not limited to amidation or attachment of at least one amino acid, preferably of at least one D-amino acid, or attachment of at least one compound, such as a cell penetrating peptide, nucleic acid, polyethylene glycol (PEGylation), thiol, ester, aldehyde, sulphonamide, pNA (paranitroanilide), Amc (7-amino-4-methylcoumarinyl), hydrazide, hydroxamic acid, chloromethyl ketone, biotin, radioligand, quencher, Abz or other dyes and labels. Herein and by general convention, peptide sequences are written from N-terminal on the left to C-terminal on the right (according to the direction of translation).

As used herein, the term "coiled coil peptide chain segment" is a sequence of a peptide chain capable of forming a coiled coil (super coil) with at least one other coiled coil peptide chain segment. A coiled coil is a peptide structure in which at least two coiled coil peptide chain segments, each having preferably an alpha helical secondary structure, are associated into a bundle. Coiled coil peptide chain segments of the invention contain multiple repeat units, typically and preferably consecutively linked to each other. The repeat units of the coiled coil peptide chain segment may be identical or may be different, e.g. may contain at least one discontinuity, such as an insertion, deletion or exchange of at least one, preferably exactly 1, 2, 3 or 4 amino acids within the repeat unit.

In a first aspect, the invention provides a lipopeptide building block consisting of
(i) a peptide moiety comprising a coiled coil peptide chain segment, wherein said coiled coil peptide chain segment comprises 3 to 8 repeat units, and wherein said repeat unit consists of the sequence IEKKIE-X0 (SEQ ID NO:58), wherein X0 represents an amino acid, and wherein preferably said repeat unit consists of the sequence selected from IEKKIEG (SEQ ID NO:59), IEKKIEA (SEQ ID NO:12) or IEKKIES (SEQ ID NO:13), and wherein further preferably said repeat unit consists of the sequence IEKKIES (SEQ ID NO:13);
(ii) a lipid moiety comprising, preferably consisting of, the formula LM-I

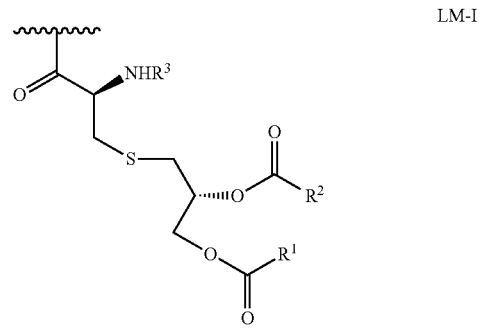

LM-I wherein $R^1$ and $R^2$ are independently $C_{11\text{-}15}$ alkyl, wherein preferably $R^1$ and $R^2$ are independently —$C_{11}H_{23}$, —$C_{13}H_{27}$ or —$C_{15}H_{31}$, and wherein further preferably $R^1$ and $R^2$ are —$C_{15}H_{31}$; and wherein $R^3$ is hydrogen or —C(O) $C_{11\text{-}15}$ alkyl, and wherein preferably $R^3$ is H or —C(O) $C_{15}H_{31}$;
and wherein said lipid moiety is linked to said peptide moiety, wherein the wavy line in formula LM-I indicates the linkage site to said peptide moiety, and wherein preferably said lipid moiety is linked to the N-terminus of said peptide moiety.

In a preferred embodiment, said coiled coil peptide chain segment of said peptide moiety consists of 3 to 8 repeat units including 3, 4, 5, 6, 7, 8 repeat units, more preferably four repeat units. The upper number of repeat units in the peptide moiety influences the stability of the coiled coil. In a preferred embodiment, said coiled coil peptide chain segment of said peptide moiety comprises or preferably consists of 4 repeat units. In a preferred embodiment, said coiled coil peptide chain segment of said peptide moiety consists of 4 repeat units. In a preferred embodiment, said 4 repeat units are consecutively linked to each other.

Coiled coil peptide chain segments of the invention are based on canonical repeat units, typically and preferably canonical tandem heptad repeats that form right-handed amphipathic alpha-helices, which then assemble to form helical bundles with left-handed coiled coils.

Repeat units of coiled coil peptide chain segments have a sequence with a certain number of amino acids, wherein the positions of the amino acids are traditionally labelled as lowercase letters. Design rules are discussed in more detail, for example, in Woolfson, D. N., Adv. Prot. Chem. 2005, 70, 79-112.

In the invention, said repeat unit of the coiled coil peptide chain segments consists of seven amino acids, wherein the seven amino acid positions are designated with letters a, b, c, d, e, f and g. In a preferred embodiment, said heptad motif consist of the sequence IEKKIE-X0 (SEQ ID NO:58), wherein X0 represents an amino acid. In a preferred embodiment, said repeat unit consists of the sequence IEKKIE-X0 (SEQ ID NO:58), wherein X0 represents an amino acid provided that said X0 is not proline. In another preferred embodiment, said repeat unit consists of the sequence IEKKIE-X0 (SEQ ID NO:58), wherein X0 represents an amino acid, wherein said amino acid is a naturally occurring amino acid, wherein said naturally occurring amino acid is in its L-configuration, in its D-configuration, or in a mixture of any ratio thereof, provided that said amino acid is not proline. In another preferred embodiment, said repeat unit consists of the sequence IEKKIE-X0 (SEQ ID NO:58), wherein X0 represents an amino acid, wherein said amino acid is a naturally occurring amino acid in its L-configuration.

In a preferred embodiment, said repeat unit consists of the sequence selected from IEKKIEG (SEQ ID NO:59), IEKKIEA (SEQ ID NO:12) or IEKKIES (SEQ ID NO:13). In a preferred embodiment, said repeat unit consists of the sequence selected from IEKKIEA (SEQ ID NO: 12) or IEKKIES (SEQ ID NO:13). In a preferred embodiment, said repeat unit consists of the sequence IEKKIEG (SEQ ID NO:59). In a preferred embodiment, said repeat unit consists of the sequence IEKKIEA (SEQ ID NO:12). In a very preferred embodiment, said repeat unit consists of the sequence IEKKIES (SEQ ID NO:13).

In a preferred embodiment, said coiled coil peptide chain segment comprises, or preferably consists of, the sequence selected from (IEKKIEG) 4 (SEQ ID NO:60), (IEKKIEA) 4 (SEQ ID NO:61) or (IEKKIES) 4 (SEQ ID NO:62). In a preferred embodiment, said coiled coil peptide chain segment consists of the sequence selected from (IEKKIEG) 4 (SEQ ID NO:60), (IEKKIEA) 4 (SEQ ID NO:61) or (IEKKIES) 4 (SEQ ID NO:62). In a preferred embodiment, said coiled coil peptide chain segment comprises, or preferably consists of, the sequence (IEKKIEG) 4 (SEQ ID NO:60). In a preferred embodiment, said coiled coil peptide chain segment consists of, the sequence (IEKKIEG) 4 (SEQ ID NO:60).

In a preferred embodiment, said coiled coil peptide chain segment comprises, or preferably consists of, the sequence (IEKKIEA) 4 (SEQ ID NO:61). In a preferred embodiment, said coiled coil peptide chain segment consists of, the sequence (IEKKIEA) 4 (SEQ ID NO:61).

In a very preferred embodiment, said coiled coil peptide chain segment comprises, or preferably consists of, the sequence (IEKKIES) 4 (SEQ ID NO:62). In a very preferred embodiment, said coiled coil peptide chain segment consists of the sequence (IEKKIES) 4 (SEQ ID NO: 62).

In a preferred embodiment, said $R^1$ and $R^2$ are independently —$C_{11}H_{23}$, —$C_{13}H_{27}$ or —$C_{15}H_{31}$. In a very preferred embodiment, said $R^1$ and $R^2$ are —$C_{15}H_{31}$. In a preferred embodiment, said $R^3$ is H or —C(O) $C_{15}H_{31}$.

In a preferred embodiment, said $R^1$ and $R^2$ are independently —$C_{11}H_{23}$, —$C_{13}H_{27}$ or —$C_{15}H_{31}$, and $R^3$ is hydrogen or —C(O) $C_{11-15}$ alkyl. In a very preferred embodiment, said $R^1$ and $R^2$ are —$C_{15}H_{31}$, and $R^3$ is hydrogen or —C(O) $C_{11-15}$ alkyl.

In a preferred embodiment, said $R^1$ and $R^2$ are independently —$C_{11}H_{23}$, —$C_{13}H_{27}$ or —$C_{15}H_{31}$, and $R^3$ is H or —C(O) $C_{15}H_{31}$. In a very preferred embodiment, said $R^1$ and $R^2$ are —$C_{15}H_{31}$, and $R^3$ is H or —C(O) $C_{15}H_{31}$.

In a preferred embodiment, said lipid moiety is linked to the N-terminus of said peptide moiety. This conveniently allows that said linking can be performed on-resin after assembly of the peptide chain of said peptide moiety by solid phase peptide synthesis. Linking of said lipid moiety to the C-terminus of said peptide moiety is also encompassed within the present invention and is possible using linkage chemistry known by the skilled person in the art.

In a preferred embodiment, said peptide moiety has a length of 12 to 200 amino acids, more preferably of 21 to 120 amino acids, again more preferably of 21 to 80 amino acids, again more preferably of 21 to 70 amino acids again more preferably of 21 to 60 amino acids again more preferably of 21 to 50 amino acids, again more preferably said peptide moiety has a length of 28 to 48 amino acids. Preferred peptide moieties are non-human sequences to avoid the risk of autoimmune disorders when applied in the vaccination of humans.

A preferred lipid moiety is di-palmitoyl-S-glycerylcysteinyl (Pam$_2$Cys) or tripalmitoyl-S-glyceryl cysteine (Pam$_3$Cys), both with the R-configuration at the chiral 2-propyl carbon atom and the R-configuration of the chiral carbon of the cysteinyl moiety.

In a preferred embodiment, the lipid moiety is linked to the peptide moiety, either directly or via a coupling moiety. Preferably, the lipid moiety is linked to the peptide moiety at or near one terminus, i.e. the N-terminus or the C-terminus, preferably the N-terminus. In a preferred embodiment, the lipid moiety is linked to the first, second, third, fourth or fifth amino acid of the peptide moiety, calculated from the N-terminus or C-terminus of the peptide moiety. The lipid moiety may be linked, directly or through a coupling moiety, to the backbone or to the side chain of one of the amino acids of the peptide moiety, preferably said amino acid is near to the terminus, more preferably it is the first, second, third, fourth or fifth amino acid of the peptide moiety.

The lipid moiety is attached to the peptide moiety directly, or via a coupling moiety. If the peptide moiety and the lipid moiety are directly linked, this is preferably accomplished through an amide bond between a lipid moiety carbonyl function and an amino function, e.g. the N-terminal amino function, of the peptide moiety. It will be apparent to the skilled person in the art that a large variety of suitable coupling moieties and coupling strategies exist, which include but are not limited to linkers based on dicarboxylic acid derivatives, linkers containing one or multiple ethylene glycol units, amino acid residues (including alpha-, beta-, gamma-, omega-amino acids), or sugar (carbohydrate) units, or containing heterocyclic rings.

In a preferred embodiment, said lipid moiety comprises, preferably consists of, the formula LM-I*

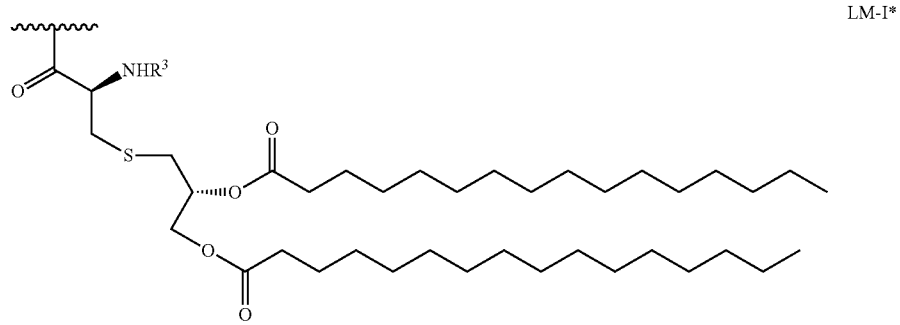

LM-I* wherein $R^3$ is hydrogen or —C(O) $C_{11-15}$ alkyl, preferably H or —C(O) $C_{15}H_{31}$; wherein preferably said lipid moiety is linked to the N-terminus of said peptide moiety.

In a preferred embodiment, said lipid moiety consists of the formula LM-I*, wherein $R^3$ is hydrogen or —C(O) $C_{11-15}$ alkyl. In a preferred embodiment, said lipid moiety comprises, preferably consists of, the formula LM-I*, wherein $R^3$ is H or —C(O) $C_{15}H_{31}$. In a preferred embodiment, said lipid moiety comprises, preferably consists of, the formula LM-I*, wherein $R^3$ is H or —C(O) $C_{15}H_{31}$ and wherein said lipid moiety is linked to the N-terminus of said peptide moiety. In a preferred embodiment, said lipid moiety consists of, the formula LM-I*

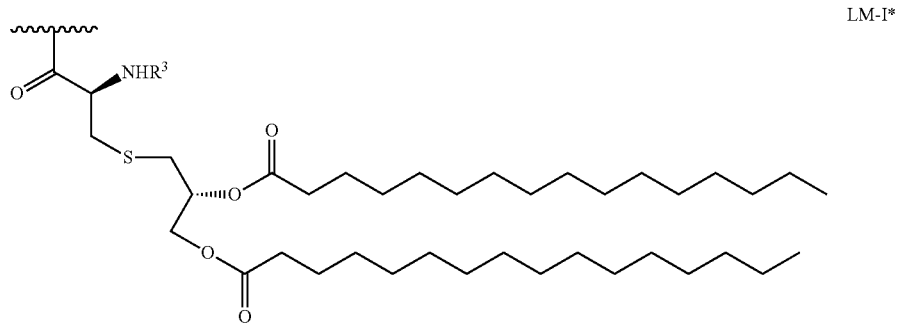

LM-I* wherein $R^3$ is H or —C(O) $C_{15}H_{31}$ and wherein preferably said lipid moiety is linked to the N-terminus of said peptide moiety.

In a very preferred embodiment, said lipid moiety comprises, preferably consists of, the formula LM-I*1 or LM-I*2. In a very preferred embodiment, said lipid moiety consists of the formula LM-I*1 or LM-I*2.

In a very preferred embodiment, said lipid moiety consists of the formula LM-I*1.

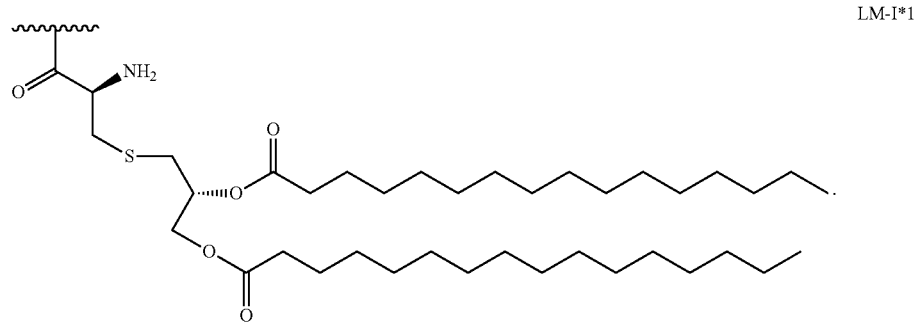 [SMILES: *C(=O)[C@@H](N)CSC[C@@H](COC(=O)CCCCCCCCCCCCCCC)OC(=O)CCCCCCCCCCCCCCC]

LM-I*1

In a very preferred embodiment, said lipid moiety consists of the formula LM-I*2.

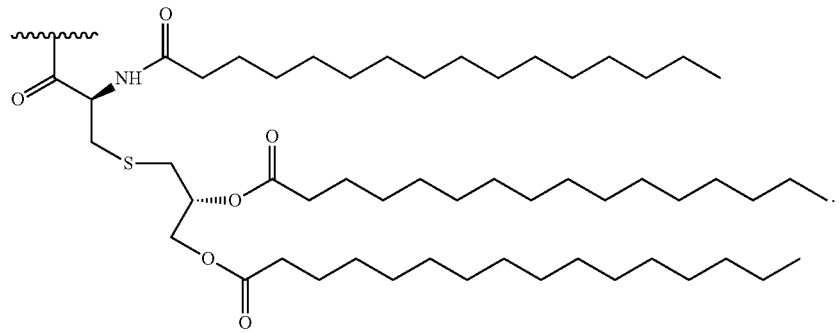

LM-I*2

Very preferred lipid moieties of the present invention are, thus, (R,R)-Pam₃Cys LM-I*2, i.e. tripalmitoyl-S-glyceryl cysteine (N-palmitoyl-S-(2,3-bis-(O-palmitoyloxy)-(2R)-propyl)-(R)-cysteinyl-) and (R,R)-Pam₂Cys LM-I*1, i.e. dipalmitoyl-S-glyceryl cysteine (2,3-bis-(O-palmitoyloxy)-(2R)-propyl)-(R)-cysteinyl-).

Thus, in a further very preferred embodiment, said lipid moiety is N-α-Palmitoyl-S-[2,3-bis(palmitoyloxy)-(2R)-propyl]-(R)-cysteine or S-[2,3-bis(palmitoyloxy)-(2R)-propyl]-(R)-cysteine, thus LM-I*1.

In a further preferred embodiment, said peptide moiety comprises (i) an N-terminal amino acid sequence, wherein said N-terminal amino acid sequence comprises or preferably consists of fibroblast-stimulating lipopeptide FSL-1 (S-(2,3-bispalmitoyloxypropyl)- or PAM2-Cys-Gly-Asp-Pro-Lys-His-Pro-Lys-Ser-Phe; SEQ ID NO:7), FSL-2 (S-(2,3-bispalmitoyloxypropyl)- or PAM2-Cys-Gly-Asp-Pro-Lys-His-Pro-Lys-Ser-Arg; SEQ ID NO: 8), FSL-3 (S-(2,3-bisstearyloxypropyl)-Cys-Gly-Asp-Pro-Lys-His-Pro-Lys-Ser-Phe; SEQ ID NO: 9), *Mycoplasma fermentans*-derived peptide MALP-2 (S-(2,3-bispalmitoyloxypropyl)- or PAM2-Cys-Gly-Asn-Asn-Asp-Glu-Ser-Asn-Ile-Ser-Phe-Lys-Glu-Lys; SEQ ID NO:10), or GG; and/or GX where X is Asx or Ser and/or (ii) a C-terminal amino acid sequence, wherein said C-terminal amino acid sequence comprises or preferably consists of a sequence recognized by an enzyme as cleavage site; wherein preferably said C-terminal amino acid sequence comprises or preferably consists of sequence KKKCa (SEQ ID NO:11) or wherein preferably said C-terminal amino acid sequence is an amino acid sequence of consecutive 5 amino acids.

In a preferred embodiment, said lipid moiety and said peptide moiety are directly linked. In a preferred embodiment, said lipid moiety and said peptide moiety are linked via a coupling moiety. In a preferred embodiment, said lipid moiety and said peptide moiety are linked via a coupling moiety, wherein said coupling moiety is an amino acid linker consisting of 2-15 amino acids. Examples hereto include the amino acid linker sequences comprised by FSL-1, FSL-2, FSL-3, PAM2 or MALP-2 moieties. In a preferred embodiment, said lipid moiety and said peptide moiety are linked via a coupling moiety, wherein said coupling moiety is an amino acid linker consisting of 2-10 amino acids. In a preferred embodiment, said lipid moiety and said peptide moiety are linked via a coupling moiety, wherein said coupling moiety is an amino acid linker consisting of 2-5 amino acids. In a preferred embodiment, said lipid moiety and said peptide moiety are linked via a coupling moiety, wherein said coupling moiety is an amino acid linker, wherein said amino acid linker is a Gly-Gly moiety. In a preferred embodiment, said lipid moiety and said peptide moiety are linked via a coupling moiety, wherein said coupling moiety is a Gly-Gly moiety.

In a preferred embodiment, said direct linking of said lipid moiety and said peptide moiety is by way of an amide bond between a carbonyl function of said lipid moiety and an amino function of said peptide moiety.

In a preferred embodiment, said linking of said lipid moiety and said peptide moiety via said coupling moiety is by way of an amide bond between a carbonyl function of said lipid moiety and an amino function of said coupling moiety.

In a preferred embodiment, said linking of said lipid moiety and said peptide moiety via said coupling moiety is by way of an amide bond between a carbonyl function of said lipid moiety and an amino function of said coupling moiety, wherein said coupling moiety is an amino acid linker, preferably consisting of 2-15 amino acids, preferably 2-10 amino acids, and wherein said amino function is the N-terminal amino function of said coupling moiety.

In a preferred embodiment, said linking of said lipid moiety and said peptide moiety via said coupling moiety is by way of an amide bond between a carbonyl function of said lipid moiety and an amino function of said coupling moiety, wherein said coupling moiety is an amino acid linker, preferably consisting of 2-5 amino acids, and wherein said amino function is the N-terminal amino function of said coupling moiety.

In a preferred embodiment, said direct linking of said lipid moiety and said peptide moiety is by way of an amide bond between a carbonyl function of said lipid moiety and an amino function of said peptide moiety, wherein said amino function is the N-terminal amino function of said peptide moiety.

In a preferred embodiment, two Gly residues are included as linker between the lipid moiety, preferably said (R,R)-Pam₂Cys moiety LM-I*1 of the present invention and the start of the coiled-coil heptad repeats, typically and preferably the coiled coil peptide chain segment comprising, preferably consisting of, the sequence IEKKIES (SEQ ID NO:13).

The introduction of an amino acid linker, and preferably a short amino acid linker consisting of two amino acids, preferably glycine, allows during peptide synthesis that after each amino acid coupling, a capping step can be performed with acetic anhydride. This has the practical advantage that after completion of peptide assembly, and coupling of the lipid moieties, preferably the lipid moieties consisting of the formula LM-I*1 [(R,R)-Pam₂Cys moiety] or formula LM-I*2 [(R,R)-Pam₃Cys moiety] to the free N-terminus, the HPLC retention time of the peptide is dramatically altered by lipidation, thus greatly facilitating HPLC purification of the desired lipopeptide building block of the present invention.

In a preferred embodiment, said peptide moiety further comprises a T-helper cell epitope. In a preferred embodiment, said peptide moiety further comprises a T-helper cell epitope, wherein said T-helper cell epitope comprises or preferably consists of a sequence selected from the group consisting of (i) SEQ ID NO:6, SEQ ID NO:63 to SEQ ID NO:87 and (ii) SEQ ID NO: 6, SEQ ID NO:63 to SEQ ID NO:87, wherein one, two, or three amino acids are exchanged by other amino acids or are deleted. In a preferred embodiment, said peptide moiety further comprises a T-helper cell epitope, wherein said T-helper cell epitope consists of a sequence selected from the group consisting of (i) SEQ ID NO:6, SEQ ID NO:63 to SEQ ID NO:87 and (ii) SEQ ID NO:6, SEQ ID NO:63 to SEQ ID NO:87, wherein one, two, or three amino acids are exchanged by other amino acids or are deleted. In a preferred embodiment, said peptide moiety further comprises a T-helper cell epitope, wherein said T-helper cell epitope comprises a sequence selected from the group consisting of SEQ ID NO:6, SEQ ID NO:63 to SEQ ID NO: 87. In a preferred embodiment, said T-helper cell epitope consists of a sequence selected from the group consisting of SEQ ID NO:6, SEQ ID NO:63 to SEQ ID NO:87.

In one embodiment, said peptide moiety further comprises an amino acid sequence which includes one or more T-helper cell epitopes, and/or strings of polar residues that promote the solubility of the lipopeptide building block in water. Suitable T-helper cell epitopes are known to the skilled person in the art and are described, e.g., in Weber et al., Advanced Drug Delivery Reviews, 2009, 61:11, 965-976; Caro-Aguilar et al., Infect. Immun., 2002, 70:7, 3479-3492; Mishra et al., Immunology, 1993, 79:3, 362-367; Kobayashi et al., Cancer Research, 2000, 60:18, 5228-523; Fraser et al., Vaccine, 2014, 32:24, 2896-2903; Grabowska et al., Int. J. Cancer, 2015, 136:1, 212-224 and WO1998/023635A1. More preferred T-helper cell epitopes included in the peptide moiety are those listed in WO 2015/082501 such TT830-843, TT1064-1079, TT1084-1099, TT947-968, TT1174-1189, DTD271-290, DTD321-340, DTD331-350, DTD351-370, DTD411-430, DTD431-450, TT632-651, CTMOMP36-60, TraT1, TraT2, TraT3, HbcAg50-69, HbSAg19-33, HA307-319, MA17-31, MVF258-277, MVF288-302, CS.T3, SM Th, PADRE1 and PADRE2 as well as variants thereof in which one, two, or three amino acids are inserted, replaced by other amino acids or deleted.

Preferred T-helper epitopes that can be incorporated into said peptide moiety are any one selected from the group listed in Table 1 below, and variants thereof in which one, two, or three amino acids are replaced by other amino acids or are deleted.

TABLE 1

| T-helper epitope | SEQ ID NO: | Sequence [a] |
|---|---|---|
| TT830-843 | 63 | QYIKANSKFIGITE |
| TT1064-1079 | 64 | IREDNNITLKLDRCNN |

TABLE 1-continued

| T-helper epitope | SEQ ID NO: | Sequence [a] |
|---|---|---|
| TT1084-1099 | 65 | VSIDKFRIFCKANPK |
| TT947-968 | 66 | FNNFTVSFWLRVPKVSASHLET |
| TT1174-1189 | 67 | LKFIIKRYTPNNEIDS |
| DTD271-290 | 68 | PVFAGANYAAWAVNVAQVID |
| DTD321-340 | 69 | VHHNTEEIVAQSIALSSLMV |
| DTD331-350 | 70 | QSIALSSLMVAQAIPLVGEL |
| DTD351-370 | 71 | VDIGFAAYNFVESIINLFQV |
| DTD411-430 | 72 | QGESGHDIKITAENTPLPIA |
| DTD431-450 | 73 | GVLLPTIPGKLDVNKSKTHI |
| TT632-651 | 74 | TIDKISDVSTIVPYIGPALN |
| CTMOMP36-60 | 75 | ALNIWDRFDVFCTLGATTGYLKGNS |
| TraT1 | 76 | GLQGKIADAVKAKG |
| TraT2 | 77 | GLAAGLVGMAADAMVEDVN |
| TraT3 | 78 | STETGNQHHYQTRVVSNANK |
| HbcAg50-69 | 79 | PHHTALRQAILCWGELMTLA |
| HbSAg19-33 | 80 | FFLLTRILTIPQSLD |
| HA307-319 | 81 | PKYVKQNTLKLAT |
| MA17-31 | 82 | YSGPLKAEIAQRLEDV |
| MVF258-277 | 83 | GILESRGIKARITHVDTESY |
| MVF288-302 | 84 | LSEIKGVIVHRLEGV |
| CS.T3 | 6 | IEKKIAKMEKASSVFNVVNS |
| SM Th | 85 | KWFKTNAPNGVDEKIRI |
| PADRE1 [b] | 86 | aKFVAAWTLKAAa |
| PADRE2 [b] | 87 | aK-Chx-VAAWTLKAAa |

[a] References: SEQ ID NO: 63-67 and 17-20: Eur. J. Immunol. 2001, 31, 3816-3824; SEQ ID NO: 68-74: JID 2000, 181, 1001-1009; SEQ ID NO: 75-78, 83-84 and 85: U.S. 5,759,551; SEQ ID NO: 6: Nature 1988, 336, 778-780; SEQ ID NO: 86-87: Immunity 1994, 1, 751-761.
[b] „a" denotes D-Ala and „Chx" denotes cyclohexylalanine.

Thus, in a further preferred embodiment, said T-helper cell epitope comprises or preferably consists of a sequence selected from the group consisting of (i) SEQ ID NO:1 to SEQ ID NO:26 and (ii) SEQ ID NO:1 to SEQ ID NO:26, wherein one, two, or three amino acids are exchanged by other amino acids or are deleted.

In a preferred embodiment, said peptide moiety further comprises a T-helper cell epitope, wherein said T-helper cell epitope comprises or preferably consists of the amino acid sequence of SEQ ID NO:6. In a preferred embodiment, said peptide moiety further comprises a T-helper cell epitope, wherein said T-helper cell epitope consists of the amino acid sequence of SEQ ID NO:6. In a preferred embodiment, said T-helper cell epitope consists of the sequence of SEQ ID NO:6.

In a further very preferred embodiment, said peptide moiety comprises or preferably consists of (SEQ ID NO:88):

GGIEKKIESIEKKIESIEKKIESIEKKIESIEKKIAKME-KASSVFNVVNSKKKC. In a further very preferred embodiment, said peptide moiety consists of (SEQ ID NO:88).

In a further very preferred embodiment, said lipopeptide building block is of the formula LBB-2 or LBB-3, preferably of LBB-2

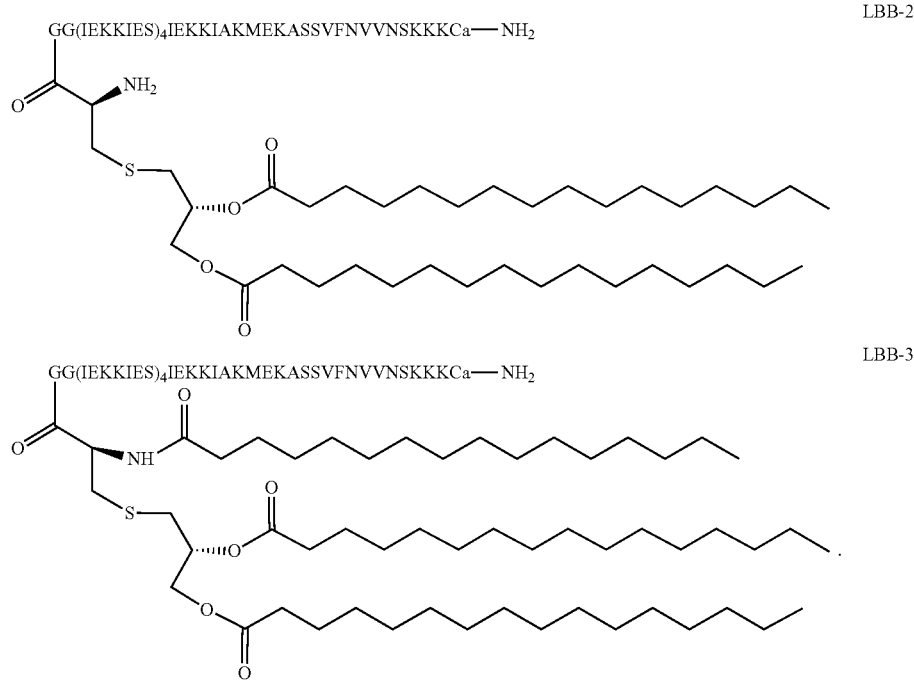

In a further very preferred embodiment, said lipopeptide building block is of the formula LBB-2. In a further very preferred embodiment, said lipopeptide building block is of the formula LBB-3.

In a further aspect, the present invention provides a lipopeptide building block consisting of
(i) a peptide moiety comprising a coiled coil peptide chain segment, and wherein said coiled coil peptide chain segment comprises, preferably consists of, the sequence of (SEQ ID NO:62);
(ii) a lipid moiety comprising, preferably consisting of, the formula LM-I

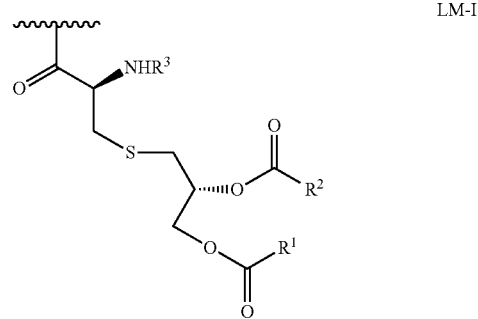

wherein $R^1$ and $R^2$ are independently $C_{11-15}$ alkyl, wherein preferably $R^1$ and $R^2$ are independently —$C_{11}H_{23}$, —$C_{13}H_{27}$ or —$C_{15}H_{31}$, and wherein further preferably $R^1$ and $R^2$ are —$C_{15}H_{31}$; and wherein $R^3$ is hydrogen or —C(O) $C_{11-15}$ alkyl, and wherein preferably $R^3$ is H or —C(O) $C_{15}H_{31}$;

and wherein said lipid moiety is linked to said peptide moiety, wherein the wavy line in formula LM-I indicates the linkage site to said peptide moiety, and wherein preferably said lipid moiety is linked to the N-terminus of said peptide moiety.

In a further aspect, the present invention provides a conjugate comprising (a) a lipopeptide building block of the present invention and (b) an antigen, wherein said antigen is connected, directly or via a linker, to said lipopeptide building block.

One or more antigens may be conjugated to the peptide moiety, for example, through one or more of the side chains of amino acids of the peptide moiety, or through the chain terminus of the peptide moiety. The antigen typically carries a functional group suitable for conjugation to a functional group in one of the side chains or the terminus of the peptide moiety. Preferred are antigens recognized by a B-cell receptor, or haptens, in order to elicit antigen-specific antibody-based immune responses.

A variety of coupling or conjugation procedures may be used to attach antigens to the peptide moiety, which will be well known to those knowledgeable in the field. Thus free amino groups in the side chains of amino acids in the peptide moiety of the LBB may be coupled to reactive esters in the antigen (e.g. N-hydroxysuccinimide esters prepared from carboxylic acids); thiols in the peptide moiety may be coupled to maleimide groups in the antigen; azides may be incorporated into the side chains of amino acid residues in the peptide moiety and coupled to antigens containing acetylene groups using copper catalyzed cycloaddition reactions; and other nucleophiles (e.g. hydrazino, hydroxylamino, vic-aminothiol groups) in the peptide may be coupled to electrophiles (e.g. aldehydes, ketones, active esters) in the antigen. It will be obvious that it is possible, in principle, to reverse the positions of the two reactive groups in the peptide chain and antigen in order to achieve selective coupling.

In a further preferred embodiment, said antigen is selected from a peptide, a protein, an epitope mimetic, a carbohydrate or a hapten.

In a further preferred embodiment, said antigen is derived from a source selected from the group consisting of: (a) viruses; (b) bacteria; (c) parasites, preferably protozoan parasites; (d) tumors; (e) self-molecules; (f) non-peptidic hapten molecules; (g) allergens and (h) hormones.

In another preferred embodiment, said antigen is selected from the group consisting of: (1) an antigen suited to induce an immune response against cancer cells; (2) an antigen suited to induce an immune response against infectious diseases; (3) an antigen suited to induce an immune response against allergens; (4) an antigen suited to induce an response against self-molecules; and (5) an antigen suited to induce a response against a drug or a hormone.

In another preferred embodiment, said antigen is a tumor antigen, a self antigen, a polypeptide of a pathogen, an allergen or a hapten.

In another preferred embodiment, said antigen is a tumor antigen, a self antigen, a polypeptide of a pathogen, an allergen or a hapten.

In another preferred embodiment, said antigen is derived from the circumsporozoite (CS) protein of the malaria parasite *Plasmodium falciparum*. In a further preferred embodiment, said antigen is antigen 43.

In another preferred embodiment, said antigen is a proline rich peptide antigen as described in WO 2015/082501 which is incorporated herein in its entirety by way of reference. In another preferred embodiment, said antigen comprises, preferably consists of, a peptide of SEQ ID NO:27 to 112 as defined in WO 2015/082501 or a peptide of SEQ ID NO:27 to 112 as defined in WO 2015/082501 in which one, two or three amino acids are replaced by other amino acid. In another preferred embodiment, said antigen comprises (i) a peptide of SEQ ID NO:27 to 112 as defined in WO 2015/082501 or (ii) a peptide of SEQ ID NO:27 to 112 as defined in WO 2015/082501 in which one, two or three amino acids are replaced by other amino acid, wherein said antigen consist of 8-80 amino acids, and wherein preferably said antigen consist of 8-60 amino acids, and wherein further preferably said antigen consist of 8-50 amino acids. In another preferred embodiment, said antigen comprises (i) a peptide of SEQ ID NO:27 to 112 as defined in WO 2015/082501 or (ii) a peptide of SEQ ID NO:27 to 112 as defined in WO 2015/082501 in which one, two or three amino acids are replaced by other amino acid, wherein said antigen consist of 8-80 amino acids, and wherein preferably said antigen consist of 8-60 amino acids, and wherein further preferably said antigen consist of 8-50 amino acids. In another preferred embodiment, said antigen comprises (i) a peptide of SEQ ID NO:27 to 83 as defined in WO 2015/082501 or (ii) a peptide of SEQ ID NO:27 to 83 as defined in WO 2015/082501 in which one, two or three amino acids are replaced by other amino acid, wherein said antigen consist of 8-80 amino acids, and wherein preferably said antigen consist of 8-60 amino acids, and wherein further preferably said antigen consist of 8-50 amino acids. In another preferred embodiment, said antigen comprises (i) a peptide of SEQ ID NOs: 27 to 36, 38 to 48, 50 to 55, 61 to 79, 81 to 83 as defined in WO 2015/082501 or (ii) a peptide of SEQ ID NOs: 27 to 36, 38 to 48, 50 to 55, 61 to 79, 81 to 83 as defined in WO 2015/082501 in which one, two or three amino acids are replaced by other amino acid, wherein said antigen consist of 8-80 amino acids, and wherein preferably said antigen consist of 8-60 amino acids, and wherein further preferably said antigen consist of 8-50 amino acids.

In another preferred embodiment, said antigen is a cyclic peptide comprising an amino acid sequence (I), wherein said amino acid sequence (I) comprises, preferably consists of, the amino acid sequence:

X1-X2-X3-$C_4$-X5-X6-X7-C8-X9-X10-X11-P12-I113-T14-N15-D16-Q17-K18-K19-L20-C21-X22-X23-X24-C25-X26-X27-X28-X29-X30 (SEQ ID NO:1), wherein X1, X2, X3, X5, X6, X7, X9, X10, X11, X22, X23, X24, X26, X27, X28 and X29 are independently of each other an amino acid;

C4, C8, C21 and C25 are independently of each other cysteine;

P12 is proline;

I13 is isoleucine;

T14 is threonine;

N15 is asparagine;

D16 is aspartic acid;

Q17 is glutamine;

K18 and K19 are independently of each other lysine;

L20 is leucine; and

X30 is an amino acid or a deletion, wherein said cysteines C4 and C25 form a first disulfide bond and said cysteines C8 and C21 form a second disulfide bond.

The cyclic peptides used in the present invention, when coupled to the inventive lipid building block leading to the inventive conjugates, or further and in particular when incorporated in the inventive synthetic virus-like particles (SVLPs), are able to elicit neutralizing and protective antibodies against the RSV virus, typically, without administration of an adjuvant. Human respiratory syncytial virus (RSV) is a member of the virus family Pneumoviridae and a highly contagious seasonal respiratory virus that infects the lungs and breathing passages. It can spread via droplets sneezed or coughed into the air by an infected person. In particular, RSV is a main cause of lower and upper respiratory tract infections and hospital visits in particular during infancy and childhood but affects older adults and immunocompromised persons as well. Due to high health costs associated with hospitalizations caused by RSV infections, there is a need for prophylaxis of RSV infections. An approach is active immunization by an RSV vaccine. Several different attempts for the generation of such a vaccine have been made (WO 2006/034292, US 2010/0239617, WO 2010/149745, WO2014/144756, WO 2012/048115), but none of the candidates evaluated to date have been approved as safe and effective vaccine for the purpose of preventing RSV infections.

In the used cyclic peptides, the specific disulfide bridges between cysteines C4 and C25 and cysteines C8 and C21 stabilize said peptides by a "helical hairpin" or "helix-turn-helix" conformation. Notably, peptides with no or only one disulfide bridge or with disulfide bridges at different positions have been found to fail to elicit neutralizing antibodies. Moreover, the used cyclic peptides are believed to be well-tolerated vaccines. Immune responses elicited by the cyclic peptides incorporated in SVLPs did not activate VAERD after life RSV infection.

Said cyclic peptides were produced using automated solid-phase peptide synthesis, wherein said disulfide bonds between cysteines C4 and C25 and cysteines C8 and C21 were obtained by oxidative refolding resulting in a beneficial spatial conformation.

In another preferred embodiment, said cyclic peptide has a length of at most 80 amino acids, preferably of at most 60 amino acids, more preferably of at most 40 amino acids, again more preferably of at most 30 amino acids.

In another preferred embodiment, said X11 is selected from norleucine, 6-hydroxy-norleucine, norvaline, 5-oxo-norleucine, 2-aminoheptanoic acid, methionine, ethionine, hydroxy-methionine, s-oxymethionine, methionine sulfone, or methionine sulfoxide, wherein preferably X11 is norleucine.

In another preferred embodiment, said X23 is selected from asparagine, beta-hydroxyasparagine, 2,5-diamino-4-hydroxy-5-oxopentanoic acid, glutamine, glutamine hydroxamate, 3-methyl-glutamine, n-methyl-asparagine, n5-methyl-glutamine, cysteine-s-acetamide; serine, homoserine, allo-threonine, 3,3-dihydroxy-alanine, 2-amino-5-hydroxypentanoic acid, 4-hydroxy-1-threonine, threonine, hydroxynorvaline, 6-hydroxy-1-norleucine or glycine; wherein preferably X23 is asparagine, serine, glutamine or glycine. In a further preferred embodiment, said X23 is serine. In a further preferred embodiment, said X23 is glutamine. In a further preferred embodiment, said X23 is glycine. In a further preferred embodiment, said X23 is asparagine.

In another preferred embodiment, said X24 is selected from asparagine, beta-hydroxyasparagine, 2,5-diamino-4-hydroxy-5-oxopentanoic acid, glutamine, glutamine hydroxamate, 3-methyl-glutamine, n-methyl-asparagine, n5-methyl-glutamine, cysteine-s-acetamide; lysine, 2,4-diaminobutyric acid, 2,3-diaminopropanoic acid, 2,8-diaminooctanoic acid, ornithine, amino-adipic acid, thialysine; aspartic acid, 2-amino-6-oxopimelic acid, 3-methyl-aspartic acid, 1-2-amino-6-methylene-pimelic acid, 4-hydroxy-glutamic-acid, 6-carboxylysine, beta-hydroxyaspartic acid, 3,3-dimethyl aspartic acid, 2-amino-propanedioic acid, glutamate, 5-o-methyl-glutamic acid, (3r)-3-methyl-1-glutamic acid, (3s)-3-methyl-1-glutamic acid, 2s,4r-4-methylglutamate 2-aminoadipic acid, serine, homoserine, allo-threonine, 3,3-dihydroxy-alanine, 2-amino-5-hydroxypentanoic acid, 4-hydroxy-1-threonine, threonine, hydroxynorvaline, 6-hydroxy-1-norleucine or glycine. In another preferred embodiment, X24 is selected from asparagine, lysine, ornithine, 2,4-diaminobutyric acid (Dab), glutamine, glycine or serine. In another preferred embodiment, X24 is glycine, glutamine or serine. In another preferred embodiment, X24 is serine. In another preferred embodiment, X24 is glutamine. In another preferred embodiment, X24 is glycine.

In another preferred embodiment, X11 is norleucine and X24 is selected from asparagine, lysine, ornithine, 2,4-diaminobutyric acid (Dab), glutamine, glycine or serine.

In another preferred embodiment, X11 is norleucine and X24 is serine. In another preferred embodiment, X11 is norleucine and X24 is glutamine. In another preferred embodiment, X11 is norleucine and X24 is asparagine. In another preferred embodiment, X11 is norleucine and X24 is aspartic acid. In another preferred embodiment, X11 is norleucine and X24 is asparagine. In another preferred embodiment, X11 is norleucine and X24 is ornithine. In another preferred embodiment, X11 is norleucine and X24 is 2,4-diaminobutyric acid. In another preferred embodiment, X11 is norleucine and X24 is lysine.

In another preferred embodiment, the C-terminal amino acid of said amino acid sequence (I) is selected from alanine, leucine, valine, norleucine, norvaline, isoleucine, homoleucine, vinylglycine, 2-aminobutyric acid, 2-allylglycine, alloleucine, alloisoleucine, 2-aminoheptanoic acid, serine, glutamine or glycine.

In another preferred embodiment, X11 is norleucine, X24 is selected from lysine, 2,4-diaminobutyric acid, aspartic acid, asparagine, serine, glutamine or glycine, and said C-terminal amino acid of said amino acid sequence (I) is selected from alanine, leucine, valine, norleucine, norvaline, isoleucine, homoleucine, vinylglycine, 2-aminobutyric acid, 2-allylglycine, alloleucine, alloisoleucine, or 2-aminoheptanoic acid. Preferably, said C-terminal amino acid of said amino acid sequence (I) is selected from alanine, leucine, valine, norleucine, norvaline, isoleucine, homoleucine, vinylglycine, 2-aminobutyric acid, 2-allylglycine, alloleucine, alloisoleucine, or 2-aminoheptanoic acid, further preferably or alternatively preferably, said C-terminal amino acid of said amino acid sequence (I) is a D-stereoisomer.

In another preferred embodiment, said C-terminal amino acid of said amino acid sequence (I) is selected from a D-stereoisomer of alanine, leucine, valine, norleucine, norvaline, isoleucine, homoleucine, vinylglycine, 2-aminobutyric acid, 2-allylglycine, alloleucine, alloisoleucine, or 2-aminoheptanoic acid. In another preferred embodiment, said C-terminal amino acid of said amino acid sequence (I) is alanine, preferably D-alanine.

In another preferred embodiment, said X1 is a polar or hydrophobic amino acid. In another preferred embodiment, said X1 is selected from asparagine, beta-hydroxyasparagine, 2,5-diamino-4-hydroxy-5-oxopentanoic acid, glutamine, glutamine hydroxamate, 3-methyl-1-glutamine, n-methyl-asparagine, n5-methyl-glutamine, cysteine-s-acetamide; leucine, alloleucine, alloisoleucine, homoleucine, isoleucine, 2-aminobutyric acid, norleucine, norvaline, valine; serine, homoserine, allo-thionine, 3,3-dihydroxyalanine, 2-amino-5-hydroxypentanoic acid, 4-hydroxy-1-threonine, threonine, hydroxynorvaline, 6-hydroxy-1-norleucine; or glycine. In another preferred embodiment, said X1 is selected from asparagine, glutamine, leucine, serine, or glycine. In another preferred embodiment, said X1 is glycine. In another preferred embodiment, said X1 is glutamine. In another preferred embodiment, said X1 is serine.

In another preferred embodiment, said X1, X23 and X24 are each independently selected from the group consisting of ornithine, aspartic acid, lysine, asparagine, 2,4-diaminobutyric acid (Dab), glutamine, leucine, serine, and glycine.

In another preferred embodiment, said X1, X23 and X24 are each independently selected from the group consisting of asparagine, 2,4-diaminobutyric acid (Dab), glutamine, leucine, serine, and glycine. In another preferred embodiment, said X1 is selected from glutamine, serine, or glycine; said X23 is serine; and said X24 is glutamine or serine.

In another preferred embodiment, said X2, X6 and X22 are independently of each other a polar amino acid. Preferably, X2, X6 and X22 are independently of each other selected of 2-amino-5-hydroxypentanoic acid, allo-threonine, 4-chloro-threonine, 3,3-dihydroxy-alanine, 4-hydroxy-L-isoleucine, (2s,3r)-2-amino-3-hydroxy-4-methylpentanoic acid, beta-hydroxy-leucine, homoserine, 3-hydroxy-1-valine, 4,5-dihydroxy-isoleucine, 6-hydroxy-1-norleucine, s-(2-hydroxyethyl)-l-cysteine, phosphoserine, serine, 4-hydroxy-1-threonine, threonine, phosphothreonine or hydroxynorvaline. In another preferred embodiment, X2, X6 and X22 are serine.

In another preferred embodiment, said X3 is an amino acid having an acidic or negatively charged side chain at a physiological pH (about pH 7). Preferably, X3 is selected of glutamate, 5-o-methyl-glutamic acid, (3r)-3-methyl-1-glutamic acid, (3s)-3-methyl-1-glutamic acid, 2s,4r-4-methylglutamate, 4-hydroxy-glutamic-acid, 2-aminoadipic acid, 1-2-amino-6-methylene-pimelic acid, 2-amino-6-oxopimelic acid; 3-methyl-aspartic acid, 6-carboxylysine, aspartic acid, beta-hydroxyaspartic acid, 3,3-dimethyl aspartic acid, or 2-amino-propanedioic acid. More preferably, X3 is selected of glutamate, 5-o-methyl-glutamic acid, (3r)-3-methyl-1-glutamic acid, (3s)-3-methyl-1-glutamic acid, 2s,4r-4-methylglutamate, 4-hydroxy-glutamic-acid, 2-aminoadipic acid, 1-2-amino-6-methylene-pimelic acid or 2-amino-6-oxopimelic acid. In another again more preferred embodiment, X3 is glutamate.

In another preferred embodiment, said X5 and X7 are independently of each other a hydrophobic amino acid. Preferably, X5 and X7 are independently of each other selected of leucine, alloleucine, alloisoleucine, homoleucine, isoleucine, 2-aminobutyric acid, norleucine, norvaline or valine. More preferably, X5 or X7 is leucine. In another more again preferred embodiment, X5 and X7 are leucine.

In another preferred embodiment, said X9 and X23 are independently of each other a polar amino acid. Preferably, X9 and X23 are independently of each other selected of asparagine, glutamine, serine or glycine. In another more preferred embodiment, X9 or X23 is independently selected from asparagine, glutamine, serine or glycine. In another again more preferred embodiment, X9 and X23 are both independently selected from asparagine, glutamine, serine or glycine. In another again more preferred embodiment, X9 and X23 are asparagine.

In another preferred embodiment, said X10 is an amino acid having an acidic or negatively charged side chain at a physiological pH (about pH 7). Preferably, X10 is selected of 3-methyl-aspartic acid, 6-carboxylysine, aspartic acid, beta-hydroxyaspartic acid, 3,3-dimethyl aspartic acid, or 2-amino-propanedioic acid. In another again more preferred embodiment, X10 is aspartic acid.

In another preferred embodiment, said X26 is a hydrophobic or polar amino acid. Preferably, X26 is selected of leucine, alloleucine, alloisoleucine, homoleucine, isoleucine, 2-aminobutyric acid, norleucine, norvaline, valine; 2,5-diamino-4-hydroxy-5-oxopentanoic acid, glutamine hydroxamate, 3-methyl-1-glutamine, n5-methyl-glutamine, asparagine, 2,5-diamino-4-hydroxy-5-oxopentanoic acid, or n-methyl-asparagine. More preferably, X26 is leucine or glutamine.

In another preferred embodiment, said X27 is a polar or hydrophobic amino acid or an amino acid having an acidic or negatively charged side chain at a physiological pH (about pH 7). Preferably, X27 is serine, isoleucine, or lysine.

In another preferred embodiment, said X28 is a polar or hydrophobic amino acid. Preferably, X28 is valine or serine.

In another preferred embodiment, said X29 is a hydrophobic amino acid or an amino acid having a negatively charged side chain at physiological pH (about pH 7). Preferably, X29 is D- or L-alanine or D- or L-arginine. In another more preferred embodiment, X29 is D-alanine or D-arginine.

In another preferred embodiment, said X30 is a deletion or a hydrophobic or polar D- or L-amino acid, preferably X30 is a hydrophobic or polar amino acid D-amino acid. Preferably, X30 is a deletion or X30 is D- or L-glutamine or D- or L-alanine. In another more preferred embodiment, X30 is D-glutamine or D-alanine. In another again more preferred embodiment, X30 is D-alanine. In a preferred embodiment, X30 is a deletion and X29 is alanine, preferably D-alanine. In another preferred embodiment, X30 is alanine, preferably D-alanine and X29 is arginine.

In another preferred embodiment, X1 is asparagine or leucine, X2 is serine, and X3 is glutamate. In another preferred embodiment, X1 is serine, glycine, glutamine, asparagine or leucine, X2 is serine, and X3 is glutamate. In another preferred embodiment, X5 is leucine, X6 is serine, and X7 is leucine. In another preferred embodiment, X9 is asparagine, X10 is aspartic acid and X11 is norleucine or methionine, preferably X11 is norleucine.

In another preferred embodiment, X22 is serine, X23 is asparagine, and X24 is serine, glycine, glutamine, Dab (2,4-diaminobutyric acid), asparagine or lysine, preferably X24 is Dab (2,4-diaminobutyric acid) or lysine. In another preferred embodiment, X26 is glutamine or leucine, X27 is serine, lysine or isoleucine, X28 is valine, X29 is D- or L-arginine or D- or L-alanine, preferably X29 is D- or L-alanine, more preferably X29 is D-alanine, and X30 is a deletion, D- or L-alanine or D- or L-glutamine, preferably X30 is D- or L-alanine, more preferably X30 is D-alanine.

In another preferred embodiment, X1 is asparagine or leucine, X2 is serine, X3 is glutamate, X5 is leucine, X6 is serine, and X7 is leucine, and preferably X9 is asparagine, X10 is aspartic acid and X11 is norleucine or methionine, and further preferably X11 is norleucine. In another preferred embodiment, X1 is asparagine or leucine, X2 is serine, X3 is glutamate, X22 is serine, X23 is asparagine, and X24 is Dab (2,4-diaminobutyric acid), asparagine or lysine, preferably X24 is Dab (2,4-diaminobutyric acid) or lysine, and preferably X26 is glutamine or leucine, X27 is serine, lysine or isoleucine, X28 is valine, X29 is D- or L-arginine or D- or L-alanine, further preferably X29 is D- or L-alanine, more preferably X29 is D-alanine, and X30 is a deletion, D- or L-alanine or D- or L-glutamine, further preferably X30 is D- or L-alanine, more preferably X30 is D-alanine.

In another preferred embodiment, X1 is asparagine or leucine, X2 is serine, X3 is glutamate, X5 is leucine, X6 is serine, and X7 is leucine. In another preferred embodiment, X1 is asparagine or leucine, X2 is serine, X3 is glutamate, X9 is asparagine, X10 is aspartic acid and X11 is norleucine or methionine, preferably X11 is norleucine. In another preferred embodiment, X1 is asparagine or leucine, X2 is serine, X3 is glutamate, X22 is serine, X23 is asparagine, and X24 is Dab (2,4-diaminobutyric acid), asparagine or lysine, preferably X24 is Dab (2,4-diaminobutyric acid) or lysine. In another preferred embodiment, X1 is asparagine or leucine, X2 is serine, X3 is glutamate, X26 is glutamine or leucine, X27 is serine, lysine or isoleucine, X28 is valine, X29 is D- or L-arginine or D- or L-alanine, preferably X29 is D- or L-alanine, more preferably X29 is D-alanine, and X30 is a deletion, D- or L-alanine or D- or L-glutamine, preferably X30 is D- or L-alanine, more preferably X30 is D-alanine.

In a preferred embodiment, said X2, X3, X5, X6, X7, X9, X10, X11, X22, X23, X24, X26, X27, X28 and X29 are independently of each other L-amino acids. In a preferred embodiment proline P12, isoleucine I13, threonine T14, asparagine N15, aspartic acid D16, glutamine Q17, lysines K18 and K19, and leucine L20 are independently of each other L-amino acids. In a preferred embodiment, C4, C8, C21 and C25 are independently of each other D-cysteine or L-cysteine, preferably L-cysteine.

In a preferred embodiment, said cyclic peptide consists of said amino acid sequence (I). In another preferred embodiment, said amino acid sequence (I) consists of said amino acid sequence of SEQ ID NO:1.

In another very preferred embodiment, said amino acid sequence of SEQ ID NO:1 is selected from any one of SEQ ID NO:2-5, 21-36, or 39-57.

In another very preferred embodiment, said amino acid sequence of SEQ ID NO:1 is selected from any one of SEQ ID NO:39-57.

In another very preferred embodiment, said amino acid sequence of SEQ ID NO:1 is selected from any one of SEQ ID NO:2-5, 21-36.

In another very preferred embodiment, said amino acid sequence (I) is selected from any one of (SEQ ID NO:2), (SEQ ID NO:3), (SEQ ID NO:4), (SEQ ID NO:5), (SEQ ID NO:21), (SEQ ID NO:22), (SEQ ID NO:23), (SEQ ID NO:24), (SEQ ID NO:25), (SEQ ID NO:26), (SEQ ID NO:27), (SEQ ID NO:28), (SEQ ID NO:29), (SEQ ID NO:30), (SEQ ID NO:31), (SEQ ID NO:32), (SEQ ID NO:33), (SEQ ID NO:34), (SEQ ID NO:35), or (SEQ ID NO:36).

In another very preferred embodiment, said amino acid sequence of SEQ ID NO:1 is any one of SEQ ID NO:2, 3, 21, 22, or 23.

In another very preferred embodiment, said amino acid sequence of SEQ ID NO:1 is an amino acid selected from SEQ ID NO:2 or SEQ ID NO:3.

In a certain embodiment, said amino acid sequence (I) of said cyclic peptide comprises (i) an N-terminus selected from a free amino group or an acetylated N-terminus, and/or (ii) a C-terminus selected from a free carboxyl group or an amidated C-terminus.

In another preferred embodiment, said cyclic peptide further comprises a linker, wherein said linker is attached to said amino acid sequence (I), and wherein said linker comprises (i) at least one attachment moiety, (ii) at least one spacer moiety, (iii) at least one, preferably one, linking moiety, or (iv) any combination of (i), (ii) and (iii).

In another preferred embodiment, said at least one attachment moiety comprises or preferably consists of —O—NH$_2$, —O—NH— (an aminooxy moiety), —C(O)—CH$_2$—O—NH$_2$, —C(O)—CH$_2$—O—NH— (aminooxy acetyl moiety), —NH—NH$_2$, —NH—NH— (hydrazine moiety), -E(O)—NH—NH$_2$, or -E(O)—NH—NH— (hydrazide moiety), wherein E is C, S(O) or P. In a further preferred embodiment, said attachment moiety comprises or preferably consists of an —O—NH$_2$, —O—NH— (an aminooxy moiety), —C(O)—CH$_2$—O—NH$_2$, —C(O)—CH$_2$—O—NH— (aminooxy acetyl moiety), —NH—NH$_2$, —NH—NH— (hydrazine moiety), or (—C(O)—NH—NH$_2$, —C(O)—NH—NH— (carbohydrazide moiety). In another further preferred embodiment, said attachment moiety comprises or preferably consists of —O—NH$_2$ or —O—NH— (an aminooxy moiety). In another preferred embodiment, said at least one spacer moiety comprises or preferably consists of NH$_2$—CH$_2$—CH$_2$—(O—CH$_2$—CH$_2$)$_n$—C(O)— or —NH—CH$_2$—CH$_2$—(O—CH$_2$—CH$_2$)$_n$—C(O)—, wherein n is an integer of 1 to 45, preferably 2 to 20, more preferably 6 to 8; or NH$_2$—(CH$_2$)$_m$—C(O)— or —NH—(CH$_2$)$_m$—C(O)—, wherein m is an integer of 2 to 45, preferably 2 to 20, more preferably 2 to 6. In another preferred embodiment, said at least one linking moiety is capable of cross-linking the cyclic peptide with a second peptide. Linking moieties capable of cross-linking a cyclic peptide with a second peptide are well known in the art. In one embodiment of the invention, said linking moiety capable of cross-linking the cyclic peptide with a second peptide comprises or consists of an aldehyde moiety, such as a glutaraldehyde moiety, octanedialdehyde moiety, dialdehyde moiety, succinaldehyde moiety; carbodiimide moiety, such as 1-ethyl-3-(3-dimethylaminopropyl) carbodiimide hydrochloride moiety; glyoxal moiety; N-hydroxy-sulphosuccinimidyl moiety, such as N-hydroxy-sulphosuccinimidyl moiety; a cationic linking moiety; polyethyleneglycol moiety; benzoyl benzoic acid moiety. Further suitable linking moieties are listed in the Pierce Catalog and Handbook, Pierce Chemical Company, Rockford (1997); Bioconjugate Techniques, Greg T. Hermanson, Pierce Biotechnology, Thermo Fisher Scientific, Rockford (2013); and are described in EP 1321466 A1, DE 19821859 A1, U.S. Pat. Nos. 6,875,737, 5,456,911, 5,612,036, 5,965,532, WO 2001004135, WO 2001070685, US 20140302001 A1, U.S. Pat. No. 6,800,728, US20140171619 A1, U.S. Pat. No. 8,168,190, WO 2012/166594 A1 and WO 2015/082501.

In one embodiment, said linker is at least one, preferably exactly one attachment moiety. In another embodiment, said linker is at least one, preferably exactly one, two or three spacer moieties, wherein in case of more than one spacer moiety, they are preferably linked together, either directly or via an interconnecting group. In another embodiment, said linker is at least one, preferably exactly one spacer moiety. In another embodiment, said linker is at least one, preferably exactly one linking moiety.

In another embodiment, said linker comprises at least one attachment moiety and at least one, preferably exactly one spacer moiety, wherein the at least one attachment moiety is attached to the N-terminus of said amino acid sequence (I), and the at least one spacer moiety is attached to the attachment moiety. In another embodiment, said linker comprises at least one attachment moiety and at least one, preferably exactly one spacer moiety wherein the at least one spacer moiety is attached to the N-terminus of said amino acid sequence (I), and the at least one attachment moiety is attached to the spacer moiety.

In one embodiment, said at least one linker comprises at least one attachment moiety and at least one spacer moiety and at least one linking moiety, wherein the at least one linking moiety or the at least one spacer moiety is attached to the N-terminus of said amino acid sequence (I). In another embodiment, the at least one attachment moiety is attached to the N-terminus of said amino acid sequence (I), the at least one spacer moiety is attached to the attachment moiety and the at least one linking moiety is attached to the spacer moiety. In another embodiment, the at least one spacer moiety is attached to the N-terminus of the amino acid sequence (I), the at least one attachment moiety is attached to the spacer moiety and the at least one linking moiety is attached to the attachment moiety.

In a preferred embodiment, the linker is attached to the amino acid sequence (I) typically and preferably via an amide bond to the N-terminus of said amino acid sequence (I) or to a free amino group of a side chain of an amino acid of said amino acid sequence (I), preferably to the N-terminus of said amino acid sequence (I). In a preferred embodiment, said linking moiety is capable of cross-linking said cyclic peptide with a thiol group of a second peptide. In a preferred embodiment, said linking moiety comprises a maleimide moiety.

In a preferred embodiment, said linker is attached to an amino group included in said amino acid sequence (I), wherein preferably said linker is attached to a free amino group of (i) the N-terminus of said amino acid sequence (I), or (ii) a side chain of an amino acid of said amino acid sequence (I). Preferably, the linker is attached to said amino group included in said amino acid sequence (I) by an amide bond. Said side chain is preferably of the amino acid lysine.

In a preferred embodiment, X24 is lysine and said linker is attached to the free amino group of the side chain of X24.

In a very preferred embodiment, said linker is selected from the following formulas:

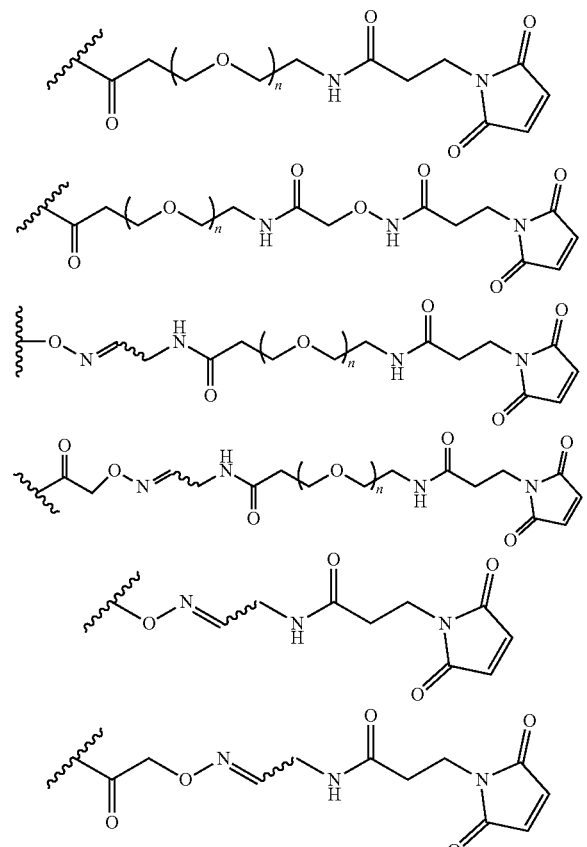

wherein n is an integer of 1 to 45, preferably 6 to 8, and the wavy line indicates the attachment site to said amino acid sequence (I). Further very preferred, said n is 6.

In case the compounds of the present invention such as the conjugate, and hereby including said linker, comprise one or more double bonds, said double bonds can be of either the (E)- or (Z)-configuration, or mixtures thereof in any ratio. The same applies for the preferred linker comprising an oxime moiety. Thus, the preferred linker comprising an oxime moiety thus may include either said linker with said oxime moiety in its syn-configuration (and thus as syn-isomer), said linker with said oxime moiety in its anti-configuration (and thus as anti-isomer) and mixtures thereof in any ratio. Within the chemical formulas presented herein for said double bond or said oxime moiety, this is typically and preferably represented by a wavy line.

In a further very preferred embodiment, said linker is selected from the following formulas:

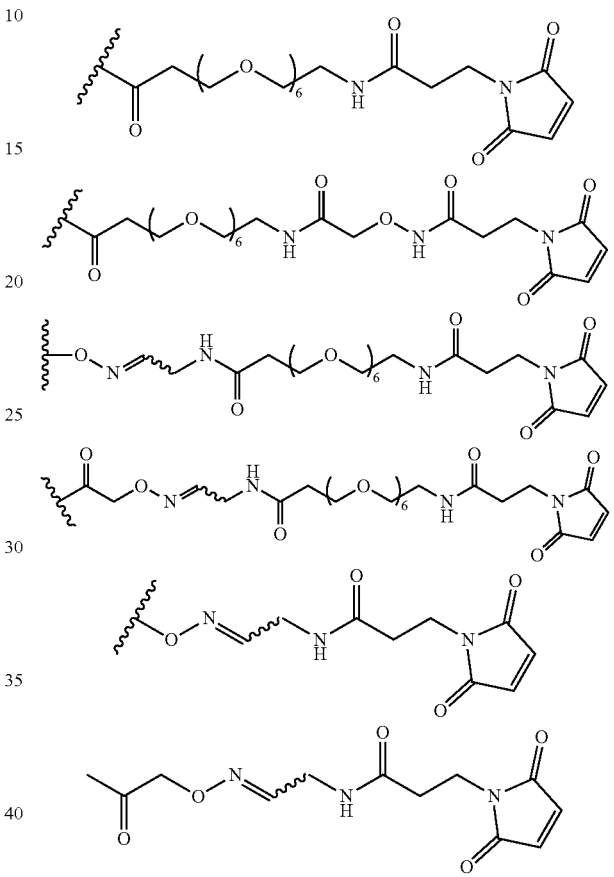

wherein the wavy line indicates the attachment site to said amino acid sequence (I).

In a further very preferred embodiment, said cyclic peptide comprises, preferably is, a formula selected from any one of following formulas:

(3) (SEQ ID NO: 16)

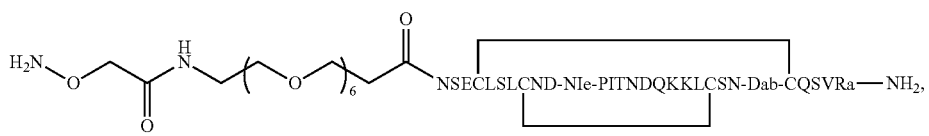

(4) (SEQ ID NO: 17)

(5) (SEQ ID NO: 18)

-continued

AOAc-RLSECLSLCND-Nle-PITNDQKKLCSNNCLKSa—NH₂, or

AOAc-PVSTYMLTNSECLSLCNDMPITNDQKKLCSNNCQIVRQQa—NH₂.

(6) (SEQ ID NO: 19)

(7) (SEQ ID NO: 20)

In a further very preferred embodiment, said cyclic peptide comprises, preferably is, a formula selected from any one of formulas (3) (SEQ ID NO:16), formula (4) (SEQ ID NO:17), formula (5) (SEQ ID NO:18), formula (6) (SEQ ID NO:19), formula (7) (SEQ ID NO:20), and any of formulas (19) to (37) as depicted in the Example Section.

In a further very preferred embodiment, said cyclic peptide comprises, preferably is, formula (3) (SEQ ID NO:16). In a further very preferred embodiment, said cyclic peptide comprises, preferably is, formula (4) (SEQ ID NO:17). In a further very preferred embodiment, said cyclic peptide comprises, preferably is, formula (5) (SEQ ID NO:18). In a further very preferred embodiment, said cyclic peptide comprises, preferably is, formula (6) (SEQ ID NO: 19). In a further very preferred embodiment, said cyclic peptide comprises, preferably is, formula (7) (SEQ ID NO:20).

Linking and conjugation procedures that may be used to attach the cyclic peptide to the lipopeptide building block are well known to those skilled in the art (see for example Hermanson, G. T, Bioconjugate Techniques, 2nd edition, Academic Press, 2008). Any method used for linking and conjugating peptides or other antigens to an antigen delivery system, such as carrier protein, polymer, dendrimer, nanoparticle or virus-like particle, can be used to link said cyclic peptide to said lipopeptide building block. Free amino groups in the side chains of amino acids in the peptide moiety of the lipopeptide building block may be coupled to reactive esters in the cyclic peptide or the linker (e.g. N-hydroxysuccinimide esters prepared from carboxylic acids); thiols in the peptide moiety may be coupled to maleimide groups in the linker; azides may be incorporated into the side chains of amino acid residues in the peptide moiety and coupled to the cyclic peptide or linker containing acetylene groups using copper catalyzed cycloaddition reactions; and other nucleophiles (e.g. hydrazino, hydroxyl amino, vic-amino thiol groups) in the peptide moiety may be coupled to electrophiles (e.g. aldehydes, ketones. active esters) in the cyclic peptide or linker. Further, the reversal of the positions of the two reactive groups in the peptide moiety and cyclic peptide or linker to achieve selective coupling is further envisaged.

All embodiments and preferred and very preferred embodiments of the lipid building block, the conjugate, and all of its components including antigens and linker described herein are applicable to all aspects of the present invention, even though not all embodiments and preferred and very preferred embodiments are not necessarily again repeated and reiterated.

In a further very preferred embodiment, said conjugate is selected from any one of the formula (38)

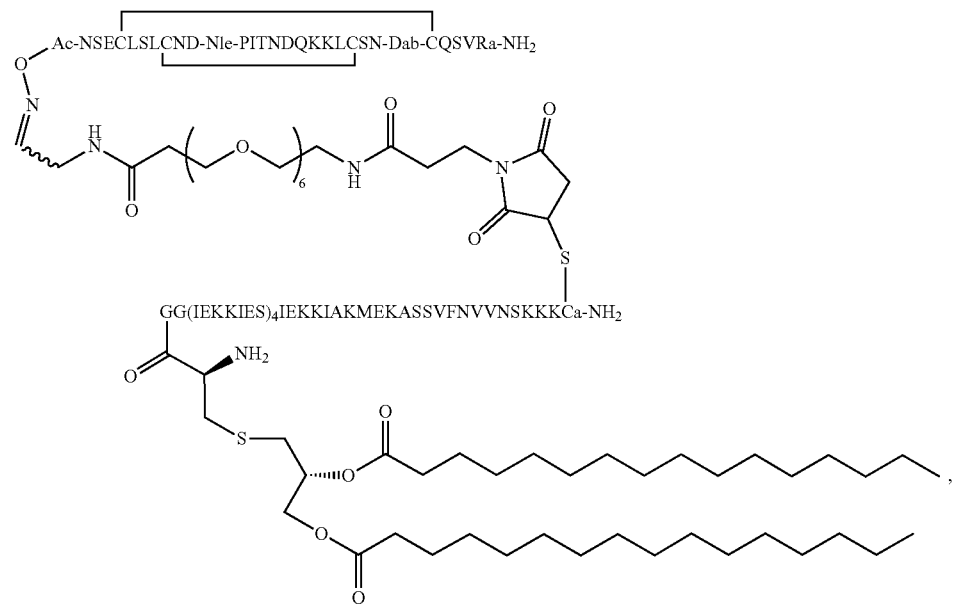

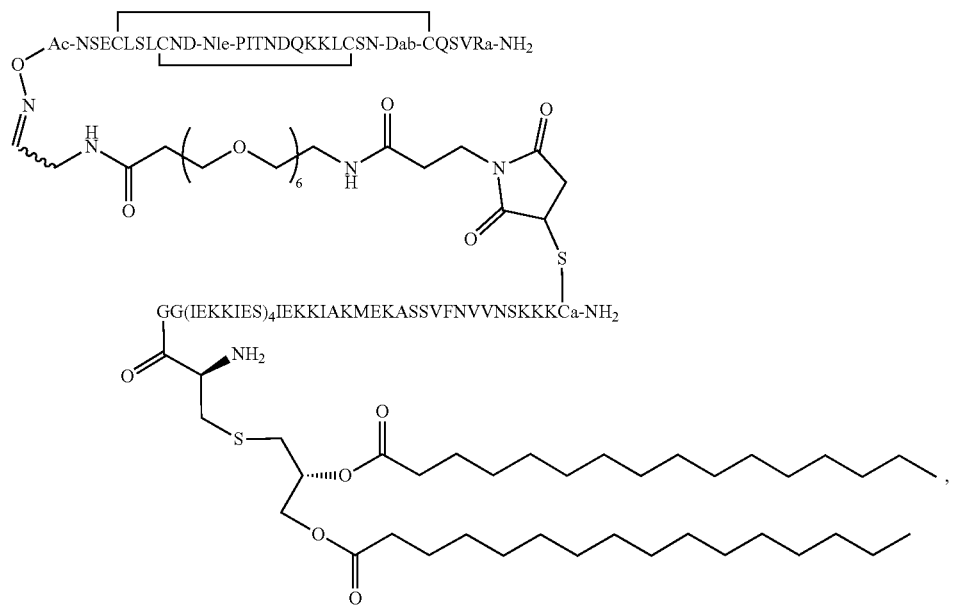
(39)
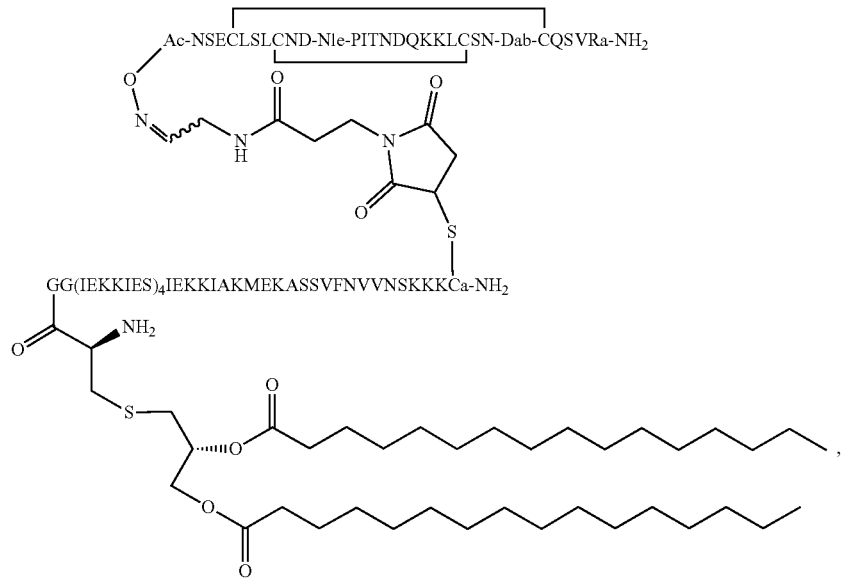
(40)

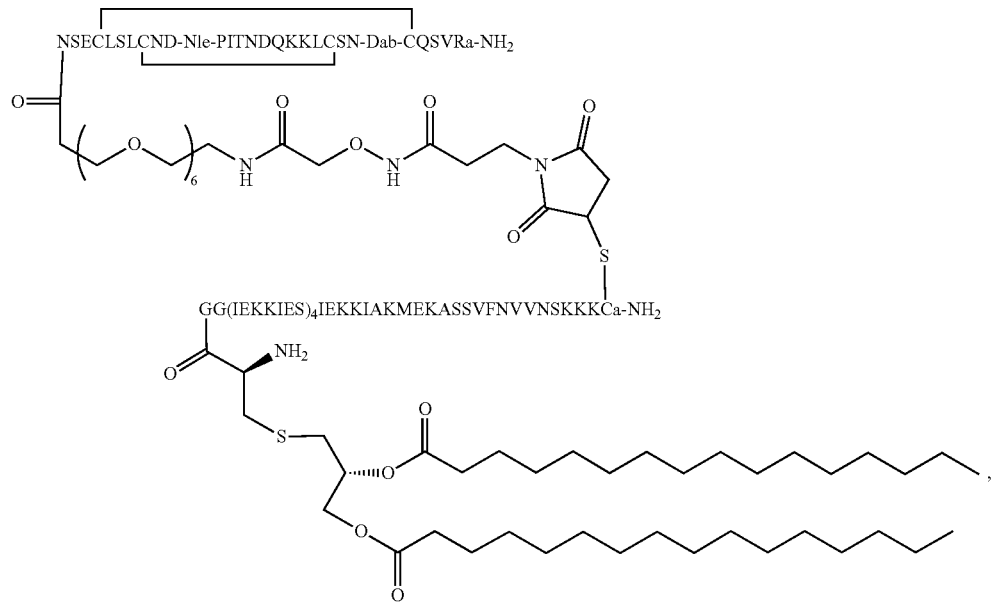
(41)
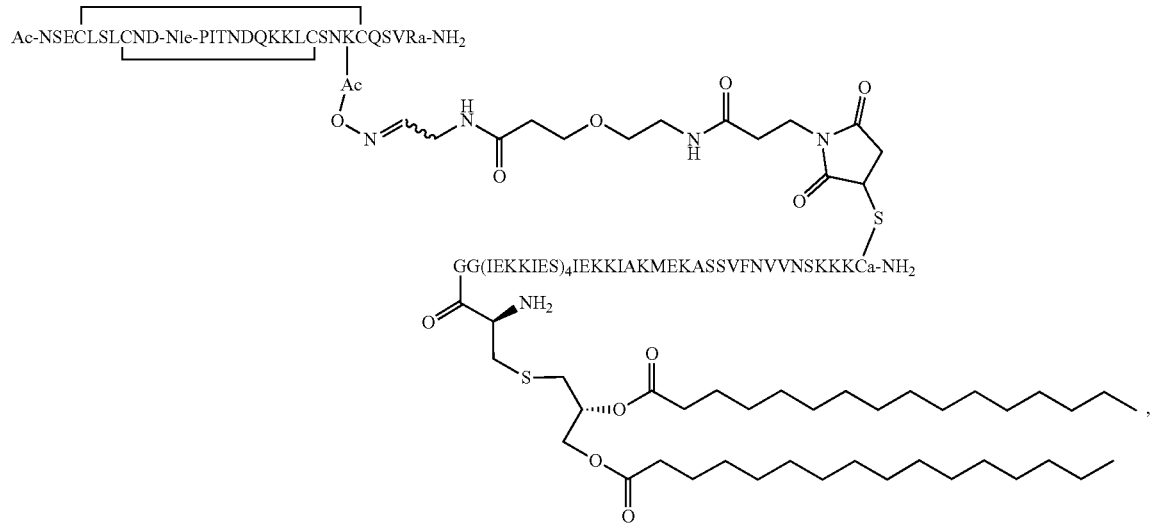
(42)
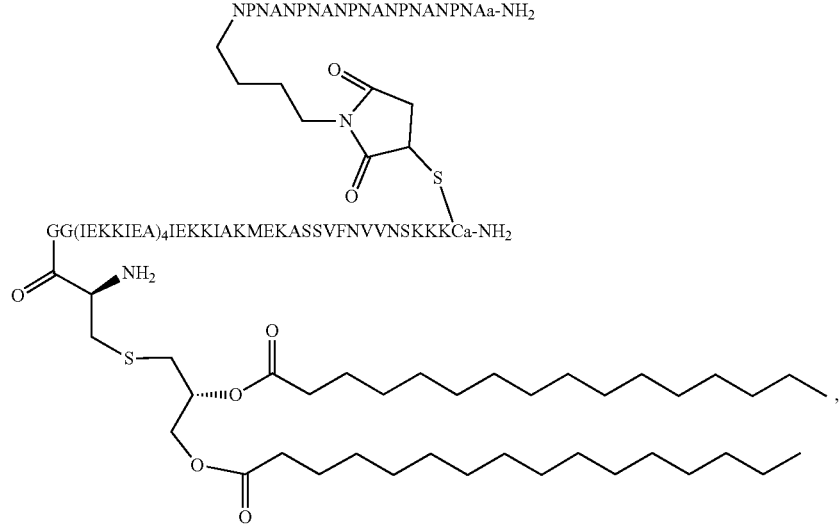
(45)

(46)

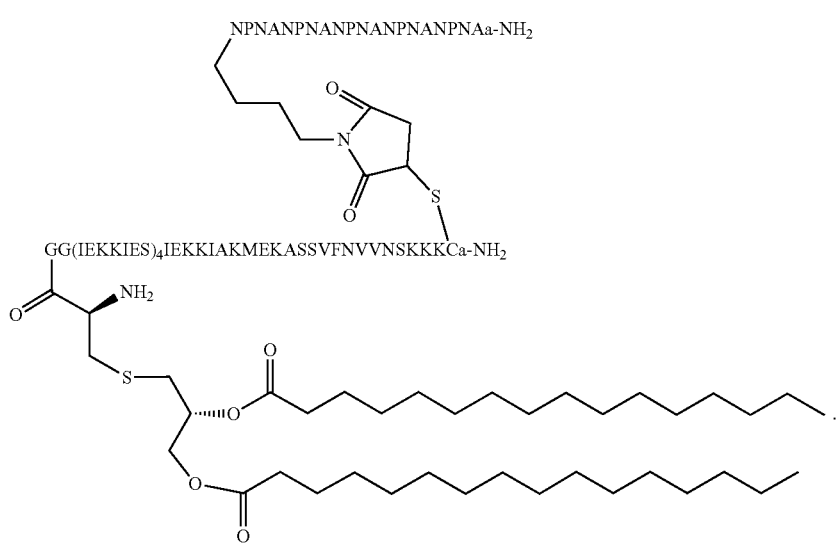

In a further very preferred embodiment, said conjugate is (38).

In a further very preferred embodiment, said conjugate is (39).

In a further very preferred embodiment, said conjugate is (40).

In a further very preferred embodiment, said conjugate is (41).

In a further very preferred embodiment, said conjugate is (42).

In a further very preferred embodiment, said conjugate is (45).

In a further very preferred embodiment, said conjugate is (46),

In another aspect, the present invention provides for a bundle of conjugates comprising 2, 3, 4, 5, 6 or 7 of the inventive conjugate. In another aspect, the present invention provides for a bundle of conjugates comprising 2, 3, 4 or 5 of the inventive conjugate. In another very preferred aspect, the present invention provides for a bundle of conjugates comprising 3 of the inventive conjugate.

In another aspect, the present invention provides for a bundle of conjugates comprising 2, 3, 4, 5, 6 or 7 of the inventive conjugate, wherein said conjugate is selected from any one of the formula (38), (39), (40), (41), (42), (45) or (46), wherein preferably said conjugate is selected from any one of the formula (38), (40), (41), (42) or (46), and wherein further preferably said conjugate is formula (38) or (46) preferably (38).

In another very preferred aspect, the present invention provides for a bundle of conjugates comprising 3, preferably exactly 3, of the inventive conjugate, wherein said conjugate is selected from any one of the formula (38), (39), (40), (41), (42), (45) or (46), wherein preferably said conjugate is selected from any one of the formula (38), (40), (41), (42) or (46), and wherein further preferably said conjugate is formula (38) or (46) preferably (38).

According to a preferred embodiment, in said bundle, the coiled coil peptide chain segments of said peptide moieties comprised by said conjugates are coiled together, preferably said coiled coil peptide chain segments are helically coiled together, more preferably said coiled coil peptide chain segments are alpha-helically coiled together. In a preferred embodiment, said coiled coil peptide chain segments of said peptide moieties are coiled together left-handed or right-handed. According a preferred embodiment, in said bundle, said coiled coil peptide chain segments of said peptide moieties form an alpha-helical left-handed coil.

In a preferred embodiment, said coiled coil peptide chain segments have a parallel orientation, i.e. they run in the same direction; or they have an anti-parallel orientation, i.e. they run in directions opposite to each other; wherein the first option is preferred. The term "direction" is based on the direction of a peptide chain having on one side an N-terminus and on the other side a C-terminus. In a preferred embodiment of said inventive bundle, said coiled coil peptide chain segments of said peptide moieties form a left-handed alpha-helical coiled coil, wherein the coiled coil peptide chain segments have a parallel orientation in said coiled coil. Preferably, said bundle comprises 2 to 7 (e.g. dimer, trimer, tetramer, pentamer, hexamer or heptamer), more preferably 2, 3, 4 or 5, again more preferably 3 helically twisted coiled coil peptide chain segments, having a parallel orientation in said coiled coil.

In another aspect, the present invention provides for a synthetic virus-like particle comprising at least one bundle of conjugates of the present invention.

In another aspect, the present invention provides for a synthetic virus-like particle comprising at least one bundle of conjugates of the present invention, wherein said conjugate is selected from any one of the formula (38), (39), (40), (41), (42), (45) or (46), wherein preferably said conjugate is selected from any one of the formula (38), (40), (41), (42)

or (46), and wherein further preferably said conjugate is formula (38) or (46) preferably (38).

The invention also relates to a method of preparing the synthetic virus-like particles of the invention. Synthetic virus-like particles (SVLP) may be produced by a self-assembly process, e.g. in aqueous solution. This method may involve dissolving the lipopeptide building block in a suitable carrier, preferably an aqueous buffer system (e.g. buffered saline or unbuffered saline). The solvent may be removed after preparation of the synthetic virus-like particles, for example by lyophilization or spray drying. Conjugates including the specific combination of the cyclic peptide of the invention and the lipopeptide building block of the invention self-assemble to bundles and further to synthetic virus-like particles (SVLPs).

In another aspect, the present invention provides for a pharmaceutical composition comprising an immunologically effective amount of the conjugate of the present invention or the synthetic virus like particle of the present invention, together with a pharmaceutically acceptable diluent, carrier or excipient, wherein preferably said pharmaceutical composition is a vaccine.

As used herein, the term "effective amount" refers to an amount necessary or sufficient to realize a desired biologic effect. Preferably, the term "effective amount" refers to an amount of the antigen of the present invention, the conjugate of the present invention or the synthetic virus like particle of the present invention that (i) treats or prevents the particular disease, medical condition, or disorder, (ii) attenuates, ameliorates, or eliminates one or more symptoms of the particular disease, medical condition, or disorder, or (iii) prevents or delays the onset of one or more symptoms of the particular disease, medical condition, or disorder described herein. An immunogenically effective amount, as herein understood, is an amount that is capable of modulating, preferably enhancing the response of the immune system of a subject to an antigen or pathogen.

The invention further relates to the conjugate or the synthetic virus like particle of the invention for use as a vaccine. A vaccine, as used herein, is a pharmaceutical composition that is used to modulate, preferably to stimulate the response of the body's immune system to a particular antigen or pathogen. In a preferred embodiment, the pharmaceutical composition or preferably the vaccine is used for preventing or reducing the risk of an RSV infection in a subject, preferably a human, more preferably a child or elderly people.

In again another aspect, the present invention provides for the conjugate of the present invention or the synthetic virus like particle of the present invention for use as a medicament, preferably for use in a method for preventing a disease or for reducing the risk of a disease, wherein further preferably said disease is an infectious disease, a cancer or an allergy, and again more preferably wherein said disease is an respiratory syncytial virus (RSV) infection.

In again another aspect, the present invention provides for the conjugate of the present invention or the synthetic virus like particle of the present invention for use in a method for preventing a disease or for reducing the risk of a disease or for treating a disease, wherein further preferably said disease is an infectious disease, a cancer or an allergy, and again more preferably wherein said disease is an respiratory syncytial virus (RSV) infection. In again another aspect, the present invention provides for the conjugate of the present invention or the synthetic virus like particle of the present invention for use in a method for preventing of an infectious disease or reducing the risk of an infectious disease, preferably for use in a method for preventing or reducing the risk of an infectious disease associated with or caused by a respiratory syncytial virus. As used herein, the term treating refers to therapy and to a therapeutic treatment.

The present invention provides for the conjugate of the invention, the synthetic virus like particle of the invention, or the pharmaceutical composition of the invention for use as a medicament, preferably for use in a method for preventing an infectious disease or for reducing the risk of an infectious disease, more preferably for use in a method for preventing or reducing the risk of an infectious disease associated with or caused by a respiratory syncytial virus (RSV). The present invention provides for the conjugate of the invention, the synthetic virus like particle of the invention, or the pharmaceutical composition of the invention for use as a medicament, preferably for use in a method for preventing an infection or for reducing the risk of an infection, more preferably for use in a method for preventing or reducing the risk of an infection caused by a respiratory syncytial virus. The present invention provides for the conjugate of the invention, the synthetic virus like particle of the invention, or the pharmaceutical composition of the invention for use as a medicament, preferably for use in a method for preventing an infection or for reducing the risk of an infection, more preferably for use in a method for preventing or reducing the risk of an RSV infection.

The invention further relates to a method of eliciting or modulating an immune response or to a method of limiting the risk of developing a disease, preferably an infection, more preferably an infection associated with or caused by an RSV, wherein an immunogenically effective amount of the conjugate or the synthetic virus like particle of the invention is administered to a subject, preferably a human, more preferably a child or elderly people. The invention further relates to a method for treating a disease, preferably an infection, more preferably an infection associated with or caused by an RSV, comprising administering an immunogenically effective amount of the conjugate or the synthetic virus like particle of the invention to a subject, preferably a human, more preferably a child or elderly people. Moreover, the invention relates to the conjugate or the synthetic virus like particle of the invention for use in treating a disease, preferably an infection associated with or caused by an RSV. Moreover, the invention relates to the conjugate or the synthetic virus like particle of the invention for use in treating a disease, preferably an infection caused by an RSV. Moreover, the invention relates to the cyclic peptide, the conjugate or the synthetic virus like particle of the invention for use in treating a disease, preferably an RSV infection.

EXAMPLES

Example 1

Preparation of Lipid Building Blocks

Lipopeptide 10

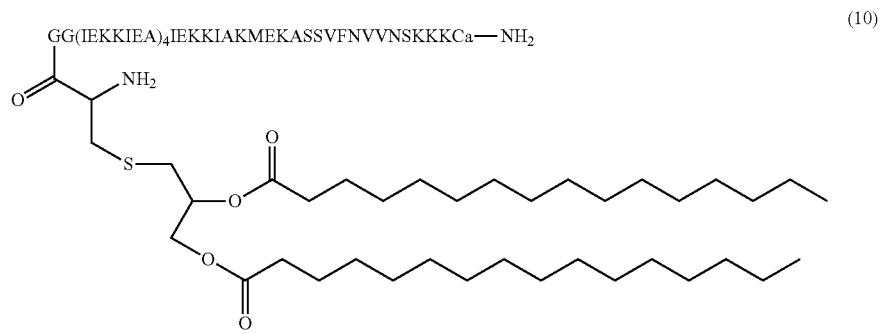

(10)

This lipopeptide 10 is based on the IEKKIEA (SEQ ID NO:12). defgabc heptad repeat motif fused to universal T-helper cell epitope SEQ-ID NO: 6 as well as extra residues of SEQ ID NO: 11) at the C-terminus to improve solubility and stability, and to allow conjugation of an antigen, and via a GG-linker to the S-[2,3-bis(palmitoyloxy)-(2)-propyl]-cysteine. The synthesis of lipopeptide 10 was essentially carried out, and the product was purified by RP-HPLC as described in WO 2008/068017. RP-HPLC (Zorbax C8 column, 30 to 100% MeCN in $H_2O$ (+0.1% CHOOH) over 10 min): Purity: 95%, $t_R$=4.87 min. MALDI-TOF: m/z calculated for $C_{312}H_{552}N_{74}O_{85}S_3$: 6796.4; m/z found: 6797.4 $[M+H]^+$.

Lipopeptide 11

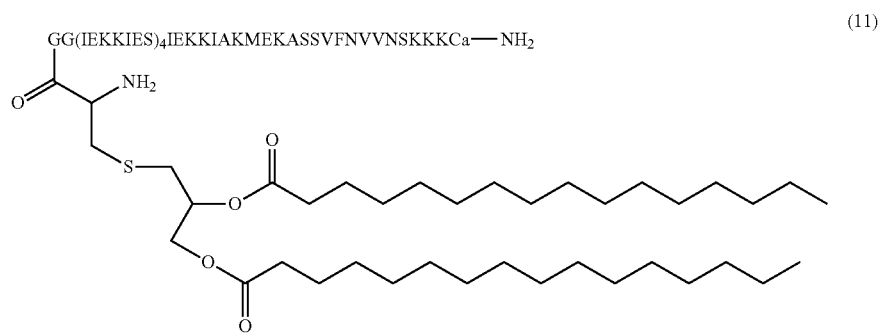

(11)

This lipopeptide 11 contains a coiled-coil domain, which has serine in the "c" positions of the heptad repeat "defgabc" IEKKIES (SEQ ID NO:13). The lipopeptide 11 was synthesized and purified by RP-HPLC as described above for lipopeptide 10 and analyzed by analytical RP-HPLC and MALDI-MS. HPLC (Zorbax C8 column, 30 to 100% MeCN in $H_2O$ (+0.1% CHOOH) over 10 min): Purity: 90%, $t_R$=4.81 min.; MALDI-MS: MW calc. for $C_{312}H_{552}N_{74}O_{89}S_3$: 6860.46 Da; found 6860.61 Da (±0.05%).

Lipopeptide LBB-1

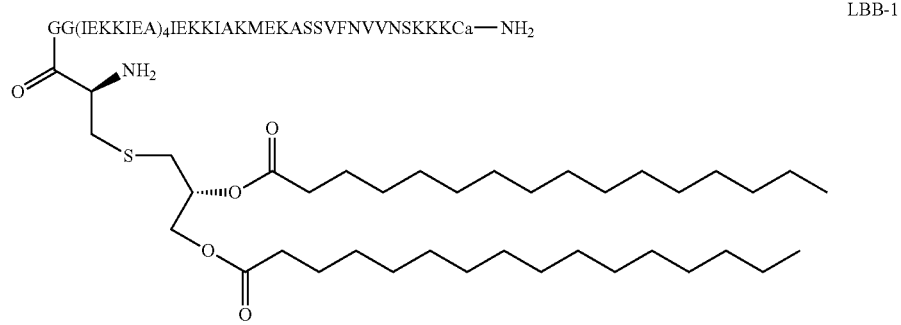

LBB-1

This lipopeptide building block LBB-1 corresponds to lipopeptide 10 except that the lipid Pam$_2$-Cys has the R-configuration at the chiral 2-propyl carbon atom and the R-configuration of the chiral carbon of the cysteinyl moiety. The building block LBB-1 was analyzed by RP-HPLC RP-HPLC (Agilent VariTide RPC, 0 to 95% MeCN in H$_2$O (+0.1% TFA) over 63 min.): Purity 97.0%, $t_R$=45.58; ESI-MS MW calculated for $C_{312}H_{552}N_{74}O_{85}S_3$: 6796.46 Da; found: 6793.1.

Lipopeptide LBB-2

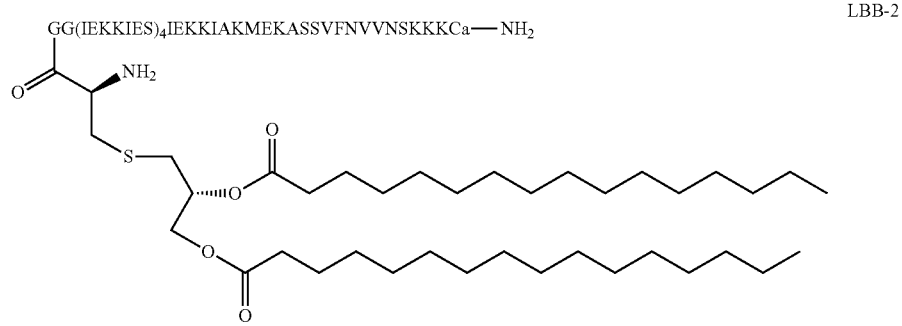

LBB-2

This lipopeptide building block LBB-2 corresponds to lipopeptide 11 except that the lipid Pam$_2$-Cys has the R-configuration at the chiral 2-propyl carbon atom and the R-configuration of the chiral carbon of the cysteinyl moiety. The building block LBB-2 was analyzed by RP-HPLC (Agilent VariTide RPC, 0 to 95% MeCN in H$_2$O (+0.1% TFA) over 63 min.): Purity 97.0%, $t_R$=45.58 min. MALDI-MS: MW calc. for $C_{312}H_{552}N_{74}O_{89}S_3$: 6860.46 Da; found 6861.1 Da (±0.05%).

Example 2

Synthesis of Cyclic RSV Peptides and Conjugates Comprising Said Peptides

The present applicants have already described cyclic peptides that are also useful and preferred as antigens for the present inventive conjugates in its application PCT/EP2018/065714 filed on Jun. 13, 2018. In particular, the design and syntheses of such cyclic peptides were described in Example 1 of PCT/EP2018/065714.

Moreover, the preparation of conjugates including such peptides have been described in Example 2 of PCT/EP2018/065714 and its use for immunizations against RSV infections in Examples 3-5 of PCT/EP2018/065714, and hereby in detail, in Example 3 of PCT/EP2018/065714 its use for immunogenicity studies against RSV in mice, in Example 4 of PCT/EP2018/065714 for further intramuscular immunization experiments, and in Example 5 for the generation of monoclonal antibodies.

Not only are the disclosure of PCT/EP2018/065714 incorporated herein in its entirety by way of reference, but all the disclosures of PCT/EP2018/065714, in particular, the disclosure related to the specific cyclic peptides, conjugates and other component moieties, and the generated biological data hereto are specifically incorporated herein in its entirety by way of reference.

It is believed that said biological data and effects described in particular in Examples 3-5 of PCT/EP2018/065714, in view of the disclosed cyclic peptides, conjugates and component moieties, and in particular in view of the described cyclic peptides, conjugates and components of Examples 1-2 of PCT/EP2018/065714, makes it plausible that said biological data and effects are achieved with the lipid building blocks, conjugates and SVLPs of the present invention as well and thus, upon adaption to the present invention and the features of the present invention. It is thus believed that the scope of the invention is further made plausible by reference to said biological data and effects taking the adaption to the present invention and the features of the present invention and the inventive lipid building blocks, conjugates and SVLP hereto into account.

Irrespective of its incorporation by reference of PCT/EP2018/065714, some disclosure thereof is repeated again herein either in full or in summarized form. For the sake of convenience, the numbering of said cyclic peptides, conjugates and other component moieties and their sequences of PCT/EP2018/065714 have been maintained for the present invention and description.

Example 1 of PCT/EP2018/065714 describes maleimido-peptide 1 (SEQ ID NO:14) and (aminooxy)acetyl peptide 2 (SEQ ID NO:15) in particular as reference example since, as disclosed in Example 3 of PCT/EP2018/065714, conjugates comprising said peptides do not generate antibody responses and neutralizing antibodies against RSV A2 and A/Long strains.

The syntheses of said peptides including the cyclic peptides useful and preferred for the present invention were typically carried out using Fmoc solid phase peptide synthesis (SPPS) methods using Tentagel R Ram resin on 0.5 mmol scale. After completion of assembly, the peptides were cleaved from the resin and the side-chain protecting groups were removed, and the peptides purified by RP-HPLC on a preparative column and, typically, lyophilized to afford the peptides as white powders. Subsequently, analysis by RP-HPLC were effected and purity, $t_R$, ESI-MS and MW were determined.

Further preferred cyclic peptides for the present invention, the syntheses and characterization of which were already described in PCT/EP2018/065714 are as follows:

(Aminooxy)acetyl Peptide 3

(3)

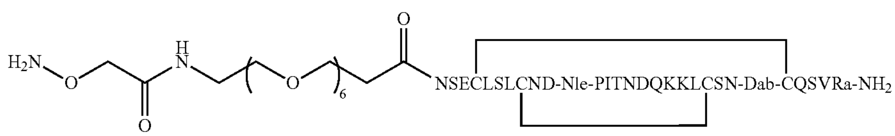

In (aminooxy)acetyl peptide 3 (SEQ ID NO:16), an (aminooxy)acetyl moiety (denoted as "AOAc") is coupled to the N-terminus of the peptide via a 21-amino-3,6,9,12,15,18-hexaoxaheneicosan-21-oic amide linker, and a D-Ala (denoted as "a") is coupled to the C-terminus as the amide in order to confer stability to exoproteases. (Aminooxy) acetyl peptide 3 contains two disulfide bonds.

(Aminooxy)acetyl Peptide 4

(4)

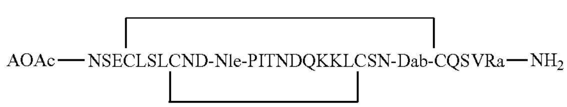

(Aminooxy)acetyl peptide 4 (SEQ ID NO:17) is derived from the F-protein of the RSV virus upon several sequence modifications. An (aminooxy)acetyl moiety (denoted as "AOAc") is coupled to the N-terminus of the peptide and a D-Ala (denoted as "a") is coupled to the C-terminus as the amide in order to confer stability to exoproteases. The (aminooxy)acetyl peptide 4 contains two disulfide bonds as depicted in above formula. (Aminooxy)acetyl peptide 4 was assembled by standard Fmoc SPPS. AOAc was coupled as Bis-Boc-aminooxy-acetic acid N-hydroxysuccinimide ester ($Boc_2$-Aoa-OSu). After completion of assembly the peptide was cleaved from the resin and the side-chain protecting groups were removed by treatment with 87.5% TFA, 5% TA, 5% $H_2O$, 2.5% EDT for 2.5 h. For cyclization by air oxidation, the reduced peptide was dissolved in 0.33 M ammonium bicarbonate buffer, pH 7.8 and stirred overnight. The cyclic peptide was then purified by RP-HPLC on a preparative C18 column and lyophilized to afford 4 as a white powder. Analytical RP-HPLC (Vydac 218TP54, 5 μm, 4.6 mm×250 mm column, 0-60% MeCN in $H_2O$ (+0.1% TFA) over 40 min): Purity: 90.4%; $t_R$=25.07 min. MALDI-MS: MW calculated for $C_{134}H_{226}N_{44}O_{49}S_4$: 3365.78 Da; MW found: 3365.80 Da (+0.01%).

(Aminooxy)acetyl Peptide 5

(5)

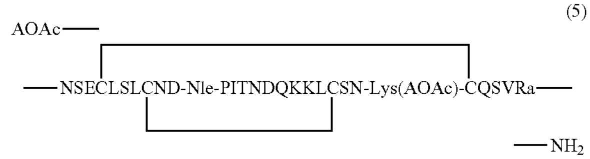

In (aminooxy)acetyl peptide 5 (SEQ ID NO:18), an (aminooxy)acetyl moiety (denoted as "AOAc") is coupled to a lysine side chain in the peptide, the N-terminus is acetylated and a D-Ala (denoted as "a") is coupled to the C-terminus. (Aminooxy)acetyl peptide 5 contains two disulfide bonds.

(Aminooxy)acetyl Peptide 6

(6)

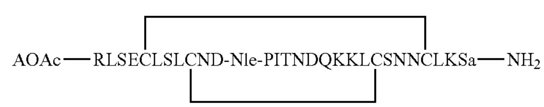

In (aminooxy)acetyl peptide 6 (SEQ ID NO:19), an (aminooxy)acetyl moiety (denoted as "AOAc") is coupled to the N-terminus of the peptide and a D-Ala (denoted as "a") is coupled to the C-terminus. (Aminooxy)acetyl peptide 6 contains two disulfide bonds.

(Aminooxy)acetyl Peptide 7

(7)

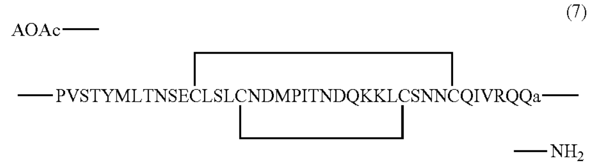

In (aminooxy)acetyl peptide 7 (SEQ ID NO:20), an (aminooxy)acetyl moiety (denoted as "AOAc") is coupled to the N-terminus and a D-Ala (denoted as "a") is coupled to the C-terminus. (Aminooxy)acetyl peptide 7 contains two disulfide bonds.

Preparation of Conjugates for Immunizations

Example 2 of PCT/EP2018/065714 describes the preparation of conjugates comprising the cyclic RSV peptides further by way of a general Scheme A-B—C where "A" denotes the antigen, "B" the linker and "C" the lipopeptide building block, and "X" denotes the attachment to the lipopeptide building block C.

Antigen A1 comprises SEQ ID NO:37, antigen A2 comprises SEQ ID NO:38, antigen A3 comprises SEQ ID NO:2, and antigen A4 comprises SEQ ID NO:3.

Antigens A:

A1

A2

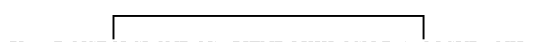

A3

A4

Linkers B:

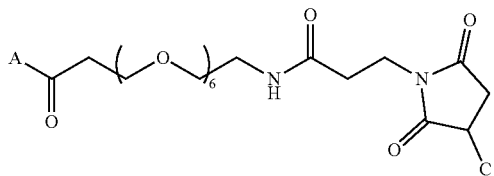

B1, B2, B3, B4

Lipopeptides building blocks C:

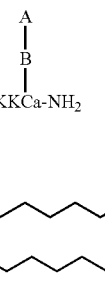

C1

C2

Moreover, further specific linkers, lipopeptides and conjugates are described in Example 2 of PCT/EP2018/065714 which specific disclosure is incorporated herein in its entirety by way of reference and are as follows:

Maleimide PEG6 Aldehyde Linker Compound 8

(8)

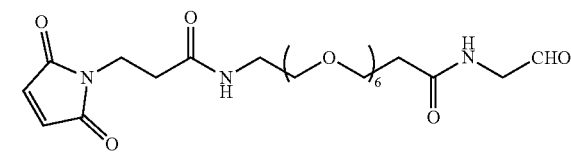

Linker compound 8 was synthesized by reacting SM-PEG6 (Thermo Fisher Scientific) with aminoacetaldehyde dimethyl acetal in $H_2O$. SM-PEG6 (7.6 mg, 12.6 µmol) was suspended in 0.3 ml $H_2O$ and 17 µl of a 1:10 (v/v) solution of aminoacetaldehyde dimethyl acetal in $H_2O$ was added. The mixture was stirred for 90 min. at r.t. The cross-linker was purified by RP-HPLC on a C8 column and lyophilized. ESI-MS: MW calculated for $C_{26}H_{45}N_3O_{12}$: 591.66; MW found: 591.32 (±0.05%).

For hydrolysis of the dimethyl acetal the linker 8 (20 mg) was treated with 95% TFA, 5% $H_2O$ for 5 min. The TFA was removed in vacuo. ESI-MS $C_{24}H_{39}N_3O_{11}$: 545.59 Da; MW found: 545.28 Da (±0.05%).

Maleimide C3 Aldehyde Linker Compound 9

(9)

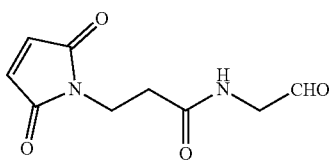

Lipopeptide 10 and Lipopeptide 11 have already been described in Example 1 above.

Conjugate 12 (Antigen A3+Linker B3+Lipopeptide Building Block C1)
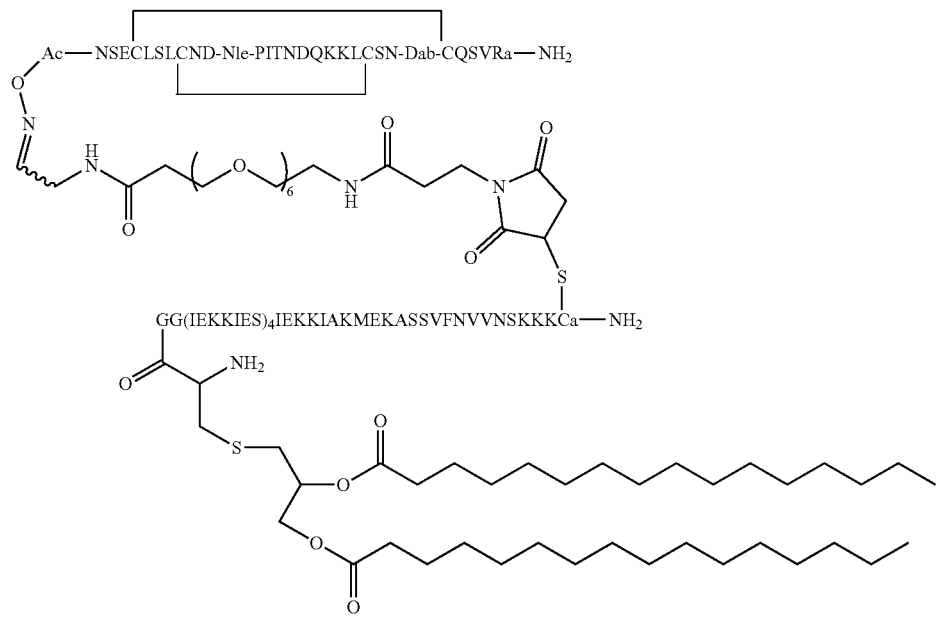
(12)
Conjugate 13 (Antigen A3+Linker B3+Lipopeptide C2)
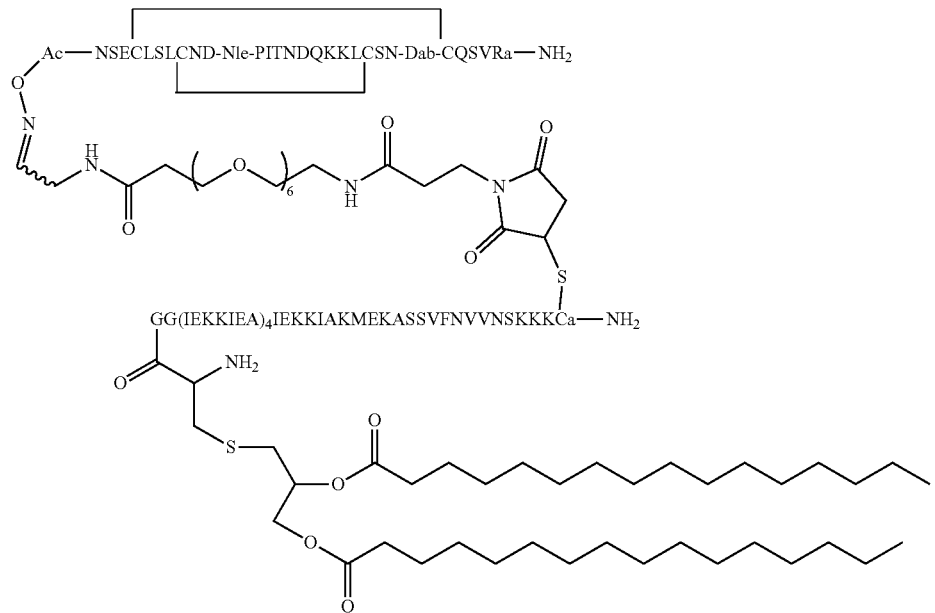
(13)

Conjugate 14 (Antigen A3+Linker B4+Lipopeptide C1)
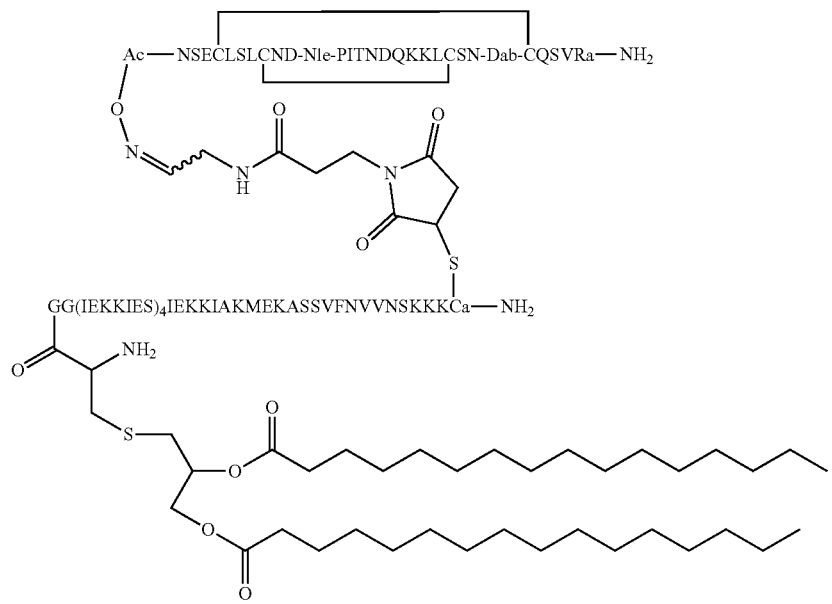
(14)
Conjugate 15 (Antigen A3+Linker B2+Lipopeptide C1)
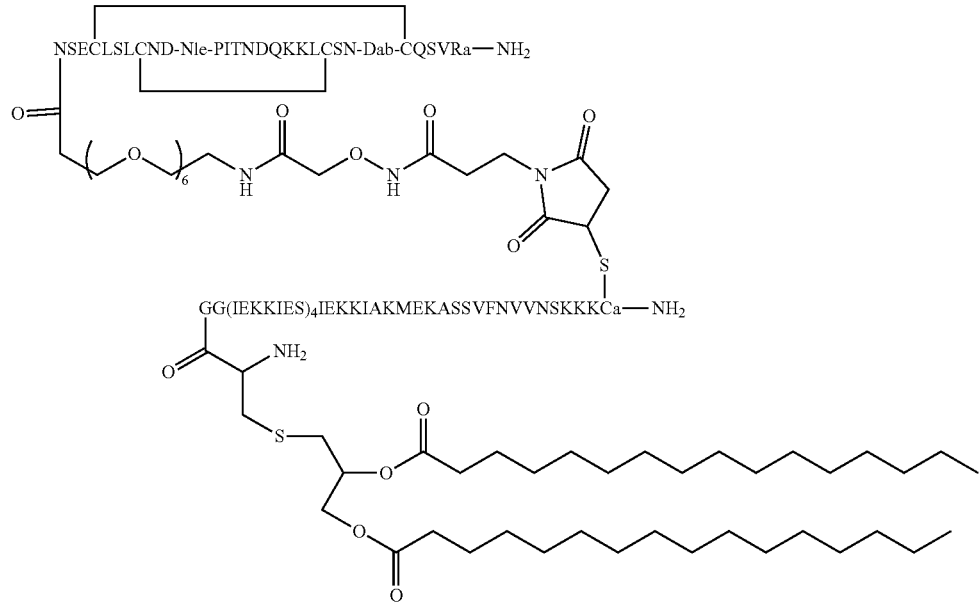
(15)
Conjugate 16 (Antigen A4+Linker B3+Lipopeptide C1)
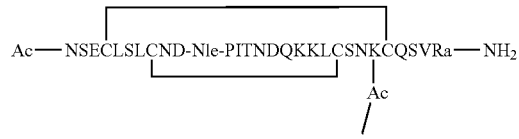
(16)

-continued
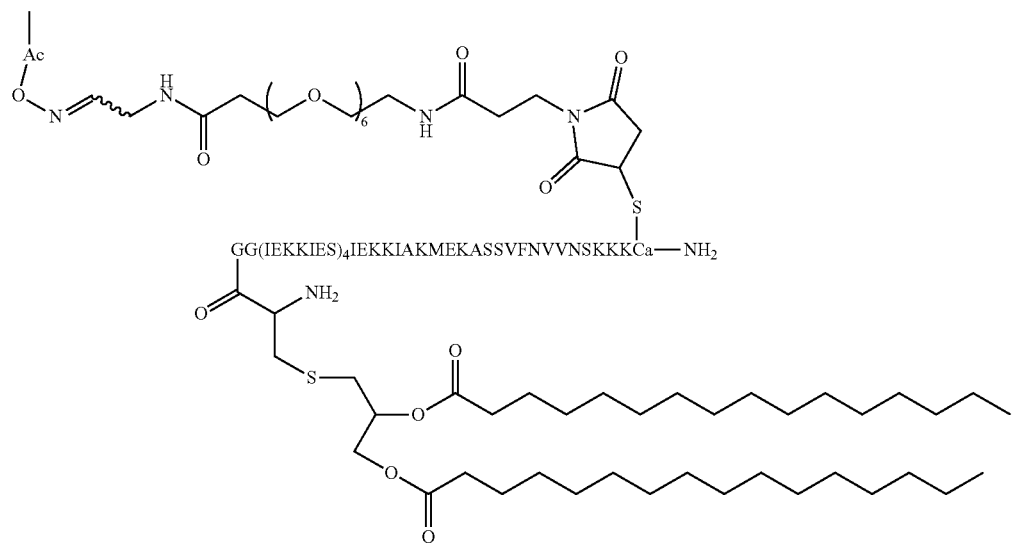
Conjugate 17 (Antigen A1+Linker B1+Lipopeptide C1)
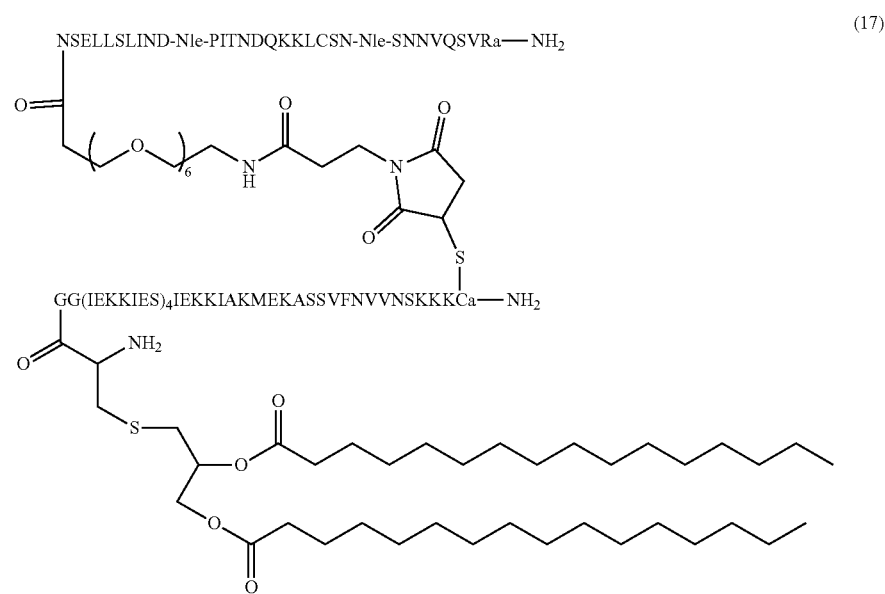
(17)

Conjugate 18 (Antigen A2+Linker B2+Lipopeptide C1)

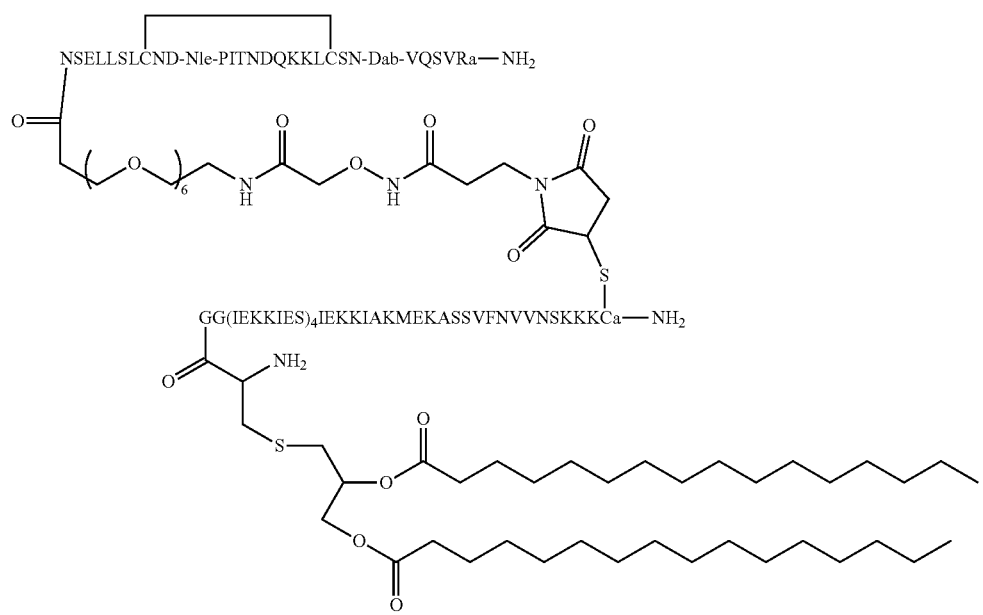

(18)

Example 3 of PCT/EP2018/065714 describes immunogenicity studies against RSV in mice, which specific disclosure is incorporated in its entirety herein by way of reference.

The results of Example 3 of PCT/EP2018/065714 demonstrate that immunization with conjugate 12, 13, and 15 elicits high neutralizing titers in serum without co-administration of an adjuvant. Lower but detectable titers were found in sera from animals immunized with conjugate 14 and 16 but not in sera from animals immunized with the corresponding linear or monocyclic peptide antigens (conjugates 17 and 18). Immunization with conjugate 12 leads to full protection of the lungs and reduced pulmonary histopathology after challenge, whereas only a partial reduction of virus in the lungs and strong histopathology is observed upon challenge after immunization with FI-RSV. Immunization with 13 also significantly reduces the virus-replication in the lungs and the pulmonary histopathology.

Example 4 of PCT/EP2018/065714 describes intramuscular immunization experiments, which specific disclosure is incorporated in its entirety herein by way of reference.

The results of Example 4 of PCT/EP2018/065714 shows that animals immunized with 150 µg or 300 µg of conjugate 12 showed a strong reduction (~3×Log 10) of virus titers compared to the PBS control group. The majority of animals did not have detectable virus in the lungs (Log 10 titer≤2.6 PFU/g). Animals vaccinated with FI-RSV, 15 µg or 15 µg+Adju-Phos® showed lesser protection (reduction by ~2×Log 10). The adjuvant did not seem to improve the protection. Animals immunized with PBS depicted the pathology typically associated with a primary RSV infection. Animals vaccinated with FI-RSV showed strong pathology, indicative of vaccine associated disease enhancement. All animals immunized with conjugate 12 showed no signs of vaccine associated disease enhancement and equal or lower pathology scores versus PBS control animals. The results show that two intramuscular immunizations with conjugate 12 without co-administration of an adjuvant are sufficient to high levels of protective neutralizing antibodies and that immunization with conjugate 12 does not cause enhanced respiratory disease over a wide dose range.

Example 5 describes the generation of monoclonal antibodies, which specific disclosure is incorporated in its entirety herein by way of reference.

The results of Example 5 of PCT/EP2018/065714 shows that antibodies with KD's in the sub nano-molar range and neutralizing potency similar or better to that of Palivizumab can be generated in mice after immunization with conjugate 12.

Example 6 describes the generation of sequence variants of the cyclic peptide and their syntheses, which specific disclosure is incorporated in its entirety herein by way of reference.

(Aminooxy)acetyl Peptide 19 (with SEQ ID NO:39)

(19)

(Aminooxy)acetyl Peptide 20 (with SEQ ID NO:40)

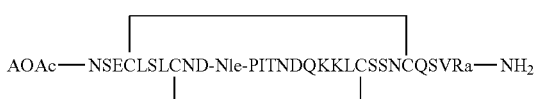

(20)

(Aminooxy)acetyl Peptide 21 (with SEQ ID NO:41)

(21)
AOAc—NSECLSLCND-Nle-PITNDQKKLCSSQCQSVRa—NH₂

(Aminooxy)acetyl Peptide 22 (with SEQ ID NO:42)

(22)
AOAc—NSECLSLCND-Nle-PITNDQKKLCSSSCQSVRa—NH₂

(Aminooxy)acetyl Peptide 23 (with SEQ ID NO:43)

(23)
AOAc—QSECLSLCND-Nle-PITNDQKKLCSN-Dab-CQSVRa—NH₂

(Aminooxy)acetyl Peptide 24 (with SEQ ID NO:44)

(24)
AOAc—QSECLSLCND-Nle-PITNDQKKLCSS-Dab-CQSVRa—NH₂

(Aminooxy)acetyl Peptide 25 (with SEQ ID NO:45)

(25)
AOAc—QSECLSLCND-Nle-PITNDQKKLCSSNCQSVRa—NH₂

(Aminooxy)acetyl Peptide 26 (with SEQ ID NO:46)

(26)
AOAc—QSECLSLCND-Nle-PITNDQKKLCSSQCQSVRa—NH₂

(Aminooxy)acetyl Peptide 27 (with SEQ ID NO:47)

(27)
AOAc—QSECLSLCND-Nle-PITNDQKKLCSSSCQSVRa—NH₂

(Aminooxy)acetyl Peptide 28 (with SEQ ID NO:48)

(28)
AOAc—SSECLSLCND-Nle-PITNDQKKLCSN-Dab-CQSVRa—NH₂

(Aminooxy)acetyl Peptide 29 (with SEQ ID NO:49)

(29)
AOAc—SSECLSLCND-Nle-PITNDQKKLCSS-Dab-CQSVRa—NH₂

(Aminooxy)acetyl Peptide 30 (with SEQ ID NO:50)

(30)
AOAc—SSECLSLCND-Nle-PITNDQKKLCSSSCQSVRa—NH₂

(Aminooxy)acetyl Peptide 31 (with SEQ ID NO:51)

(31)
AOAc—SSECLSLCND-Nle-PITNDQKKLCSSQCQSVRa—NH₂

(Aminooxy)acetyl Peptide 32 (with SEQ ID NO:52)

(32)
AOAc—SSECLSLCND-Nle-PITNDQKKLCSSSCQSVRa—NH₂

(Aminooxy)acetyl Peptide 33 (with SEQ ID NO:53)

(33)
AOAc—GSECLSLCND-Nle-PITNDQKKLCSN-Dab-CQSVRa—NH₂

55

(Aminooxy)acetyl Peptide 34 (with SEQ ID NO:54)

(Aminooxy)acetyl Peptide 35 (with SEQ ID NO:55)

56

(Aminooxy)acetyl Peptide 36 (with SEQ ID NO:56)

(Aminooxy)acetyl Peptide 37 (with SEQ ID NO:57)

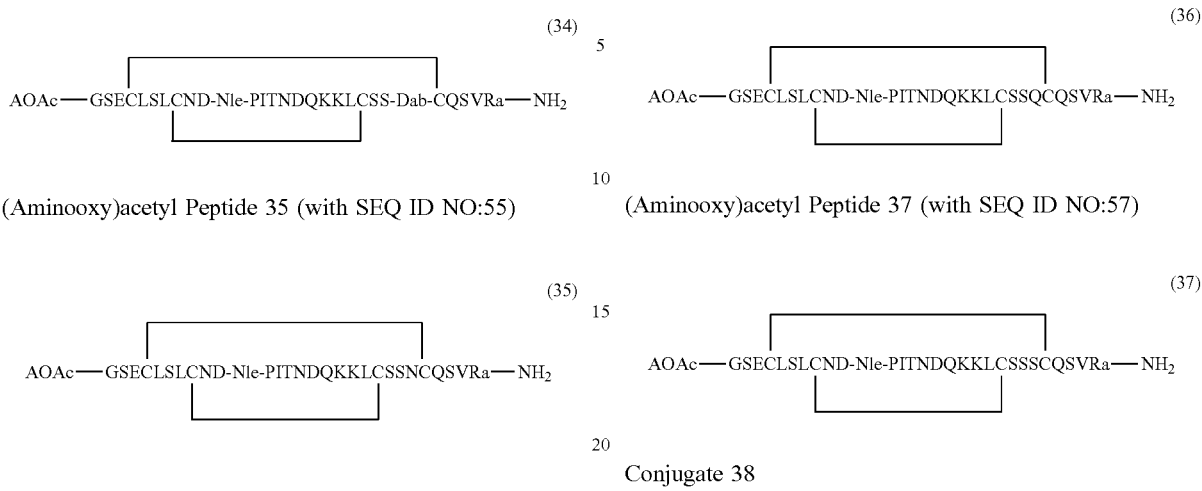

Conjugate 38

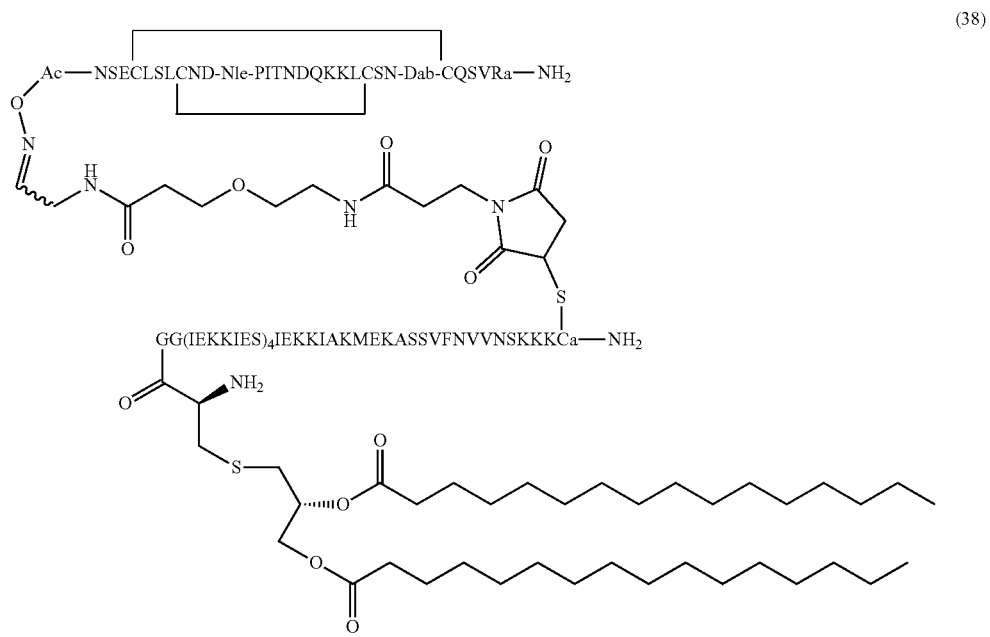

Conjugate 38 was prepared and purified essentially as described below for conjugate 39 except that lipopeptide building block LBB-2 was used instead of LBB-1. Analytical UPLC (ACQUITY UPLC BEH C8, 1.7 μm, 2.1×150 mm 10 to 90% MeCN in $H_2O$ (+0.1% TFA) over 45 min., 40° C.): Purity 79%, $t_R$=32.43 min. MALDI-MS: MW calc. for $C_{470}H_{815}N_{121}O_{144}S_7$: 10689.8 Da; found: 10746.9.

Conjugate 39

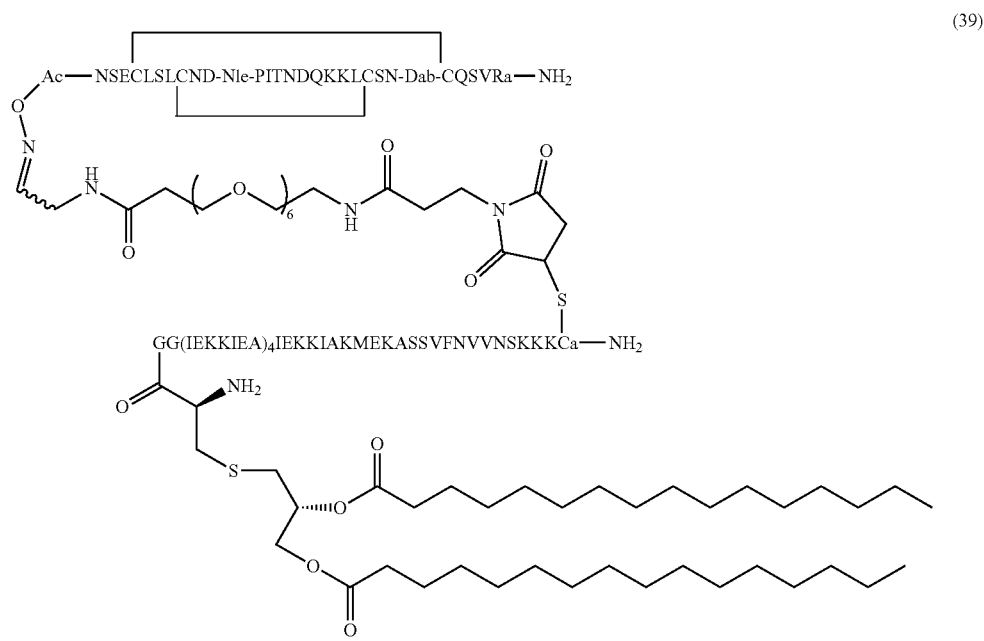

(39)

To prepare conjugate 39, a solution of (aminooxy)acetyl peptide 4 (3 mg, 0.9 µmol) in 0.25 ml 0.1 M sodium acetate buffer, pH 3.5 was added to linker 8 (1.9 mg, 3.6 µmol) in 0.25 ml 0.1 M sodium acetate buffer, pH 3.5. The mixture was stirred for 2.5 h and the oxime was purified by RP-HPLC on a preparative C8 column. The intermediate was analyzed by analytical UPLC (ACQUITY UPLC BEH C8, 1.7 µm, 2.1×150 mm, 10 to 70% MeCN in $H_2O$ (+0.1% TFA) over 60 min., 70° C.): Purity 95%, $t_R$=16.59 min. ESI-MS: MW calculated for $C_{158}H_{263}N_{47}O_{59}S_4$: 3893.35 Da; MW found: 3892.35 (+0.01%). The oxime (2.0 mg, 0.5 µmol) was dissolved in 0.5 ml $H_2O$ and added to a solution of lipopeptide building block LBB-1 (3.1 mg, 0.5 µmol) in 2 ml 50% MeCN. The pH was adjusted to pH=6.5 with 0.1N NaOH/0.1N HCl and the mixture was stirred at r.t. for 2.5 h. The conjugate 47 was purified by RP-HPLC on a C8 column. The TFA was removed using AG-X2 anion exchange resin (acetate form). The conjugate was analyzed by analytical UPLC and MS. UPLC (ACQUITY UPLC BEH C8, 1.7 µm, 2.1×150 mm 40 to 80% MeCN in $H_2O$ (+0.1% TFA) over 50 min., 40° C.): Purity 94%, $t_R$=20.75 min. ESI-MS: MW calc. for $C_{470}H_{815}N_{121}O_{148}S_7$: 10753.81 Da; found 10751.1 Da (±0.05%).

Example 3

Synthesis of a Malaria Peptide Antigen and Conjugates Comprising Said Peptide

Antigen 43

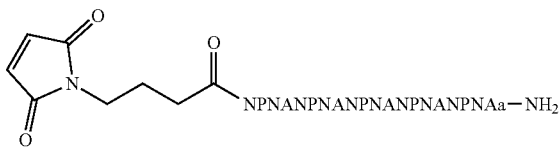

(43)

The peptide sequence is taken from the NPNA-repeat region of the circumsporozoite (CS) protein of the malaria parasite *Plasmodium falciparum*. An extra D-alanine-amide (denoted "a-$NH_2$") is added at the C-terminus to improve stability. The gamma-maleimidobutyryl (GMB) group has been added to allow conjugation with a cysteine residue. The synthesis of antigen 43 was essentially carried out, and the product was purified by RP-HPLC as described in WO 2008/068017. Analytical reverse phase RP-HPLC (Zorbax C18 column, 5 to 30% MeCN in $H_2O$ (+0.1% TFA) over 25 min.: purity>95%, $t_R$=13.02 min. LC-MS (Zorbax C18 column, 5 to 100% MeCN in H2O (+0.1% CHOOH) over 10 min): $t_R$=3.15 min.; ESI-MS m/z=746.5 [M+3H]3+

Conjugate 44

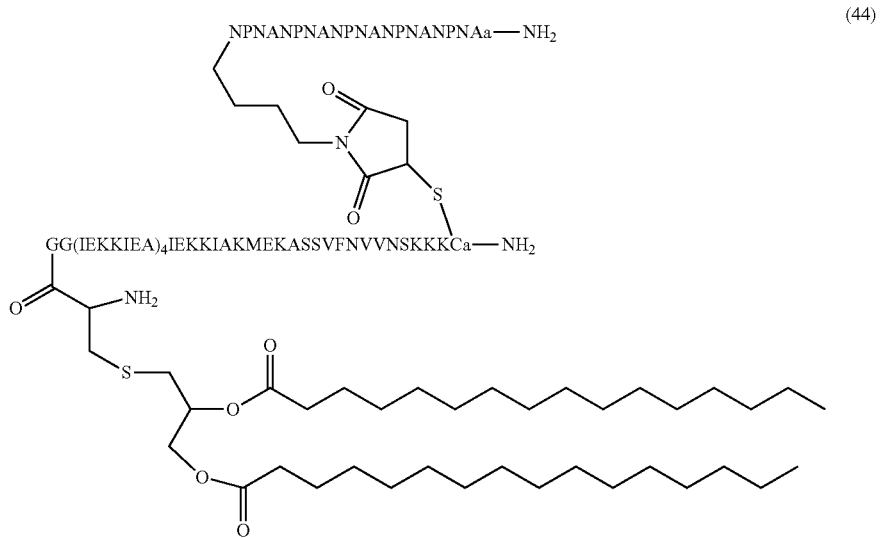

(44)

To couple the antigen 43 to the lipopeptide 10, a solution of lipopeptide 10 (6.8 mg, 1.0 µmol) in H$_2$O/MeCN 1:1 (0.5 ml) was added drop-wise to a stirred solution of 43 (2.7 mg, 1.2 µmol, 1.2 equiv.) in H2O/MeCN 1:1 (1 ml, 2.7 mg, 1.2 µmol, 1.2 equiv.). The pH was adjusted carefully to pH 6.5 using 0.1N NaOH and the mixture was stirred for 3 h. After completion of the coupling reaction, the mixture was diluted with H$_2$O containing 0.1% TFA (2 ml) and the conjugate was purified by reverse phase RP-HPLC on a C$_4$ semi-preparative column (Interchrom) using a gradient of 50 to 100% MeCN in H$_2$O (+0.1% TFA) over 17 min. Analytical reverse phase RP-HPLC (Interchrom C4 column, 25 to 100% MeCN in H$_2$O (+0.1% TFA) over 25 min.): purity>97%, $t_R$=19.64 min; MALDI-TOF: m/z calculated for C$_{403}$H$_{686}$N$_{106}$O$_{120}$S$_3$: 9032.6; m/z found: 9032.2 [M+H]$^+$.

Conjugate 45

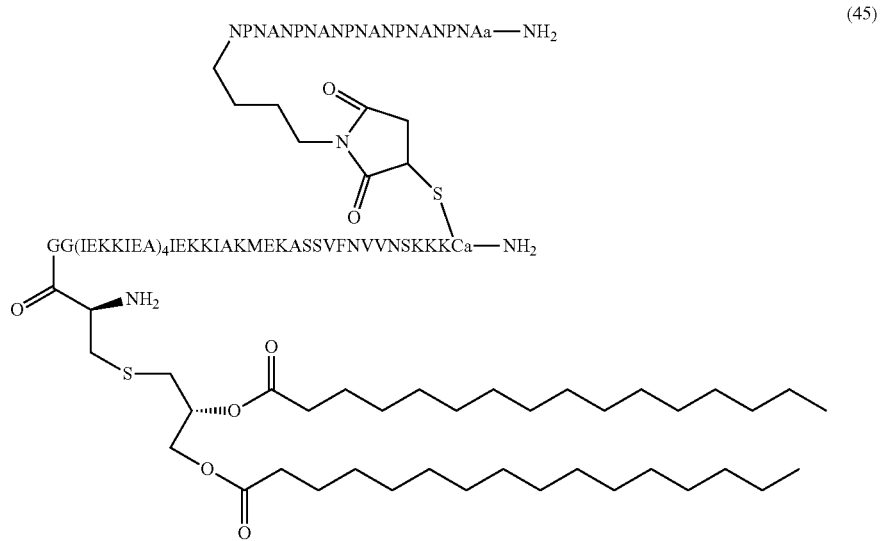

(45)

The synthesis and purification of conjugate 45 was essentially performed as described above for conjugate 44, except that LBB-1 was used instead of lipopeptide 10. Analytical reverse phase RP-HPLC (Interchrom C4 column, 25 to 100% MeCN in H$_2$O (+0.1% TFA) over 25 min.): purity>97%, $t_R$=19.64 min. MALDI-TOF: m/z calculated for C$_{403}$H$_{686}$N$_{106}$O$_{120}$S$_3$: 9032.6; m/z found: 9032.4 [M+H]+.

Conjugate 46

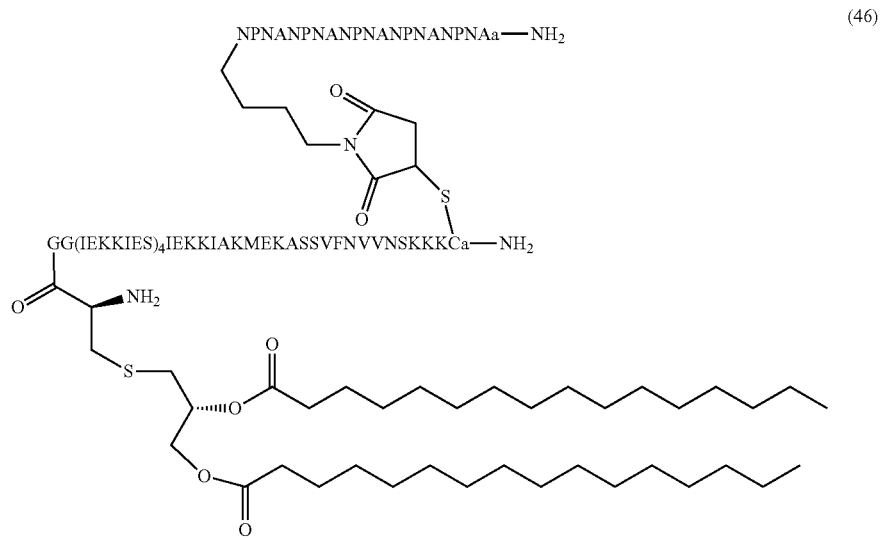

The synthesis and purification of conjugate 46 was essentially performed as described above for conjugate 44, except that LBB-2 was used instead of lipopeptide 10. UPLC (ACQUITY UPLC BEH C8, 1.7 μm, 2.1×150 mm, 10 to 90% MeCN in H$_2$O (+0.1% TFA) over 10 min., 25° C.): Purity >79%, $t_R$=35.76 min.): purity 90%, $t_R$=8.62 min.; MALDI-TOF: m/z calculated for $C_{403}H_{687}N_{107}O_{123}S_3$: 9095.74; m/z found: 9096.6.

Example 4

Avidity Index of Conjugates Comprising a Malaria Peptide Antigen

For mouse immunogenicity studies, Balb/c mice (5 per group) were s.c. immunized with the formulations depicted in Table 2.

TABLE 2

| Formulations | | | | |
|---|---|---|---|---|
| No. | Description | Dose | Adjuvant | Route |
| 1 | 44 in 0.1 ml PBS | 40 μg | none | SC |
| 2 | 45 in 0.1 ml PBS | 40 μg | none | SC |
| 3 | 46 in 0.1 ml PBS | 40 μg | none | SC |

Immunizations where performed on days 0, 28 and 56. Blood was collected on day 66. Relative avidity indices were determined by KSCN elution ELISA essentially as described (Perciani et al, J Clin Lab Anal. 2007; 21 (3): 201-6) using 2 M KSCN for elution.

IgG endpoint dilution ELISA were essentially performed as in WO 2008/068017. For the KSCN elution ELISA, Nunc Immunoplates Polysorb F96) where coated over night with 50 μl of a 5 μg/ml antigen solution in PBS, washed 3× with 150 μl PBS containing 0.05% TWEEN® 20 and incubated for 2.5 h with duplicates of two-fold serum dilutions in PBS containing 0.5% skim milk powder and 0.05% TWEEN® (50 μl per well) at room temperature. Plates were washed three times with PBS containing 0.05% TWEEN® 20 as described above. One half of the wells were incubated with 2 M KSCN in PBS, pH 7.2 for 15 min and the other half of the wells was incubated with plain PBS for the same amount of time. The plates were then washed, incubated with 50 μl of alkaline phosphatase conjugated rabbit anti-mouse IgG antibody (Sigma, gamma chain specific), diluted 1:20'000 in PBS containing 0.5% skim milk powder and 0.05% TWEEN® 20 for 1 h at room temperature, washed again three times with PBS+0.05% TWEEN® 20 and incubated in the dark with 50 μl of a 1 mg/ml solution of p-nitrophenyl phosphate (Sigma) in 50 mM sodium carbonate, 1 mM MgCl2, pH 9.6 at room temperature. The absorbance was read after appropriate time at 405 nm on a SpectraMax M5 microplate reader. The avidity index was then calculated for each serum as ratio between the area under the curves obtained for the KSCN treated wells and the area under the curves obtained for the corresponding controls (Perciani et al, J Clin Lab Anal. 2007; 21 (3): 201-6).

Mean log 10 IgG ELISA endpoint dilution titers and mean avidity indices±one standard error of the mean are shown in Table 3 and FIG. 1.

TABLE 3

| Mean Avidity index. | | | |
|---|---|---|---|
| No. | Description | Log 10 Mean ELISA endpoint titer ± SEM | Mean Avidity Index ± SEM |
| 1 | 44 in 0.1 ml PBS | 5.05 ± 0.08 | 0.46 ± 0.03 |
| 2 | 45 in 0.1 ml PBS | 5.06 ± 0.14 | 0.55 ± 0.07 |
| 3 | 46 in 0.1 ml PBS | 4.18 ± 0.12 | 0.69 ± 0.08 |

The results show that immunization with conjugate 45 comprising the heptad repeat motif IEKKIEA and the lipid Pam2Cys with the (R)-configuration at the 2-propyl carbon without co-administration of an adjuvant leads to higher avidity antibodies than immunization with 44 which comprises a mixture of (R)- and (S)-diastereomers at the 2-propyl carbon, and further show that immunization with conjugate 46, which comprises IEKKIES instead of IEKKIEA leads to an even higher mean avidity index (P=0.0291) despite a significantly lower endpoint dilution titer (P=0.0011) vs. 44.

Example 5

Avidity Index of Conjugates Comprising a RSV Antigen

For mouse immunogenicity studies, Balb/c mice (5 per group) were immunized with the formulations in Table 4.

TABLE 4

Formulations

| No. | Description | Dose | Adjuvant | Route |
|---|---|---|---|---|
| 1 | 47 in 0.1 ml PBS | 50 µg | none | SC |
| 2 | 38 in 0.1 ml PBS | 50 µg | none | SC |

Immunizations where performed on days 0, 28 and 56. Blood was collected on day 66. Relative avidity indices were determined by KSCN elution ELISA essentially as described (Perciani et al, J Clin Lab Anal. 2007; 21(3):201-6) using 2 M KSCN for elution.

Mean avidity indices±one standard error of the mean are shown in Table 5.

TABLE 5

Mean Avidity index.

| No. | Description | Mean Avidity Index ± SEM |
|---|---|---|
| 1 | 47 in 0.1 ml PBS | 0.58 ± 0.06 |
| 2 | 38 in 0.1 ml PBS | 0.64 ± 0.02 |

Example 6

Immunogenicity and Efficacy of Two Subcutaneous Administrations of Conjugate 38 In Mice For this experiment 6-8 weeks old female BALB/c mice (ten animals per group) were immunized two times by the subcutaneous route with 150 µg of conjugate 38 in 0.1 ml PBS (Table 6, No. 1). Two control groups (ten animals per group) were immunized two times with FI-RSV and PBS, respectively (Table 6, No. 2 and 3).

TABLE 6

Formulations

| No. | Description | Dose | Adjuvant | Route |
|---|---|---|---|---|
| 1 | 38 in 0.1 ml PBS | 150 µg | none | SC |
| 2 | FI-RSV | 1:100 | none | SC |
| 3 | PBS | 0 | none | SC |

Animals were immunized on days 0 and 21. On day 42 (D42) all animals where bled and further challenged intranasally with $10^6$ pfu RSV A2 live virus. Five days later, on day 47 (D47), animals were sacrificed, totally bled and the lungs were harvested and bi-sected for viral titrations and histopathology analysis.

Sera from D0 and D42 (of animals bled previous to challenge) of the groups immunized with conjugate 38, FI-RSV and PBS were analyzed by Plaque Reduction Neutralization Test (PRNT) for neutralizing antibodies against RSV A2 strain. Test sera was heat inactivated 30 min. at 56° C., diluted 1:10 with EMEM and serially diluted further 1:4. Diluted serum samples were incubated with equal volumes of RSV A2 (25-50 PFU) for 1 hour at room temperature and inoculated in duplicates onto confluent HEp-2 monolayers in 24 well plates. After one hour of incubation at 37° C. in a 5% $CO_2$ incubator, the wells were overlaid with 0.75% Methylcellulose medium. After 4 days of incubation, the overlays were removed, and the cells were fixed and stained with 0.1% crystal violet for one hour and then rinsed and air-dried. Neutralization titers were calculated as reciprocal serum dilutions required to reach 60% plaque reduction versus virus control wells. The Log 2 virus PRNT titer for RSV A2 is summarized in Table 7.

TABLE 7

Induction of Neutralizing antibodies.

| No. | Description | PRNT titer ($log_2$) D0 | PRNT titer ($log_2$) D42 |
|---|---|---|---|
| 1 | 150 µg 38 in PBS | <4.32 | 7.32 ± 0.54 |
| 2 | FI-RSV | <4.32 | <4.32 |
| 3 | PBS | <4.32 | <4.32 |

Two immunizations with conjugate 38 induced high titers of neutralizing antibodies at a dose of 150 µg. The FI-RSV and PBS lead to titers of neutralizing antibodies below the limit of detection (<4.32)

For viral titrations, lung homogenates from D47 were clarified by centrifugation and diluted in EMEM. Confluent HEp-2 monolayers were infected in duplicates with diluted homogenates in 24 well plates. After one hour incubation at 37° C. in a 5% $CO_2$ incubator, the wells were overlaid with 0.75% methylcellulose medium. After 4 days of incubation, the overlays were removed, and the cells were fixed and stained with 0.1% crystal violet for one hour and then rinsed and air dried. Plaques were counted and plaque forming units per gram of tissue were calculated. The geometric mean virus titers are summarized below in Table 8 for D47 (5 days after challenge) samples.

For pulmonary histopathology analysis, lungs were dissected, formalin fixed and embedded in paraffin as described above. Lung sections were stained with hematoxylin and eosin (H & E) for analysis of the four parameters of pulmonary inflammation: peribronchiolitis, perivasculitis, interstitial pneumonia, and alveolitis. Slides were scored blind on a 0-4 severity scale. The scores were subsequently converted to a 0-100% histopathology scale. Average pathology scores are summarized below in Table 8 for D47 samples.

TABLE 8

Lung virus titers and pathology scores on Day 47.

| No. | Description | Lung virus titer D47 ($Log10$ PFU/g) | Avg. pathology score D47 (0-100%) |
|---|---|---|---|
| 2 | 150 µg 38 in PBS | 2.58 ± 0.81 | 13.33 ± 3.33 |
| 5 | FI-RSV | 3.95 ± 1.24 | 91.25 ± 3.77 |
| 6 | PBS | 4.76 ± 1.50 | 26.25 ± 6.41 |

All animals immunized with PBS showed maximal viral titers in the lung five days post challenge (mean titer ~4.76 Log 10 PFU/g). Animals immunized with 150 µg of conjugate 38 showed a strong reduction (mean titer ~2.58 Log 10 PFU/g) of virus titers and the majority of animals did not have detectable virus in the lungs (Log 10 titer≤2.6 PFU/g). Animals vaccinated with FI-RSV showed lesser protection (mean titer ~3.95 Log 10 PFU/g). On the histopathological level, Animals immunized with PBS depicted the pathology typically associated with a primary RSV infection. Animals vaccinated with FI-RSV showed strong pathology, indicative of vaccine associated disease enhancement. All animals immunized with conjugate 38 showed no signs of vaccine associated disease enhancement and equal or lower pathology scores versus PBS control animals (Table 8).

The results show that two subcutaneous immunizations with conjugate 38 without co-administration of an adjuvant are sufficient to elicit high titers of protective neutralizing antibodies, to protect against RSV A2 virus replication in the lung and the immunization with conjugate 38 does not cause enhanced respiratory disease.

The invention claimed is:

1. A lipopeptide building block consisting of:
   (i) a peptide moiety comprising a coiled coil peptide chain segment, wherein said coiled coil peptide chain segment comprises 3 to 8 repeat units, wherein said repeat unit consists of the sequence IEKKIES (SEQ ID NO:13); and
   (ii) a lipid moiety comprising the formula LM-I

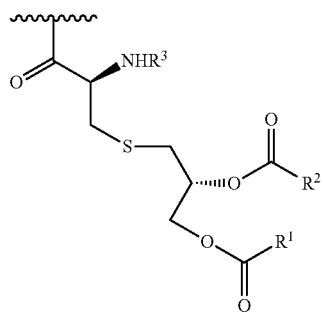

LM-I wherein $R^1$ and $R^2$ are independently $C_{11-15}$ alkyl, wherein $R^3$ is hydrogen or —C(O) $C_{11-15}$ alkyl;

wherein said lipid moiety is linked to said peptide moiety, and wherein the wavy line in formula LM-I indicates the linkage site to said peptide moiety.

2. The lipopeptide building block of claim 1, wherein said lipid moiety is linked to the N-terminus of said peptide moiety.

3. The lipopeptide building block of claim 1, wherein said coiled coil peptide chain segment of said peptide moiety consists of 4 repeat units.

4. The lipopeptide building block of claim 3, wherein said 4 repeat units are consecutively linked to each other.

5. The lipopeptide building block of claim 1, wherein said coiled coil peptide chain segment consists of the sequence (IEKKIES) 4 (SEQ ID NO:62).

6. The lipopeptide building block of claim 1, wherein said lipid moiety consists of the formula LM-I*

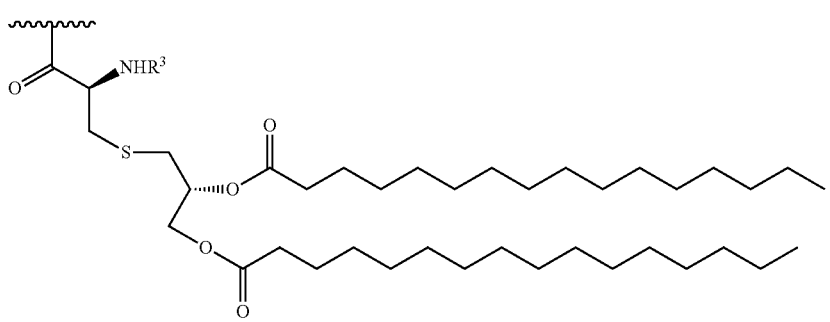

LM-I* and wherein $R^3$ is hydrogen or —C(O) $C_{11-15}$ alkyl.

7. The lipopeptide building block of claim 1, wherein said lipid moiety consists of the formula LM-I*1:

LM-I*1

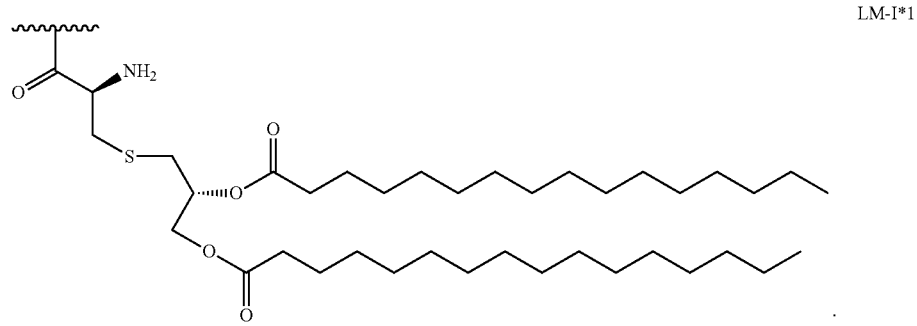 [SMILES: *C(=O)[C@@H](N)CSC[C@@H](COC(=O)CCCCCCCCCCCCCCC)OC(=O)CCCCCCCCCCCCCCC]

8. The lipopeptide building block of claim 1, wherein said lipid moiety and said peptide moiety are linked directly or via a coupling moiety, wherein said coupling moiety is an amino acid linker.

9. The lipopeptide building block of claim 1, wherein said peptide moiety further comprises a T-helper cell epitope.

10. The lipopeptide building block of claim 1, wherein said lipopeptide building block is of the formula LBB-2:

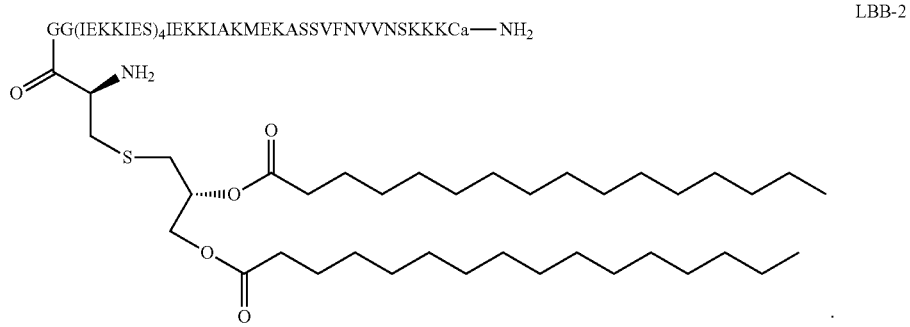

11. A conjugate comprising
(a) a lipopeptide building block of claim 1, and
(b) an antigen,
wherein said antigen is connected, directly or via a linker, to said lipopeptide building block.

12. The conjugate of claim 11, wherein said lipopeptide building block is of the formula LBB-2:

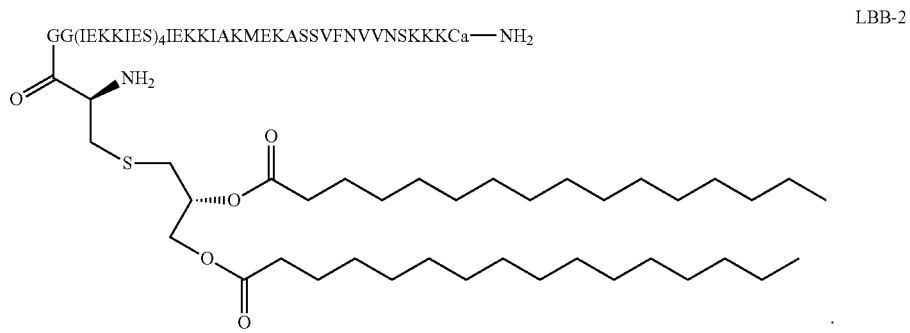

13. The conjugate of claim 11, wherein said antigen is a tumor antigen, a self-antigen, a polypeptide of a pathogen, an allergen, or a hapten.

14. The conjugate of claim 13, wherein said lipopeptide building block is of the formula LBB-2:

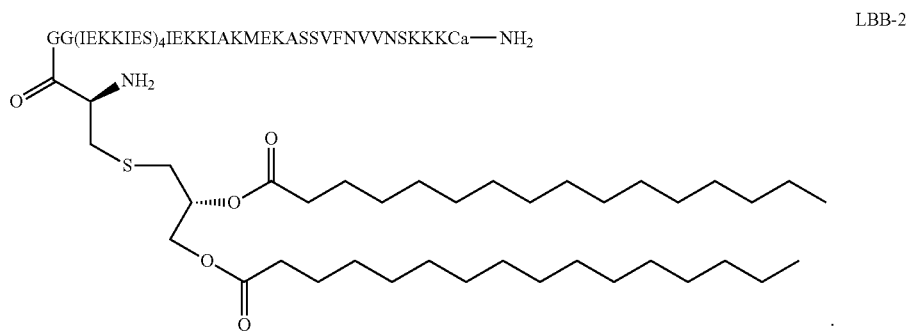

15. The conjugate of claim 11, wherein said conjugate is selected from any one of the formulae (38), (40), (41) or (42):
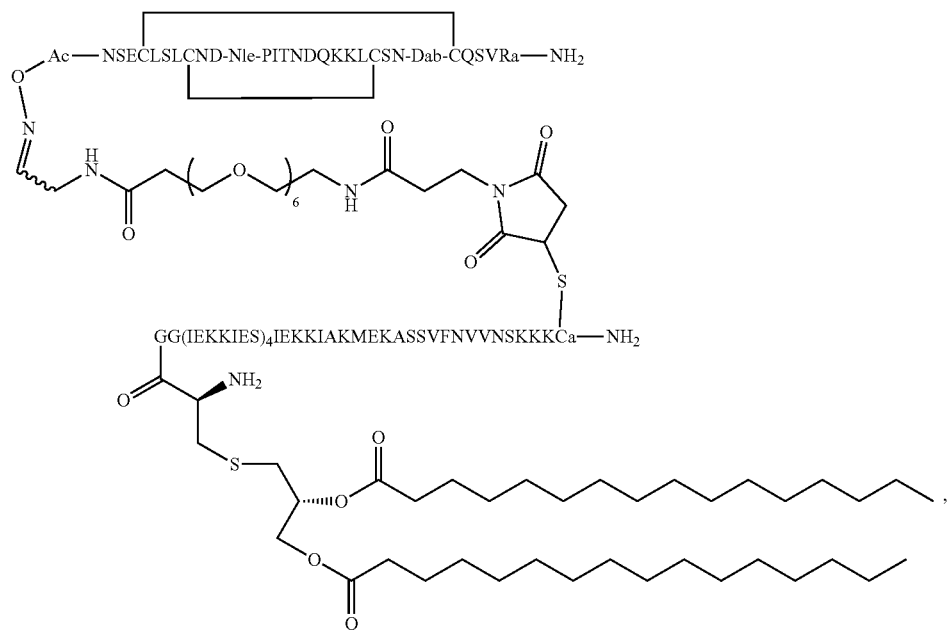
(38)
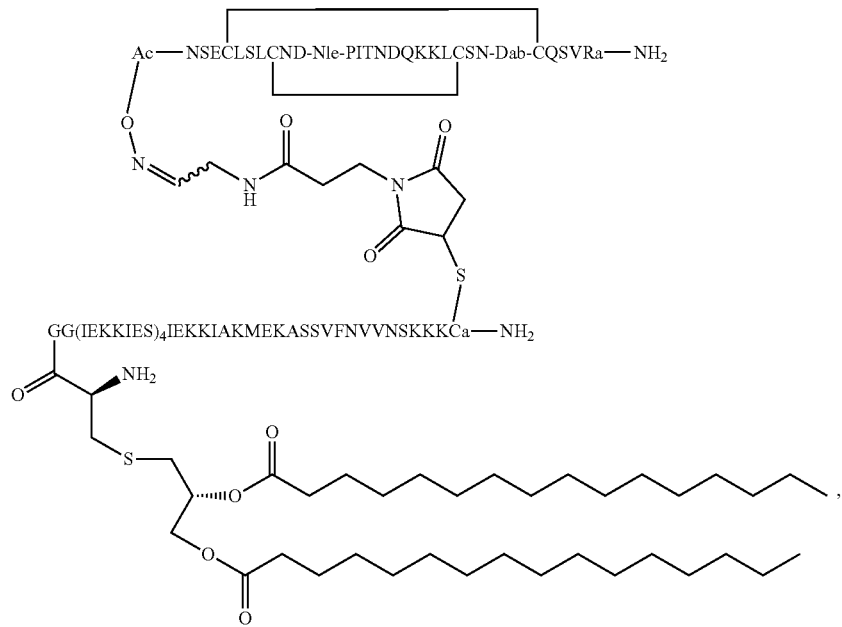
(40)

(41)

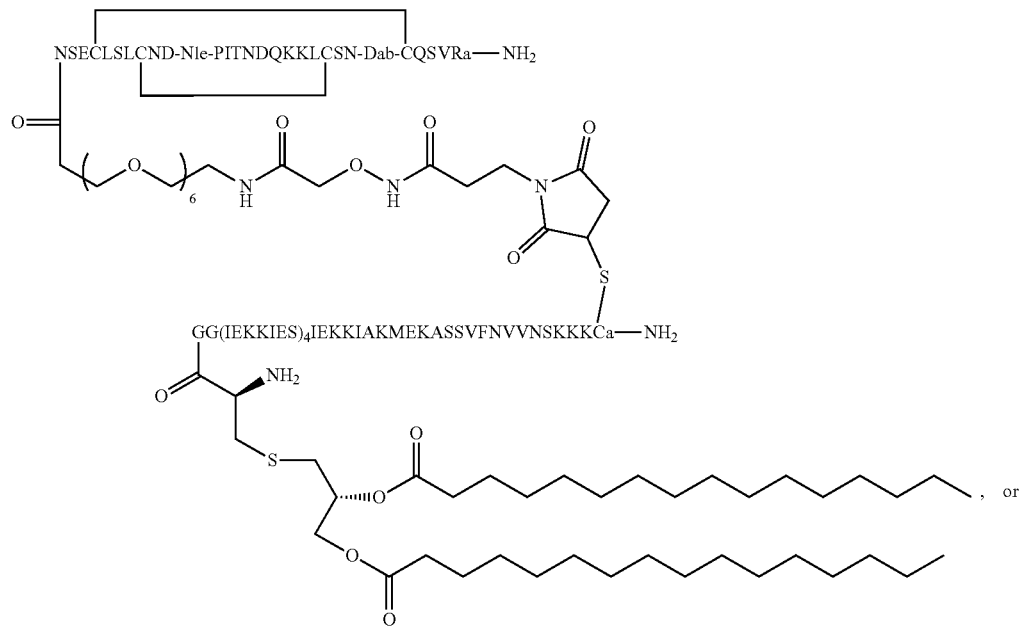

(42)

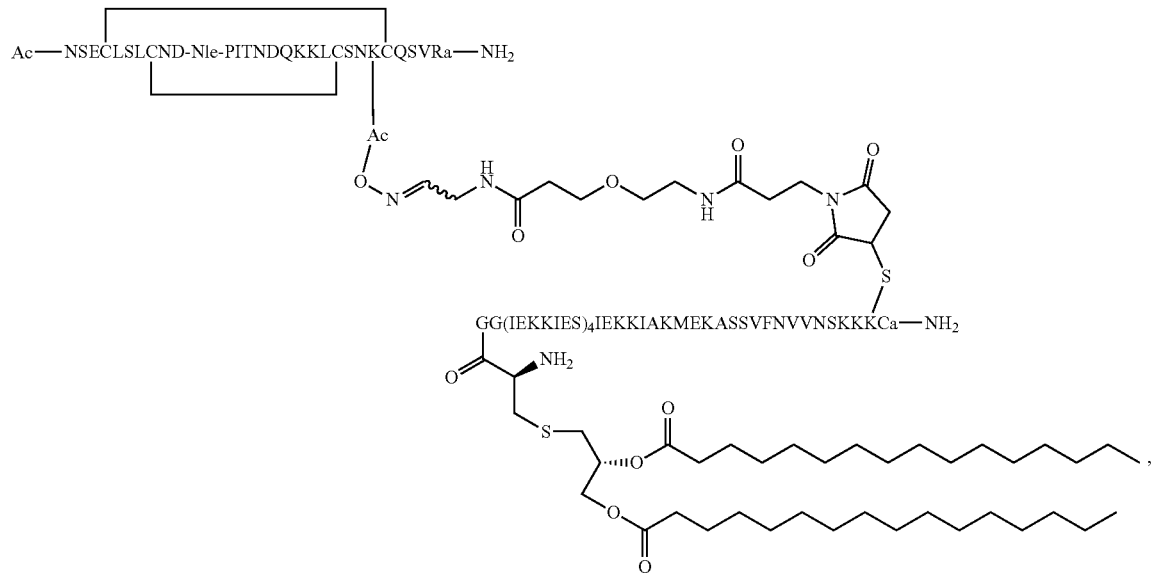

16. A bundle of conjugates comprising 2, 3, 4, 5, 6 or 7 conjugates of claim 11.

17. A synthetic virus-like particle comprising at least one bundle of conjugates of claim 16.

18. A pharmaceutical composition comprising an immunologically effective amount of the synthetic virus like particle of claim 17, together with a pharmaceutically acceptable diluent, carrier or excipient.

19. A pharmaceutical composition comprising an immunologically effective amount of the conjugate of claim 11, together with a pharmaceutically acceptable diluent, carrier or excipient.

20. A method of inducing an immune response in a subject in need thereof, the method comprising administering to the subject an immunogenically effective amount of a conjugate of claim 11.

* * * * *

SEQUENCE LISTING

```
<160> NUMBER OF SEQ ID NOS: 88

<210> SEQ ID NO 1
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (1)..(3)
<223> OTHER INFORMATION: Any amino acid
<220> FEATURE:
<221> NAME/KEY: MOD_RES
<222> LOCATION: (5)..(7)
<223> OTHER INFORMATION: Any amino acid
<220> FEATURE:
<221> NAME/KEY: MOD_RES
<222> LOCATION: (9)..(11)
<223> OTHER INFORMATION: Any amino acid
<220> FEATURE:
<221> NAME/KEY: MOD_RES
<222> LOCATION: (22)..(24)
<223> OTHER INFORMATION: Any amino acid
<220> FEATURE:
<221> NAME/KEY: MOD_RES
<222> LOCATION: (26)..(29)
<223> OTHER INFORMATION: Any amino acid
<220> FEATURE:
<221> NAME/KEY: MOD_RES
<222> LOCATION: (30)..(30)
<223> OTHER INFORMATION: Any amino acid or absent

<400> SEQUENCE: 1

Xaa Xaa Xaa Cys Xaa Xaa Xaa Cys Xaa Xaa Xaa Pro Ile Thr Asn Asp
1               5                   10                  15

Gln Lys Lys Leu Cys Xaa Xaa Xaa Cys Xaa Xaa Xaa Xaa Xaa
            20                  25                  30

<210> SEQ ID NO 2
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (24)..(24)
<223> OTHER INFORMATION: Dbu
<220> FEATURE:
<221> NAME/KEY: MOD_RES
<222> LOCATION: (30)..(30)
<223> OTHER INFORMATION: D-alanine

<400> SEQUENCE: 2

Asn Ser Glu Cys Leu Ser Leu Cys Asn Asp Xaa Pro Ile Thr Asn Asp
1               5                   10                  15
```

Gln Lys Lys Leu Cys Ser Asn Xaa Cys Gln Ser Val Arg Xaa
            20                  25                  30

<210> SEQ ID NO 3
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (30)..(30)
<223> OTHER INFORMATION: D-alanine

<400> SEQUENCE: 3

Asn Ser Glu Cys Leu Ser Leu Cys Asn Asp Xaa Pro Ile Thr Asn Asp
1               5                   10                  15

Gln Lys Lys Leu Cys Ser Asn Lys Cys Gln Ser Val Arg Xaa
            20                  25                  30

<210> SEQ ID NO 4
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (12)..(12)
<223> OTHER INFORMATION: Nle
<220> FEATURE:
<221> NAME/KEY: MOD_RES
<222> LOCATION: (30)..(30)
<223> OTHER INFORMATION: D-alanine

<400> SEQUENCE: 4

Arg Leu Ser Glu Cys Leu Ser Leu Cys Asn Asp Xaa Pro Ile Thr Asn
1               5                   10                  15

Asp Gln Lys Lys Leu Cys Ser Asn Asn Cys Leu Lys Ser Xaa
            20                  25                  30

<210> SEQ ID NO 5
<211> LENGTH: 40
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (40)..(40)
<223> OTHER INFORMATION: D-alanine

<400> SEQUENCE: 5

Pro Val Ser Thr Tyr Met Leu Thr Asn Ser Glu Cys Leu Ser Leu Cys
1               5                   10                  15

Asn Asp Met Pro Ile Thr Asn Asp Gln Lys Lys Leu Cys Ser Asn Asn
            20                  25                  30

Cys Gln Ile Val Arg Gln Gln Xaa
            35                  40

```
<210> SEQ ID NO 6
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: T helper cell epitope

<400> SEQUENCE: 6

Ile Glu Lys Lys Ile Ala Lys Met Glu Lys Ala Ser Ser Val Phe Asn
1               5                   10                  15

Val Val Asn Ser
            20

<210> SEQ ID NO 7
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: FSL-1
<220> FEATURE:
<221> NAME/KEY: BINDING
<222> LOCATION: (1)..(1)
<223> OTHER INFORMATION: S-(2,3-bispalmitoyloxypropyl)

<400> SEQUENCE: 7

Cys Gly Asp Pro Lys His Pro Lys Ser Phe
1               5                   10

<210> SEQ ID NO 8
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: FSL-2
<220> FEATURE:
<221> NAME/KEY: BINDING
<222> LOCATION: (1)..(1)
<223> OTHER INFORMATION: S-(2,3-bispalmitoyloxypropyl)

<400> SEQUENCE: 8

Cys Gly Asp Pro Lys His Pro Lys Ser Arg
1               5                   10

<210> SEQ ID NO 9
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: FSL-3
<220> FEATURE:
<221> NAME/KEY: BINDING
<222> LOCATION: (1)..(1)
<223> OTHER INFORMATION: S-(2,3-bisstearyloxypropyl)

<400> SEQUENCE: 9

Cys Gly Asp Pro Lys His Pro Lys Ser Phe
1               5                   10
```

```
<210> SEQ ID NO 10
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: MALP-2
<220> FEATURE:
<221> NAME/KEY: BINDING
<222> LOCATION: (1)..(1)
<223> OTHER INFORMATION: S-(2,3-bispalmitoyloxypropyl)

<400> SEQUENCE: 10

Cys Gly Asn Asn Asp Glu Ser Asn Ile Ser Phe Lys Glu Lys
1               5                   10

<210> SEQ ID NO 11
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: C-terminal sequence
<220> FEATURE:
<221> NAME/KEY: MOD_RES
<222> LOCATION: (5)..(5)
<223> OTHER INFORMATION: D-alanine

<400> SEQUENCE: 11

Lys Lys Lys Cys Xaa
1               5

<210> SEQ ID NO 12
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: heptad motif

<400> SEQUENCE: 12

Ile Glu Lys Lys Ile Glu Ala
1               5

<210> SEQ ID NO 13
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: heptad motif

<400> SEQUENCE: 13

Ile Glu Lys Lys Ile Glu Ser
1               5

<210> SEQ ID NO 14
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
```

```
<220> FEATURE:
<221> NAME/KEY: BINDING
<222> LOCATION: (1)..(1)
<223> OTHER INFORMATION: Maleimido moiety
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (21)..(21)
<223> OTHER INFORMATION: Nle
<220> FEATURE:
<221> NAME/KEY: MOD_RES
<222> LOCATION: (30)..(30)
<223> OTHER INFORMATION: D-alanine
<220> FEATURE:
<221> NAME/KEY: MOD_RES
<222> LOCATION: (30)..(30)
<223> OTHER INFORMATION: AMIDATION

<400> SEQUENCE: 14

Asn Ser Glu Leu Leu Ser Leu Ile Asn Asp Xaa Pro Ile Thr Asn Asp
1               5                   10                  15

Gln Lys Lys Leu Xaa Ser Asn Asn Val Gln Ser Val Arg Xaa
            20                  25                  30

<210> SEQ ID NO 15
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: BINDING
<222> LOCATION: (1)..(1)
<223> OTHER INFORMATION: AoAc moiety incl. a 1-amino-3,6,9,12,15,18-
      hexaoxaheneicosan-21-oic amide linker
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (24)..(24)
<223> OTHER INFORMATION: Dbu
<220> FEATURE:
<221> NAME/KEY: MOD_RES
<222> LOCATION: (30)..(30)
<223> OTHER INFORMATION: D-alanine
<220> FEATURE:
<221> NAME/KEY: MOD_RES
<222> LOCATION: (30)..(30)
<223> OTHER INFORMATION: AMIDATION

<400> SEQUENCE: 15

Asn Ser Glu Leu Leu Ser Leu Cys Asn Asp Xaa Pro Ile Thr Asn Asp
1               5                   10                  15

Gln Lys Lys Leu Cys Ser Asn Xaa Val Gln Ser Val Arg Xaa
            20                  25                  30

<210> SEQ ID NO 16
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: BINDING
<222> LOCATION: (1)..(1)
<223> OTHER INFORMATION: AoAc moiety incl. 1-amino-3,6,9,12,15,18-
```

```
                hexaoxaheneicosan-21-oic amide linker
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (24)..(24)
<223> OTHER INFORMATION: Dbu
<220> FEATURE:
<221> NAME/KEY: MOD_RES
<222> LOCATION: (30)..(30)
<223> OTHER INFORMATION: D-alanine
<220> FEATURE:
<221> NAME/KEY: MOD_RES
<222> LOCATION: (30)..(30)
<223> OTHER INFORMATION: AMIDATION

<400> SEQUENCE: 16

Asn Ser Glu Cys Leu Ser Leu Cys Asn Asp Xaa Pro Ile Thr Asn Asp
1               5                   10                  15

Gln Lys Lys Leu Cys Ser Asn Xaa Cys Gln Ser Val Arg Xaa
            20                  25                  30

<210> SEQ ID NO 17
<211> LENGTH: 30
<212> TYPE: PRT
<213> ORGANISM: Artificial Sequence
<220> FEATURE:
<223> OTHER INFORMATION: Description of Artificial Sequence: Synthetic
        polypeptide
<220> FEATURE:
<221> NAME/KEY: BINDING
<222> LOCATION: (1)..(1)
<223> OTHER INFORMATION: AoAc moiety
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (24)..(24)
<223> OTHER INFORMATION: Dbu
<220> FEATURE:
<221> NAME/KEY: MOD_RES
<222> LOCATION: (30)..(30)
<223> OTHER INFORMATION: D-alanine
<220> FEATURE:
<221> NAME/KEY: MOD_RES
<222> LOCATION: (30)..(30)
<223> OTHER INFORMATION: AMIDATION

<400> SEQUENCE: 17

Asn Ser Glu Cys Leu Ser Leu Cys Asn Asp Xaa Pro Ile Thr Asn Asp
1               5                   10                  15

Gln Lys Lys Leu Cys Ser Asn Xaa Cys Gln Ser Val Arg Xaa
            20                  25                  30

<210> SEQ ID NO 18
<211> LENGTH: 30
<212> TYPE: PRT
<213> ORGANISM: Artificial Sequence
<220> FEATURE:
<223> OTHER INFORMATION: Description of Artificial Sequence: Synthetic
        polypeptide
<220> FEATURE:
<221> NAME/KEY: BINDING
<222> LOCATION: (1)..(1)
<223> OTHER INFORMATION: Ac moiety
<220> FEATURE:
<221> NAME/KEY: MOD_RES
<222> LOCATION: (11)..(11)
<223> OTHER INFORMATION: Nle
```

```
<220> FEATURE:
<221> NAME/KEY: BINDING
<222> LOCATION: (24)..(24)
<223> OTHER INFORMATION: AOAc moiety
<220> FEATURE:
<221> NAME/KEY: MOD_RES
<222> LOCATION: (30)..(30)
<223> OTHER INFORMATION: D-alanine
<220> FEATURE:
<221> NAME/KEY: MOD_RES
<222> LOCATION: (30)..(30)
<223> OTHER INFORMATION: AMIDATION

<400> SEQUENCE: 18

Asn Ser Glu Cys Leu Ser Leu Cys Asn Asp Xaa Pro Ile Thr Asn Asp
1               5                   10                  15

Gln Lys Lys Leu Cys Ser Asn Lys Cys Gln Ser Val Arg Xaa
            20                  25                  30

<210> SEQ ID NO 19
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: BINDING
<222> LOCATION: (1)..(1)
<223> OTHER INFORMATION: AOAc
<220> FEATURE:
<221> NAME/KEY: MOD_RES
<222> LOCATION: (12)..(12)
<223> OTHER INFORMATION: Nle
<220> FEATURE:
<221> NAME/KEY: MOD_RES
<222> LOCATION: (30)..(30)
<223> OTHER INFORMATION: D-alanine
<220> FEATURE:
<221> NAME/KEY: MOD_RES
<222> LOCATION: (30)..(30)
<223> OTHER INFORMATION: AMIDATION

<400> SEQUENCE: 19

Arg Leu Ser Glu Cys Leu Ser Leu Cys Asn Asp Xaa Pro Ile Thr Asn
1               5                   10                  15

Asp Gln Lys Lys Leu Cys Ser Asn Asn Cys Leu Lys Ser Xaa
            20                  25                  30

<210> SEQ ID NO 20
<211> LENGTH: 40
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: BINDING
<222> LOCATION: (1)..(1)
<223> OTHER INFORMATION: AOAc
<220> FEATURE:
<221> NAME/KEY: MOD_RES
<222> LOCATION: (40)..(40)
<223> OTHER INFORMATION: D-alanine
<220> FEATURE:
<221> NAME/KEY: MOD_RES
<222> LOCATION: (40)..(40)
<223> OTHER INFORMATION: AMIDATION

<400> SEQUENCE: 20

Pro Val Ser Thr Tyr Met Leu Thr Asn Ser Glu Cys Leu Ser Leu Cys
1               5                   10                  15
```

```
Asn Asp Met Pro Ile Thr Asn Asp Gln Lys Lys Leu Cys Ser Asn Asn
                20                  25                  30

Cys Gln Ile Val Arg Gln Gln Xaa
        35                  40

<210> SEQ ID NO 21
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (30)..(30)
<223> OTHER INFORMATION: D-alanine

<400> SEQUENCE: 21

Asn Ser Glu Cys Leu Ser Leu Cys Asn Asp Xaa Pro Ile Thr Asn Asp
1               5                   10                  15

Gln Lys Lys Leu Cys Ser Asn Asn Cys Gln Ser Val Arg Xaa
            20                  25                  30

<210> SEQ ID NO 22
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (30)..(30)
<223> OTHER INFORMATION: D-alanine

<400> SEQUENCE: 22

Asn Ser Glu Cys Leu Ser Leu Cys Asn Asp Xaa Pro Ile Thr Asn Asp
1               5                   10                  15

Gln Lys Lys Leu Cys Ser Asn Asp Cys Gln Ser Val Arg Xaa
            20                  25                  30

<210> SEQ ID NO 23
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (24)..(24)
<223> OTHER INFORMATION: Orn
<220> FEATURE:
<221> NAME/KEY: MOD_RES
<222> LOCATION: (30)..(30)
<223> OTHER INFORMATION: D-alanine

<400> SEQUENCE: 23
```

```
Asn Ser Glu Cys Leu Ser Leu Cys Asn Asp Xaa Pro Ile Thr Asn Asp
1               5                   10                  15

Gln Lys Lys Leu Cys Ser Asn Xaa Cys Gln Ser Val Arg Xaa
            20                  25                  30

<210> SEQ ID NO 24
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (12)..(12)
<223> OTHER INFORMATION: Nle
<220> FEATURE:
<221> NAME/KEY: MOD_RES
<222> LOCATION: (30)..(30)
<223> OTHER INFORMATION: D-alanine

<400> SEQUENCE: 24

Arg Leu Ser Glu Cys Leu Ser Leu Cys Asn Asp Xaa Pro Ile Thr Asn
1               5                   10                  15

Asp Gln Lys Lys Leu Cys Ser Asn Lys Cys Leu Lys Ser Xaa
            20                  25                  30

<210> SEQ ID NO 25
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (12)..(12)
<223> OTHER INFORMATION: Nle
<220> FEATURE:
<221> NAME/KEY: MOD_RES
<222> LOCATION: (25)..(25)
<223> OTHER INFORMATION: Dbu
<220> FEATURE:
<221> NAME/KEY: MOD_RES
<222> LOCATION: (30)..(30)
<223> OTHER INFORMATION: D-alanine

<400> SEQUENCE: 25

Arg Leu Ser Glu Cys Leu Ser Leu Cys Asn Asp Xaa Pro Ile Thr Asn
1               5                   10                  15

Asp Gln Lys Lys Leu Cys Ser Asn Xaa Cys Leu Lys Ser Xaa
            20                  25                  30

<210> SEQ ID NO 26
<211> LENGTH: 40
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (40)..(40)
<223> OTHER INFORMATION: D-alanine

<400> SEQUENCE: 26

Pro Val Ser Thr Tyr Met Leu Thr Asn Ser Glu Cys Leu Ser Leu Cys
1               5                   10                  15
```

Asn Asp Met Pro Ile Thr Asn Asp Gln Lys Lys Leu Cys Ser Asn Lys
            20                  25                  30

Cys Gln Ile Val Arg Gln Gln Xaa
        35                  40

<210> SEQ ID NO 27
<211> LENGTH: 40
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (32)..(32)
<223> OTHER INFORMATION: Dbu
<220> FEATURE:
<221> NAME/KEY: MOD_RES
<222> LOCATION: (40)..(40)
<223> OTHER INFORMATION: D-alanine

<400> SEQUENCE: 27

Pro Val Ser Thr Tyr Met Leu Thr Asn Ser Glu Cys Leu Ser Leu Cys
1               5                   10                  15

Asn Asp Met Pro Ile Thr Asn Asp Gln Lys Lys Leu Cys Ser Asn Xaa
            20                  25                  30

Cys Gln Ile Val Arg Gln Gln Xaa
        35                  40

<210> SEQ ID NO 28
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (12)..(12)
<223> OTHER INFORMATION: Nle
<220> FEATURE:
<221> NAME/KEY: MOD_RES
<222> LOCATION: (30)..(30)
<223> OTHER INFORMATION: D-alanine

<400> SEQUENCE: 28

Arg Leu Ser Glu Cys Leu Ser Leu Cys Asn Asp Xaa Pro Ile Thr Asn
1               5                   10                  15

Asp Gln Lys Lys Leu Cys Ser Asn Asp Cys Leu Lys Ser Xaa
            20                  25                  30

<210> SEQ ID NO 29
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (12)..(12)
<223> OTHER INFORMATION: Nle
<220> FEATURE:
<221> NAME/KEY: MOD_RES
<222> LOCATION: (25)..(25)
<223> OTHER INFORMATION: Orn
<220> FEATURE:
<221> NAME/KEY: MOD_RES
<222> LOCATION: (30)..(30)
<223> OTHER INFORMATION: D-alanine

<400> SEQUENCE: 29

Arg Leu Ser Glu Cys Leu Ser Leu Cys Asn Asp Xaa Pro Ile Thr Asn
1               5                   10                  15

Asp Gln Lys Lys Leu Cys Ser Asn Xaa Cys Leu Lys Ser Xaa
            20                  25                  30

<210> SEQ ID NO 30
<211> LENGTH: 40
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (40)..(40)
<223> OTHER INFORMATION: D-alanine

<400> SEQUENCE: 30

Pro Val Ser Thr Tyr Met Leu Thr Asn Ser Glu Cys Leu Ser Leu Cys
1               5                   10                  15

Asn Asp Met Pro Ile Thr Asn Asp Gln Lys Lys Leu Cys Ser Asn Asp
            20                  25                  30

Cys Gln Ile Val Arg Gln Gln Xaa
        35                  40

<210> SEQ ID NO 31
<211> LENGTH: 40
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (32)..(32)
<223> OTHER INFORMATION: Orn
<220> FEATURE:
<221> NAME/KEY: MOD_RES
<222> LOCATION: (40)..(40)
<223> OTHER INFORMATION: D-alanine

<400> SEQUENCE: 31

Pro Val Ser Thr Tyr Met Leu Thr Asn Ser Glu Cys Leu Ser Leu Cys
1               5                   10                  15

Asn Asp Met Pro Ile Thr Asn Asp Gln Lys Lys Leu Cys Ser Asn Xaa
            20                  25                  30

Cys Gln Ile Val Arg Gln Gln Xaa
        35                  40

<210> SEQ ID NO 32
<211> LENGTH: 40
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (19)..(19)
<223> OTHER INFORMATION: Nle
<220> FEATURE:
<221> NAME/KEY: MOD_RES
<222> LOCATION: (40)..(40)
<223> OTHER INFORMATION: D-alanine

<400> SEQUENCE: 32

```
Pro Val Ser Thr Tyr Met Leu Thr Asn Ser Glu Cys Leu Ser Leu Cys
1               5                   10                  15

Asn Asp Xaa Pro Ile Thr Asn Asp Gln Lys Lys Leu Cys Ser Asn Asn
            20                  25                  30

Cys Gln Ile Val Arg Gln Gln Xaa
        35                  40

<210> SEQ ID NO 33
<211> LENGTH: 40
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (19)..(19)
<223> OTHER INFORMATION: Nle
<220> FEATURE:
<221> NAME/KEY: MOD_RES
<222> LOCATION: (40)..(40)
<223> OTHER INFORMATION: X-alanine

<400> SEQUENCE: 33

Pro Val Ser Thr Tyr Met Leu Thr Asn Ser Glu Cys Leu Ser Leu Cys
1               5                   10                  15

Asn Asp Xaa Pro Ile Thr Asn Asp Gln Lys Lys Leu Cys Ser Asn Lys
            20                  25                  30

Cys Gln Ile Val Arg Gln Gln Xaa
        35                  40

<210> SEQ ID NO 34
<211> LENGTH: 40
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (19)..(19)
<223> OTHER INFORMATION: Nle
<220> FEATURE:
<221> NAME/KEY: MOD_RES
<222> LOCATION: (32)..(32)
<223> OTHER INFORMATION: Dbu
<220> FEATURE:
<221> NAME/KEY: MOD_RES
<222> LOCATION: (40)..(40)
<223> OTHER INFORMATION: D-alanine

<400> SEQUENCE: 34

Pro Val Ser Thr Tyr Met Leu Thr Asn Ser Glu Cys Leu Ser Leu Cys
1               5                   10                  15

Asn Asp Xaa Pro Ile Thr Asn Asp Gln Lys Lys Leu Cys Ser Asn Xaa
            20                  25                  30

Cys Gln Ile Val Arg Gln Gln Xaa
        35                  40

<210> SEQ ID NO 35
<211> LENGTH: 40
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
```

```
<221> NAME/KEY: MOD_RES
<222> LOCATION: (19)..(19)
<223> OTHER INFORMATION: Nle
<220> FEATURE:
<221> NAME/KEY: MOD_RES
<222> LOCATION: (40)..(40)
<223> OTHER INFORMATION: D-alanine

<400> SEQUENCE: 35

Pro Val Ser Thr Tyr Met Leu Thr Asn Ser Glu Cys Leu Ser Leu Cys
1               5                   10                  15

Asn Asp Xaa Pro Ile Thr Asn Asp Gln Lys Lys Leu Cys Ser Asn Asp
            20                  25                  30

Cys Gln Ile Val Arg Gln Gln Xaa
        35                  40

<210> SEQ ID NO 36
<211> LENGTH: 40
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (19)..(19)
<223> OTHER INFORMATION: Nle
<220> FEATURE:
<221> NAME/KEY: MOD_RES
<222> LOCATION: (32)..(32)
<223> OTHER INFORMATION: Dbu
<220> FEATURE:
<221> NAME/KEY: MOD_RES
<222> LOCATION: (32)..(32)
<223> OTHER INFORMATION: orn
<220> FEATURE:
<221> NAME/KEY: MOD_RES
<222> LOCATION: (40)..(40)
<223> OTHER INFORMATION: D-alanine

<400> SEQUENCE: 36

Pro Val Ser Thr Tyr Met Leu Thr Asn Ser Glu Cys Leu Ser Leu Cys
1               5                   10                  15

Asn Asp Xaa Pro Ile Thr Asn Asp Gln Lys Lys Leu Cys Ser Asn Xaa
            20                  25                  30

Cys Gln Ile Val Arg Gln Gln Xaa
        35                  40

<210> SEQ ID NO 37
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (21)..(21)
<223> OTHER INFORMATION: Nle
<220> FEATURE:
<221> NAME/KEY: MOD_RES
<222> LOCATION: (30)..(30)
<223> OTHER INFORMATION: D-alanine

<400> SEQUENCE: 37

Asn Ser Glu Leu Leu Ser Leu Ile Asn Asp Xaa Pro Ile Thr Asn Asp
```

```
1               5                   10                  15
Gln Lys Lys Leu Xaa Ser Asn Asn Val Gln Ser Val Arg Xaa
            20                  25                  30

<210> SEQ ID NO 38
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (24)..(24)
<223> OTHER INFORMATION: Dbu
<220> FEATURE:
<221> NAME/KEY: MOD_RES
<222> LOCATION: (30)..(30)
<223> OTHER INFORMATION: D-alanine

<400> SEQUENCE: 38

Asn Ser Glu Leu Leu Ser Leu Cys Asn Asp Xaa Pro Ile Thr Asn Asp
1               5                   10                  15

Gln Lys Lys Leu Cys Ser Asn Xaa Val Gln Ser Val Arg Xaa
            20                  25                  30

<210> SEQ ID NO 39
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (24)..(24)
<223> OTHER INFORMATION: Dbu
<220> FEATURE:
<221> NAME/KEY: MOD_RES
<222> LOCATION: (30)..(30)
<223> OTHER INFORMATION: D-alanine

<400> SEQUENCE: 39

Asn Ser Glu Cys Leu Ser Leu Cys Asn Asp Xaa Pro Ile Thr Asn Asp
1               5                   10                  15

Gln Lys Lys Leu Cys Ser Ser Xaa Cys Gln Ser Val Arg Xaa
            20                  25                  30

<210> SEQ ID NO 40
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (30)..(30)
<223> OTHER INFORMATION: D-alanine
```

<400> SEQUENCE: 40

Asn Ser Glu Cys Leu Ser Leu Cys Asn Asp Xaa Pro Ile Thr Asn Asp
1               5                   10                  15

Gln Lys Lys Leu Cys Ser Ser Asn Cys Gln Ser Val Arg Xaa
            20                  25                  30

<210> SEQ ID NO 41
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (30)..(30)
<223> OTHER INFORMATION: D-alanine

<400> SEQUENCE: 41

Asn Ser Glu Cys Leu Ser Leu Cys Asn Asp Xaa Pro Ile Thr Asn Asp
1               5                   10                  15

Gln Lys Lys Leu Cys Ser Ser Gln Cys Gln Ser Val Arg Xaa
            20                  25                  30

<210> SEQ ID NO 42
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (30)..(30)
<223> OTHER INFORMATION: AMIDATION
<220> FEATURE:
<221> NAME/KEY: MOD_RES
<222> LOCATION: (30)..(30)
<223> OTHER INFORMATION: D-alanine

<400> SEQUENCE: 42

Asn Ser Glu Cys Leu Ser Leu Cys Asn Asp Xaa Pro Ile Thr Asn Asp
1               5                   10                  15

Gln Lys Lys Leu Cys Ser Ser Ser Cys Gln Ser Val Arg Xaa
            20                  25                  30

<210> SEQ ID NO 43
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (24)..(24)
<223> OTHER INFORMATION: Dbu

```
<220> FEATURE:
<221> NAME/KEY: MOD_RES
<222> LOCATION: (30)..(30)
<223> OTHER INFORMATION: D-alanine

<400> SEQUENCE: 43

Gln Ser Glu Cys Leu Ser Leu Cys Asn Asp Xaa Pro Ile Thr Asn Asp
1               5                   10                  15

Gln Lys Lys Leu Cys Ser Asn Xaa Cys Gln Ser Val Arg Xaa
            20                  25                  30

<210> SEQ ID NO 44
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (24)..(24)
<223> OTHER INFORMATION: Dbu
<220> FEATURE:
<221> NAME/KEY: MOD_RES
<222> LOCATION: (30)..(30)
<223> OTHER INFORMATION: D-alanine

<400> SEQUENCE: 44

Gln Ser Glu Cys Leu Ser Leu Cys Asn Asp Xaa Pro Ile Thr Asn Asp
1               5                   10                  15

Gln Lys Lys Leu Cys Ser Ser Xaa Cys Gln Ser Val Arg Xaa
            20                  25                  30

<210> SEQ ID NO 45
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (30)..(30)
<223> OTHER INFORMATION: D-alanine

<400> SEQUENCE: 45

Gln Ser Glu Cys Leu Ser Leu Cys Asn Asp Xaa Pro Ile Thr Asn Asp
1               5                   10                  15

Gln Lys Lys Leu Cys Ser Ser Asn Cys Gln Ser Val Arg Xaa
            20                  25                  30

<210> SEQ ID NO 46
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
```

<220> FEATURE:
<221> NAME/KEY: MOD_RES
<222> LOCATION: (30)..(30)
<223> OTHER INFORMATION: D-alanine

<400> SEQUENCE: 46

Gln Ser Glu Cys Leu Ser Leu Cys Asn Asp Xaa Pro Ile Thr Asn Asp
1               5                   10                  15

Gln Lys Lys Leu Cys Ser Ser Gln Cys Gln Ser Val Arg Xaa
            20                  25                  30

<210> SEQ ID NO 47
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (30)..(30)
<223> OTHER INFORMATION: D-alanine

<400> SEQUENCE: 47

Gln Ser Glu Cys Leu Ser Leu Cys Asn Asp Xaa Pro Ile Thr Asn Asp
1               5                   10                  15

Gln Lys Lys Leu Cys Ser Ser Ser Cys Gln Ser Val Arg Xaa
            20                  25                  30

<210> SEQ ID NO 48
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (24)..(24)
<223> OTHER INFORMATION: Dbu
<220> FEATURE:
<221> NAME/KEY: MOD_RES
<222> LOCATION: (30)..(30)
<223> OTHER INFORMATION: D-alanine

<400> SEQUENCE: 48

Ser Ser Glu Cys Leu Ser Leu Cys Asn Asp Xaa Pro Ile Thr Asn Asp
1               5                   10                  15

Gln Lys Lys Leu Cys Ser Asn Xaa Cys Gln Ser Val Arg Xaa
            20                  25                  30

<210> SEQ ID NO 49
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle

```
<220> FEATURE:
<221> NAME/KEY: MOD_RES
<222> LOCATION: (24)..(24)
<223> OTHER INFORMATION: Dbu
<220> FEATURE:
<221> NAME/KEY: MOD_RES
<222> LOCATION: (30)..(30)
<223> OTHER INFORMATION: D-alanine

<400> SEQUENCE: 49

Ser Ser Glu Cys Leu Ser Leu Cys Asn Asp Xaa Pro Ile Thr Asn Asp
1               5                   10                  15

Gln Lys Lys Leu Cys Ser Ser Xaa Cys Gln Ser Val Arg Xaa
            20                  25                  30

<210> SEQ ID NO 50
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (30)..(30)
<223> OTHER INFORMATION: D-alanine

<400> SEQUENCE: 50

Ser Ser Glu Cys Leu Ser Leu Cys Asn Asp Xaa Pro Ile Thr Asn Asp
1               5                   10                  15

Gln Lys Lys Leu Cys Ser Ser Asn Cys Gln Ser Val Arg Xaa
            20                  25                  30

<210> SEQ ID NO 51
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (30)..(30)
<223> OTHER INFORMATION: D-alanine

<400> SEQUENCE: 51

Ser Ser Glu Cys Leu Ser Leu Cys Asn Asp Xaa Pro Ile Thr Asn Asp
1               5                   10                  15

Gln Lys Lys Leu Cys Ser Ser Gln Cys Gln Ser Val Arg Xaa
            20                  25                  30

<210> SEQ ID NO 52
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
```

```
<220> FEATURE:
<221> NAME/KEY: MOD_RES
<222> LOCATION: (30)..(30)
<223> OTHER INFORMATION: D-alanine

<400> SEQUENCE: 52

Ser Ser Glu Cys Leu Ser Leu Cys Asn Asp Xaa Pro Ile Thr Asn Asp
1               5                   10                  15

Gln Lys Lys Leu Cys Ser Ser Ser Cys Gln Ser Val Arg Xaa
            20                  25                  30

<210> SEQ ID NO 53
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (24)..(24)
<223> OTHER INFORMATION: Dbu
<220> FEATURE:
<221> NAME/KEY: MOD_RES
<222> LOCATION: (30)..(30)
<223> OTHER INFORMATION: D-alanine

<400> SEQUENCE: 53

Gly Ser Glu Cys Leu Ser Leu Cys Asn Asp Xaa Pro Ile Thr Asn Asp
1               5                   10                  15

Gln Lys Lys Leu Cys Ser Asn Xaa Cys Gln Ser Val Arg Xaa
            20                  25                  30

<210> SEQ ID NO 54
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (24)..(24)
<223> OTHER INFORMATION: Dbu
<220> FEATURE:
<221> NAME/KEY: MOD_RES
<222> LOCATION: (30)..(30)
<223> OTHER INFORMATION: D-alanine

<400> SEQUENCE: 54

Gly Ser Glu Cys Leu Ser Leu Cys Asn Asp Xaa Pro Ile Thr Asn Asp
1               5                   10                  15

Gln Lys Lys Leu Cys Ser Ser Xaa Cys Gln Ser Val Arg Xaa
            20                  25                  30

<210> SEQ ID NO 55
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
```

```
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (30)..(30)
<223> OTHER INFORMATION: D-alanine

<400> SEQUENCE: 55

Gly Ser Glu Cys Leu Ser Leu Cys Asn Asp Xaa Pro Ile Thr Asn Asp
1               5                   10                  15

Gln Lys Lys Leu Cys Ser Ser Asn Cys Gln Ser Val Arg Xaa
            20                  25                  30

<210> SEQ ID NO 56
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (30)..(30)
<223> OTHER INFORMATION: D-alanine

<400> SEQUENCE: 56

Gly Ser Glu Cys Leu Ser Leu Cys Asn Asp Xaa Pro Ile Thr Asn Asp
1               5                   10                  15

Gln Lys Lys Leu Cys Ser Ser Gln Cys Gln Ser Val Arg Xaa
            20                  25                  30

<210> SEQ ID NO 57
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (11)..(11)
<223> OTHER INFORMATION: Nle
<220> FEATURE:
<221> NAME/KEY: MOD_RES
<222> LOCATION: (30)..(30)
<223> OTHER INFORMATION: D-alanine

<400> SEQUENCE: 57

Gly Ser Glu Cys Leu Ser Leu Cys Asn Asp Xaa Pro Ile Thr Asn Asp
1               5                   10                  15

Gln Lys Lys Leu Cys Ser Ser Ser Cys Gln Ser Val Arg Xaa
            20                  25                  30

<210> SEQ ID NO 58
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: repeat unit
<220> FEATURE:
<221> NAME/KEY: MOD_RES
```

```
<222> LOCATION: (7)..(7)
<223> OTHER INFORMATION: Amino acid Xaa

<400> SEQUENCE: 58

Ile Glu Lys Lys Ile Glu Xaa
1               5

<210> SEQ ID NO 59
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: repeat unit

<400> SEQUENCE: 59

Ile Glu Lys Lys Ile Glu Gly
1               5

<210> SEQ ID NO 60
<211> LENGTH: 28
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: coiled coil chain segment

<400> SEQUENCE: 60

Ile Glu Lys Lys Ile Glu Gly Ile Glu Lys Lys Ile Glu Gly Ile Glu
1               5                   10                  15

Lys Lys Ile Glu Gly Ile Glu Lys Lys Ile Glu Gly
            20                  25

<210> SEQ ID NO 61
<211> LENGTH: 28
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: coiled coil chain segment

<400> SEQUENCE: 61

Ile Glu Lys Lys Ile Glu Ala Ile Glu Lys Lys Ile Glu Ala Ile Glu
1               5                   10                  15

Lys Lys Ile Glu Ala Ile Glu Lys Lys Ile Glu Ala
            20                  25

<210> SEQ ID NO 62
<211> LENGTH: 28
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: coiled coil chain segment

<400> SEQUENCE: 62

Ile Glu Lys Lys Ile Glu Ser Ile Glu Lys Lys Ile Glu Ser Ile Glu
1               5                   10                  15

Lys Lys Ile Glu Ser Ile Glu Lys Lys Ile Glu Ser
```

<210> SEQ ID NO 63
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: TT830-843

<400> SEQUENCE: 63

Gln Tyr Ile Lys Ala Asn Ser Lys Phe Ile Gly Ile Thr Glu
1               5                   10

<210> SEQ ID NO 64
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: TT1064-1079

<400> SEQUENCE: 64

Ile Arg Glu Asp Asn Asn Ile Thr Leu Lys Leu Asp Arg Cys Asn Asn
1               5                   10                  15

<210> SEQ ID NO 65
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: TT1084-1099

<400> SEQUENCE: 65

Val Ser Ile Asp Lys Phe Arg Ile Phe Cys Lys Ala Asn Pro Lys
1               5                   10                  15

<210> SEQ ID NO 66
<211> LENGTH: 22
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: TT947-968

<400> SEQUENCE: 66

Phe Asn Asn Phe Thr Val Ser Phe Trp Leu Arg Val Pro Lys Val Ser
1               5                   10                  15

Ala Ser His Leu Glu Thr
            20

<210> SEQ ID NO 67
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: TT1174-1189

```
<400> SEQUENCE: 67

Leu Lys Phe Ile Ile Lys Arg Tyr Thr Pro Asn Asn Glu Ile Asp Ser
1               5                   10                  15

<210> SEQ ID NO 68
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: DTD271-290

<400> SEQUENCE: 68

Pro Val Phe Ala Gly Ala Asn Tyr Ala Ala Trp Ala Val Asn Val Ala
1               5                   10                  15

Gln Val Ile Asp
            20

<210> SEQ ID NO 69
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: DTD321-340

<400> SEQUENCE: 69

Val His His Asn Thr Glu Glu Ile Val Ala Gln Ser Ile Ala Leu Ser
1               5                   10                  15

Ser Leu Met Val
            20

<210> SEQ ID NO 70
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: DTD331-350

<400> SEQUENCE: 70

Gln Ser Ile Ala Leu Ser Ser Leu Met Val Ala Gln Ala Ile Pro Leu
1               5                   10                  15

Val Gly Glu Leu
            20

<210> SEQ ID NO 71
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: DTD351-370

<400> SEQUENCE: 71

Val Asp Ile Gly Phe Ala Ala Tyr Asn Phe Val Glu Ser Ile Ile Asn
1               5                   10                  15
```

```
Leu Phe Gln Val
            20

<210> SEQ ID NO 72
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: DTD411-430

<400> SEQUENCE: 72

Gln Gly Glu Ser Gly His Asp Ile Lys Ile Thr Ala Glu Asn Thr Pro
1               5                   10                  15

Leu Pro Ile Ala
            20

<210> SEQ ID NO 73
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: DTD431-450

<400> SEQUENCE: 73

Gly Val Leu Leu Pro Thr Ile Pro Gly Lys Leu Asp Val Asn Lys Ser
1               5                   10                  15

Lys Thr His Ile
            20

<210> SEQ ID NO 74
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: TT632-651

<400> SEQUENCE: 74

Thr Ile Asp Lys Ile Ser Asp Val Ser Thr Ile Val Pro Tyr Ile Gly
1               5                   10                  15

Pro Ala Leu Asn
            20

<210> SEQ ID NO 75
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: CTMOMP36-60

<400> SEQUENCE: 75

Ala Leu Asn Ile Trp Asp Arg Phe Asp Val Phe Cys Thr Leu Gly Ala
1               5                   10                  15

Thr Thr Gly Tyr Leu Lys Gly Asn Ser
            20                  25
```

<210> SEQ ID NO 76
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: TraT1

<400> SEQUENCE: 76

Gly Leu Gln Gly Lys Ile Ala Asp Ala Val Lys Ala Lys Gly
1               5                   10

<210> SEQ ID NO 77
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: TraT2

<400> SEQUENCE: 77

Gly Leu Ala Ala Gly Leu Val Gly Met Ala Ala Asp Ala Met Val Glu
1               5                   10                  15

Asp Val Asn

<210> SEQ ID NO 78
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: TraT3

<400> SEQUENCE: 78

Ser Thr Glu Thr Gly Asn Gln His His Tyr Gln Thr Arg Val Val Ser
1               5                   10                  15

Asn Ala Asn Lys
            20

<210> SEQ ID NO 79
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: HbcAg50-69

<400> SEQUENCE: 79

Pro His His Thr Ala Leu Arg Gln Ala Ile Leu Cys Trp Gly Glu Leu
1               5                   10                  15

Met Thr Leu Ala
            20

<210> SEQ ID NO 80
<211> LENGTH: 15
<212> TYPE: PRT
<213> ORGANISM: Artificial Sequence
<220> FEATURE:
<223> OTHER INFORMATION: Description of Artificial Sequence: Synthetic

```
                            peptide
<220> FEATURE:
<223> OTHER INFORMATION: HbSAg19-33

<400> SEQUENCE: 80

Phe Phe Leu Leu Thr Arg Ile Leu Thr Ile Pro Gln Ser Leu Asp
1               5                   10                  15

<210> SEQ ID NO 81
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: HA307-319

<400> SEQUENCE: 81

Pro Lys Tyr Val Lys Gln Asn Thr Leu Lys Leu Ala Thr
1               5                   10

<210> SEQ ID NO 82
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: MA17-31

<400> SEQUENCE: 82

Tyr Ser Gly Pro Leu Lys Ala Glu Ile Ala Gln Arg Leu Glu Asp Val
1               5                   10                  15

<210> SEQ ID NO 83
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: MVF258-277

<400> SEQUENCE: 83

Gly Ile Leu Glu Ser Arg Gly Ile Lys Ala Arg Ile Thr His Val Asp
1               5                   10                  15

Thr Glu Ser Tyr
            20

<210> SEQ ID NO 84
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: MVF288-302

<400> SEQUENCE: 84

Leu Ser Glu Ile Lys Gly Val Ile Val His Arg Leu Glu Gly Val
1               5                   10                  15

<210> SEQ ID NO 85
<211> LENGTH: 17
```

```
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: SM Th

<400> SEQUENCE: 85

Lys Trp Phe Lys Thr Asn Ala Pro Asn Gly Val Asp Glu Lys Ile Arg
1               5                   10                  15

Ile

<210> SEQ ID NO 86
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: PADRE1
<220> FEATURE:
<221> NAME/KEY: MOD_RES
<222> LOCATION: (1)..(1)
<223> OTHER INFORMATION: D-alanine
<220> FEATURE:
<221> NAME/KEY: MOD_RES
<222> LOCATION: (13)..(13)
<223> OTHER INFORMATION: D-alanine

<400> SEQUENCE: 86

Xaa Lys Phe Val Ala Ala Trp Thr Leu Lys Ala Ala Xaa
1               5                   10

<210> SEQ ID NO 87
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: PADRE2
<220> FEATURE:
<221> NAME/KEY: MOD_RES
<222> LOCATION: (1)..(1)
<223> OTHER INFORMATION: D-alanine
<220> FEATURE:
<221> NAME/KEY: MOD_RES
<222> LOCATION: (2)..(2)
<223> OTHER INFORMATION: cyclohexylalanine
<220> FEATURE:
<221> NAME/KEY: MOD_RES
<222> LOCATION: (12)..(12)
<223> OTHER INFORMATION: D-alanine

<400> SEQUENCE: 87

Xaa Xaa Val Ala Ala Trp Thr Leu Lys Ala Ala Xaa
1               5                   10

<210> SEQ ID NO 88
<211> LENGTH: 54
<212> TYPE: PRT
<213> ORGANISM: Artificial Sequence
<220> FEATURE:
<223> OTHER INFORMATION: synthethic peptide moiety

<400> SEQUENCE: 88

Gly Gly Ile Glu Lys Lys Ile Glu Ser Ile Glu Lys Lys Ile Glu Ser
1               5                   10                  15
```

```
Ile Glu Lys Lys Ile Glu Ser Ile Glu Lys Lys Ile Glu Ser Ile Glu
            20                  25                  30

Lys Lys Ile Ala Lys Met Glu Lys Ala Ser Ser Val Phe Asn Val Val
            35                  40                  45

Asn Ser Lys Lys Lys Cys
            50
```

UNITED STATES PATENT AND TRADEMARK OFFICE
CERTIFICATE OF CORRECTION

| | | |
|---|---|---|
| PATENT NO. | : 12,465,633 B2 | Page 1 of 1 |
| APPLICATION NO. | : 17/415305 | |
| DATED | : November 11, 2025 | |
| INVENTOR(S) | : Arin Ghasparian and John A Robinson | |

It is certified that error appears in the above-identified patent and that said Letters Patent is hereby corrected as shown below:

In the Claims

Claim 5, Column 120, Line 30, replace "(IEKKIES) 4" with -- $(IEKKIES)_4$ --

Signed and Sealed this
Third Day of February, 2026

John A. Squires
*Director of the United States Patent and Trademark Office*